(12) United States Patent
Chen et al.

(10) Patent No.: US 9,467,638 B2
(45) Date of Patent: Oct. 11, 2016

(54) SENSORY ARRAY WITH NON-CORRELATED DOUBLE SAMPLING RANDOM ACCESS-RESET PIXEL AND MULTI-CHANNEL READOUT

(71) Applicant: The Hong Kong University of Science and Technology, Kowloon (HK)

(72) Inventors: Denis Guangyin Chen, Kowloon (HK); Amine Bermak, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 121 days.

(21) Appl. No.: 14/459,187

(22) Filed: Aug. 13, 2014

(65) Prior Publication Data

US 2015/0049231 A1    Feb. 19, 2015

Related U.S. Application Data

(60) Provisional application No. 61/996,035, filed on Apr. 28, 2014, provisional application No. 61/959,032, filed on Aug. 13, 2013.

(51) Int. Cl.
| | |
|---|---|
| *H04N 5/335* | (2011.01) |
| *H04N 3/14* | (2006.01) |
| *H04N 5/378* | (2011.01) |
| *H04N 5/374* | (2011.01) |

(52) U.S. Cl.
CPC ............ *H04N 5/378* (2013.01); *H04N 5/3742* (2013.01)

(58) Field of Classification Search
CPC ........................... H04N 5/378; H04N 5/3742

USPC ........ 348/294–324; 250/208.1; 257/290–292
See application file for complete search history.

(56) References Cited

U.S. PATENT DOCUMENTS 5,610,604 A * 3/1997 Leacock ............... H03M 1/367
341/118
6,417,794 B1   7/2002 Munoz et al.
(Continued)

FOREIGN PATENT DOCUMENTS

CN       202420446 U    9/2012
CN       103023504 A    4/2013
(Continued)

OTHER PUBLICATIONS

Lee, et al., "A Self-Calbrating 15 Bit CMOS A/D Converter". IEEE Journal of Solid-State Circuits, vol. SC-19, No. 6, Dec. 1984. 7 pages.
(Continued)

*Primary Examiner* — Yogesh Aggarwal
(74) *Attorney, Agent, or Firm* — Amin, Turocy & Watson, LLP

(57) ABSTRACT

Integration of high-fidelity readout and compressive readout channels in a signal sensor array system is provided. A high-fidelity representation of the sensor array is recovered by combining the data from both the high-resolution and compressive readout channels. The signal sensory array system uses a non-correlated-double-sampling (non-CDS) pixel block readout, random-access-reset pixel, ADC-integrated image compression, high-resolution successive-approximation-register (SAR) analog-to-digital-converters (ADC), SAR ADC self-calibration, and low-noise time-domain comparator.

25 Claims, 37 Drawing Sheets

(56) References Cited

U.S. PATENT DOCUMENTS

| | | | |
|---|---|---|---|
| 6,424,276 | B1 | 7/2002 | Munoz et al. |
| 6,486,806 | B1 | 11/2002 | Munoz et al. |
| 6,786,411 | B2 | 9/2004 | Chen et al. |
| 7,379,831 | B1 | 5/2008 | Tsyrganovich |
| 7,408,490 | B2 | 8/2008 | Melanson et al. |
| 7,479,916 | B1 | 1/2009 | Reshef et al. |
| 7,528,761 | B2 | 5/2009 | Draxelmayr |
| 7,616,243 | B2* | 11/2009 | Kozlowski ............ H04N 3/155 348/221.1 |
| 7,724,174 | B2 | 5/2010 | Chang et al. |
| 7,796,077 | B2 | 9/2010 | Mitikiri |
| 7,868,796 | B2 | 1/2011 | Berens et al. |
| 7,986,253 | B2 | 7/2011 | Cho et al. |
| 8,283,215 | B2 | 10/2012 | Or-Bach et al. |
| 8,373,444 | B2 | 2/2013 | Lee et al. |
| 8,480,579 | B2 | 7/2013 | Serov et al. |
| 8,487,806 | B2 | 7/2013 | Choi et al. |
| 8,502,723 | B2 | 8/2013 | Chen et al. |
| 2003/0123646 | A1 | 7/2003 | Srinivasan et al. |
| 2004/0227829 | A1* | 11/2004 | Wixson ................. H04N 3/155 348/294 |
| 2005/0254008 | A1 | 11/2005 | Ferguson et al. |
| 2012/0008029 | A1* | 1/2012 | Matsuda ........... H01L 27/14609 348/300 |
| 2012/0274489 | A1 | 11/2012 | Chang et al. |
| 2013/0021181 | A1 | 1/2013 | Shah |
| 2013/0038477 | A1 | 2/2013 | Souchkov |
| 2013/0106628 | A1 | 5/2013 | Miller et al. |
| 2013/0135127 | A1 | 5/2013 | Siragusa |
| 2013/0296715 | A1 | 11/2013 | Lasser et al. |
| 2013/0335250 | A1 | 12/2013 | Limotyrakis et al. |
| 2013/0342681 | A1 | 12/2013 | Duong |

FOREIGN PATENT DOCUMENTS

| | | |
|---|---|---|
| CN | 103281083 A | 9/2013 |
| EP | 1332718 A1 | 8/2003 |
| EP | 1467409 A2 | 10/2004 |
| GB | 2455441 A | 6/2009 |
| KR | 101111638 B1 | 2/2012 |
| TW | 200833097 A | 8/2008 |
| WO | 2006138205 A1 | 12/2006 |

OTHER PUBLICATIONS

Ginsburg, et al., "An Energy-Efficient Charge Recycling Approach for a SAR Converter With Capacity DAC". IEEE International Symposium on Circuits and Systems, May 2005, pp. 184-187 vol. 1.

Cho, et al., "Digital error correction technique for binary decision successive approximation ADCs". Electronics Letters 9th Apr. 2009, vol. 45 No. 8. 2 pages.

Lee, et al., "A 21 fJ/Conversion-Step 100 kS/s 10-bit ADC With a Low-Noise Time-Domain Comparator for Low-Power Sensor Interface". IEEE Journal of Solid-State Circuits, vol. 46, No. 3, Mar. 2011. 9 pages.

Chen, et al., "A Low-Power Pilot-Dac Based Column Parallel 8b SAR ADC With Forward Error Correction for CMOS Image Sensors." IEEE Transactions on Circuits and Systems-I: Regular Papers, vol. 60, No. 10, Oct. 2013. 12 pages.

Leutenegger, et al., "Real-time full field laser Doppler imaging". Biomedical Optics Express 1470, vol. 2, No. 6, Jun. 1, 2011, 8 pages.

He, et al., "Laser Doppler Blood Flow Imaging Using a CMOS Imaging Sensor with On-Chip Signal Processing". Sensors 2013, 13, pp. 12632-12467. Published Sep. 18, 2013.

Serov, et al., "High-speed laser Doppler perfusion imaging using an integrating CMOS image sensor." Optics Express 6416, vol. 13, No. 17, Aug. 22, 2005, 13 pages.

Draijer, et al., "Twente Optical Perfusion Camera: system overview and performance for video rate laser Doppler perfusion imaging." Optics Express 3211, vol. 17, No. 5, Mar. 2, 2009, 15 pages.

Moor Instruments, "moorLDI2 laser doppler imager," published online at [http://us.moor.co.uk/product/moorldi2-laser-doppler-imager/8], retrieved Jan. 13, 2015, 2 pages.

Ng, et al. "A low-voltage CMOS 5-bit 600 MHz 30 mW SAR ADC for UWB wireless receivers" 48th Midwest Symposium on Circuits and Systems, Aug. 2005. 4 pages.

Liu, et al. "A 10-bit 50-MS/s SAR ADC With a Monotonic Capacitor Switching Procedure" IEEE Journal of Solid-State Circuits, vol. 45, No. 4, Apr. 2010, 10 pages.

Scott, et al. "An ultralow-energy ADC for Smart Dust" IEEE Journal of Solid-State Circuits, vol. 38, No. 7, Jul. 2003, 7 pages.

Ogawa, et al. "SAR ADC Algorithm with Redundancy and Digital Error Correction" IEICE Transactions on Fundamentals of Electronics, Communications and Computer Sciences vol. E93-A No. 2 pp. 415-423, Feb. 1, 2010.

"SAR ADC algorithm with redundancy" APCCAS 2008. IEEE Asia Pacific Conference on Circuits and Systems, 2008. 4 pages.

Dabbagh-Sadeghipour, et al. "A new successive approximation architecture for high-speed low-power ADCs" Int. J. Electron. Commun. (AEÜ) 60 (2006) pp. 217-223.

Robert, et al. "An Ultra-Low-Power Successive-Approximation-Based ADC for Implantable Sensing Devices" 49th IEEE International Midwest Symposium on Circuits and Systems, Aug. 2006. 5 pages.

"SAR ADC that is configurable to optimize yield" 2010 IEEE Asia Pacific Conference on Circuits and Systems (APCCAS), Dec. 2010, pp. 374-377.

Wenhuan Yu. "Design techniques for low power ADCs" A thesis submitted to Oregon State University, Jan. 27, 2010, 90 pages.

Serov, et al. "Full-field high-speed laser Doppler imaging system for blood-flow measurements" Proc. SPIE 6080, Advanced Biomedical and Clinical Diagnostic Systems IV, 608004 (Feb. 25, 2006), 8 pages.

Serov, et al. "Combined laser Doppler and laser speckle imaging for real-time blood flow measurements" Proc. SPIE 6094, Optical Diagnostics and Sensing VI, 609406 (Feb. 27, 2006), 8 pages.

He, et al. "32×32 pixel array complementary metal-oxide semiconductor imaging sensor for laser Doppler blood-flow measurement" Opt. Eng. 50(5), 054403 (May 17, 2011), 12 pages.

He, et al. "Laser Doppler blood flow imaging with a 64×64 pixel full custom CMOS sensor" Proc. SPIE 7891, Design and Quality for Biomedical Technologies IV, 78910D (Feb. 22, 2011), 7 pages.

Himsworth, John Michael. "Linear array CMOS detectors for laser doppler blood flow imaging"—Thesis submitted to the University of Nottingham for the degree of Doctor of Philosophy, Dec. 2011. 340 pages.

Samson, et al. "Short-time Fourier transform laser Doppler holography" published online at [http://arxiv.org/abs/1211.5452], May 5, 2013, 4 pages.

Loose, et al. "A self-calibrating single-chip CMOS camera with logarithmic response" IEEE Journal of Solid-State Circuits, (vol. 36, Issue: 4) Apr. 2001, pp. 586-596.

"OxyFlo Laser Doppler blood flow monitor" Oxford Optronix, 2013. published online at http://www.oxford-optronix.com/product21/page501/menu2/Tissue_Vitality_Monitoring/Blood_Flow_Monitors/OxyFlo_.html?gclid=CLCorOnhnL4CFU5lfgodNigAwQ] retrieved on Jan. 14, 2015, 1 page.

"Medical Device Manufacturing in the US: Market Research Report", IBIS World, Oct. 2014, published online at [http://www.ibisworld.com/industry/default.aspx?indid=764], retrieved on Jan. 14, 2015, 2 pages.

"Electromedical and Electrotherapeutic Apparatus", Highbeam Business, published online at [http://business.highbeam.com/industry-reports/equipment/electromedical-electrotherapeutic-apparatus], retrieved on Jan. 14, 2015.

"Semiconductor & Circuit Manufacturing in the US: Market Research Report", IBISWorld, Dec. 2014, published online at [http://www.ibisworld.com/industry/default.aspx?indid=752], retrieved on Jan. 14, 2015, 2 pages.

"Semiconductor Machinery Manufacturing in Canada Industry Market Research Report Now Available from IBISWorld" redOrbit, Apr. 28, 2014, published online at [http://www.redorbit.com/news/

(56) References Cited

OTHER PUBLICATIONS technology/1113131985/semiconductor-machinery-manufacturing-in-canada-industry-market-research-report-now/], retrieved on Jan. 14, 2015, 3 pages.

"Global Semiconductor & Electronic Parts Manufacturing: Market Research" IBISWorld, Sep. 2014, published online at [http://www.ibisworld.com/industry/global/global-semiconductor-electronic-parts-manufacturing.html], retrieved on Jan. 14, 2015, 2 pages.

Rosso, Dan. "Semiconductor Industry Association: Global Semiconductor Sales Increase in October; Industry on Track for Highest-Ever Annual Sales in 2013" Semiconductor Industry Association, Dec. 4, 2013, published online at [http://www.semiconductors.org/news/2013/12/04/global_sales_report_2013/global_semiconductor_sales_increase_in_october_industry_ontrack_for_highest_ever_annual_sales_in_2013/], retrieved on Jan. 14, 2015, 2 pages.

"Status of the Power Electronics Industry" I-Micronews, Aug. 10, 2012, published online at [http://www.i-micronews.com/reports/Status-Power-Electronics-Industry/12/305/] retrieved archived dated Aug. 7, 2013 via Internet Archive Wayback Machine on Jan. 14, 2015, 3 pages.

Axis Research Mind. "Medical Electronics—Global Trends, Estimates and Forecasts, 2011-2018" Dec. 5, 2013, published online at [http://www.marketresearch.com/Axis-Research-Mind-v3841/Medical-Electronics-Global-Trends-Estimates-7923663/] retrieved on Jan. 14, 2015, 2 pages.

"General Purpose SAR ADCs" Linear Technology, published online at [http://www.linear.com/products/General_Purpose_ADCs] retrieved on Jan. 14, 2015, 2 pages.

Taranovich, Steve. "Analog Devices 5 Msps 18-Bit SAR ADC" EDN Network, Sep. 9, 2013, published online at [http://www.edn.com/electronics-products/electronic-product-reviews/other/4420758/Analog-Devices-5-Msps-18-Bit-SAR-ADC-] retrieved Jan. 14, 2015, 7 pages.

"TC3402 +1.8 Low Power, Quad Input, 16-Bit Sigma-Delta A/D Converter" Microchip. published online at [http://www.microchip.com/wwwproducts/Devices.aspx?dDocName=en010542] retrieved Jan. 14, 2015, 17 pages.

"OxyFlo Pro Tissue blood flow monitoring" Oxford Optronix, published online at http://www.oxford-optronix.com/product21/page501/menu2/Tissue_Vitality_Monitoring/Blood_Flow_Monitors/OxyFlo_.html?gclid=CLCorOnhnL4CFU5lfgodNigAwQ] retrieved on Jan. 14, 2015, 1 page.

"Wrist MRI System" AspectImaging. Published online at [http://www.aspectimaging.com/clinical/product/wrist-mri-system?gclid=Clb7hajinL4CFYdrfgodRIQAKg], retrieved on Jan. 14, 2015, 2 pages.

"Area Scan Camera Selector" Basler. published online at [http://www.baslerweb.com/Camera-Comparer-Area-Scan-10642.html], retrieved on Jan. 14, 2015, 2 pages.

"CMOS Image Sensor" Samsung. published online at [http://www.samsung.com/global/business/semiconductor/product/cmos-imaging/catalogue], retrieved on Jan. 14, 2014, 2 pages.

"Silicon CMOS" Allied Scientific Pro. published online at [http://alliedscientificpro.com/product-category/imaging/technology/silicon-cmos/?gclid=CK33gc_snL4CFQGTfgodHmcA8A], retrieved on Jan. 14, 2014, 7 pages.

"NanEye Stereo" AWAIBA. published online at [http://www.awaiba.com/product/naneye-stereo/] retrieved on Jan. 14, 2015, 2 pages.

* cited by examiner

SENSORY ARRAY WITH NON-CORRELATED DOUBLE SAMPLING RANDOM ACCESS-RESET PIXEL AND MULTI-CHANNEL READOUT

CROSS REFERENCE TO RELATED APPLICATION

This application claims priority to each of U.S. Provisional Patent Application No. 61/996,035, filed on Apr. 28, 2014, and entitled "A SENSORY ARRAY WITH NON-CDS RANDOM-ACCESS-RESET PIXEL AND MULTI-CHANNEL READOUT", and U.S. Provisional Patent Application No. 61/959,032, filed Aug. 13, 2013, and entitled "A SAR ADC WITH FORWARD ERROR CORRECTION AND MIXED-SIGNAL CORRELATED-DOUBLE-SAMPLING", the respective entireties of which are hereby incorporated herein by reference.

TECHNICAL FIELD

This disclosure generally relates to sensory systems, and, for example, to sensory arrays with non-correlated double sampling random access-reset pixels, successive approximation register analog-to-digital converters, and multi-channel readout.

BACKGROUND

Emerging imaging applications are increasing in diversity. As a result of this diversity, a single image sensor, which can satisfy the requirements of all the emerging imaging applications, is increasingly difficult to design. For example, wireless multimedia sensor networks (WMSN) and disposable sensors demand low power consumption, low cost, and low data-rate, but compromise on image quality; retinal prosthesis can tolerate higher costs in exchange for low power consumption; laser Doppler imaging (LDI) needs very high sampling speed but does not need to sample every pixel. The task of designing a practical complementary metal-oxide-semiconductor (CMOS) image sensor (CIS) which will satisfy all applications can be extremely difficult.

The data-rate problem can be partly solved by adding a dedicated digital signal processor (DSP) to compress the data, but this approach typically compromises on image quality if high compression ratios are desired. Furthermore, it is computationally intense; therefore, it introduces significant power, area, and thermal overhead. State-of-the-art DSP using commercial algorithms such as the industry standard Joint Photographic Experts Group (JPEG) codecs based on discrete cosine transform (DCT) or discrete wavelet transform (DWT) can have power consumptions on the same order as the image sensor itself. The limited processing speed of the DSP also limits its frame-rate and makes it unsuitable for high-speed applications.

Laser Doppler imaging (LDI) samples each pixel-of-interest with a bandwidth of greater than 20 kHz (>40 kSa/s) to estimate the corresponding particle flow-rate by the principle of laser Doppler (LD) effect. LD describes the difference in frequency the Doppler Shift-between the incident light and its scattered parts from moving particles. When moving particles are illuminated by a coherent light source such as a laser, the heterodyne between different copies of LD shifted back-scattered light from the ensemble of particles create a time-varying interference pattern. The first moment of the spectrum-power-density of this pattern is an estimator of the flow-rate is essentially what the LDI sensor measures.

LDI is used in a large number of industrial and biomedical instruments purposed to study liquid and gas dynamics such as blood perfusion and microcapillaries circulation. Such measurements are made non-invasive, non-contact, and instantaneous by LDI. The difficulty facing LDI is in its need to sample a large number of pixels at very high sampling rates and very high signal-to-noise ratio (SNR) under restricted thermal power budget even though not every pixel will potentially be located on blood vessels and carry flow information. Therefore, it is useful to have a sensor that is able to quickly capture a full image of the scene and analyze it to locate the pixels, which are highly likely to correspond to blood vessels and only perform LDI capture on a limited number of candidate pixels. On-chip image compression can play an important role in this scenario by shortening the transmission delay between the sensor and the processor, and it also reduces the image processing time if the compression algorithm allows the processing to be carried out directly in the compressed domain.

In a visible light communication (VLC) system, a hybrid approach of combining high fidelity (SNR) sensing with coarse compressive sensing can be utilized. In a VLC system where the receiver is a mobile camera tasked with the responsibility of locating a limited number of transmitter light-sources in the scene, the receiver performance can be enhanced by having multiple sensor readout paths each optimized for a different purpose. A compressive readout channel with low overhead can be used to scan the complete scene to maintain spatial lock to transmitter light-sources while a high SNR readout channel is multiplexed to a limited number of pixels corresponding to the transmitters, which disseminate high-speed information.

Successive Approximation Register (SAR) Analog-to-Digital Converters (ADC) are suitable for low-power applications with moderate sampling rates and resolutions at aggressively scaled technology nodes. For example, in image sensors, the steady increase in pixel resolution, frame-rate, and mobility by technology scaling has made low-power data conversion circuit design an important topic.

The main challenge of implementing an array of column parallel SAR ADCs for applications such as image sensors lies in achieving adequate resolution in a very small capacitor array given the constraints on the available circuit area. For example, a typical mismatch for a 20 fF Metal-Insulator-Metal (MIM) capacitor (minimum design rule in 0.18 µm technology) is approximately 1% standard deviation, while this figure is close to 6% for Metal-Oxide-Metal (MOM) capacitors. A bigger capacitor array results in better ADC accuracy, but the extra circuit area is prohibitively expensive in a column parallel design. Furthermore, a smaller capacitor consumes much less switching power, and also settles faster, thereby using less power in the reference generator.

The above-described background is merely intended to provide contextual overview of sensory systems in a network, and is not intended to be exhaustive. Additional context may become apparent upon review of one or more of the various non-limiting embodiments of the following detailed description.

BRIEF DESCRIPTION OF THE DRAWINGS

Various non-limiting embodiments are further described with reference to the accompanying drawings.

DETAILED DESCRIPTION

Figure 1:
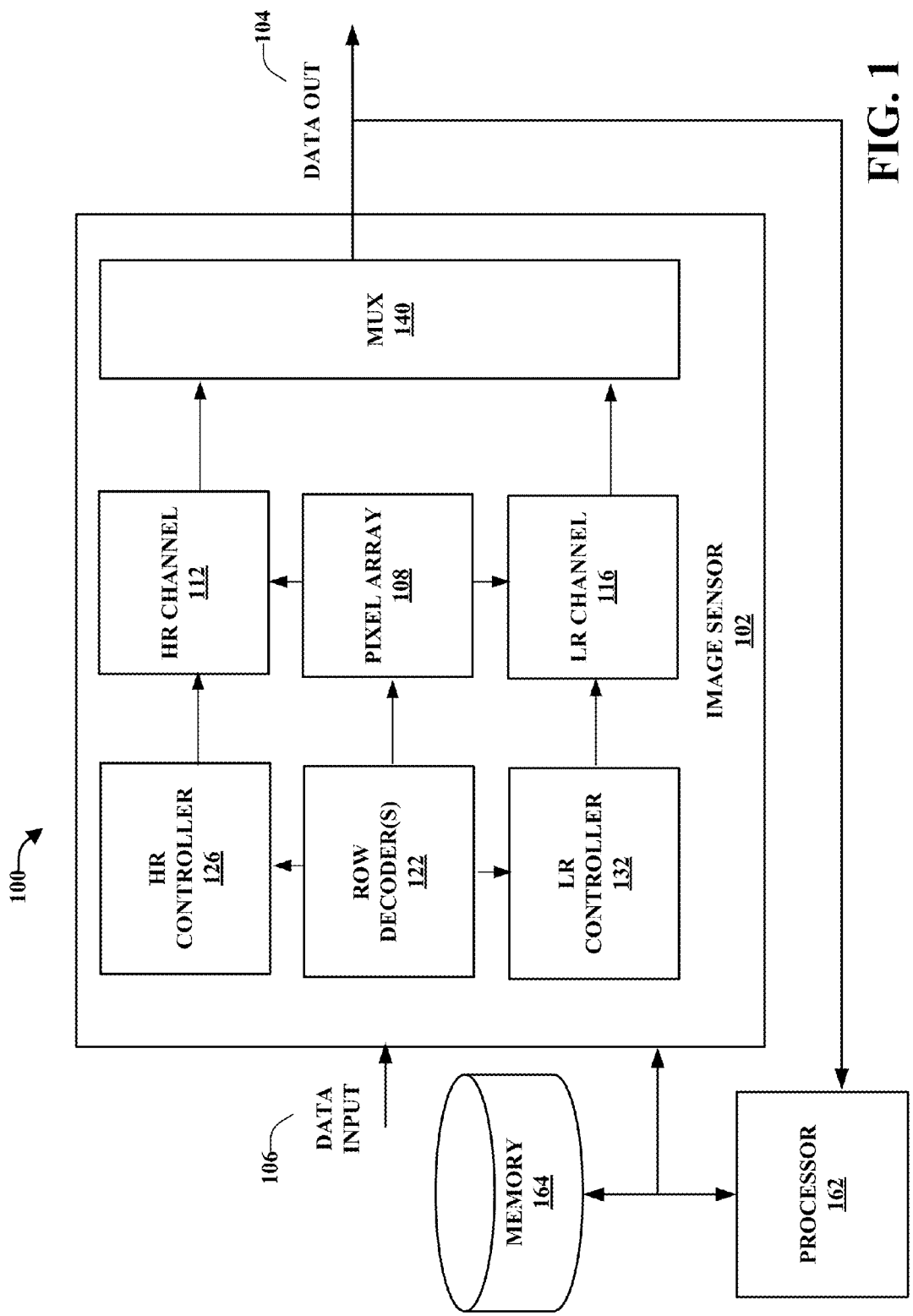
FIG. 1 illustrates an example functional block diagram of a system for image sensing in accordance with various embodiments.

Aspects of the subject disclosure will now be described more fully hereinafter with reference to the accompanying drawings in which example embodiments are shown, wherein like reference numerals are used to refer to like elements throughout. In the following description, for purposes of explanation, numerous specific details are set forth in order to provide a thorough understanding of the various embodiments. However, the subject disclosure may be embodied in many different forms and should not be construed as limited to the example embodiments set forth herein. It may be evident, however, that the various embodiments can be practiced without these specific details, e.g., without applying to any particular environment or standard. In other instances, well-known structures and devices are shown in block diagram form in order to facilitate describing the embodiments in additional detail.

Embodiments disclosed herein describe systems and methods that achieve improved signal-to-noise ratio (SNR), power, speed, and data-rate in sensor array readout. Two or more readout circuits, each configured, e.g., optimized, for different performance targets, can be utilized. A sensor array integrated with a high-resolution readout channel can be multiplexed to a small group of selected sensors for high-speed readout at low power budget while a full sensor array is captured by a compressive (e.g., a low-resolution) readout channel, which compromises SNR in exchange for high-speed, low-power, and low data-rate. The readout path for each sensor in the array can be electronically re-configured according to a desired configuration.

A compact body-biased transistor reset pixel structure with low reset noise is also disclosed. The compact body-biased transistor reset pixel can mitigate the need for CDS and achieve improved SNR for applications such as LDI. An energy efficient time-domain noise-averaging comparator can allow a SAR ADC to reach resolutions meeting a determined threshold defining a high resolution (e.g., close to 16 b). In an aspect, the SAR ADC can self-calibrate. The ADC can be compact and eliminates the need for analog pre-amplification, which would otherwise add noise to the readout chain. An ADC's power consumption and accuracy can be altered, at the same time, by incorporating bipolar input-independent error correction and mixed-signal CDS into a SAR ADC based on a pDAC. The pDAC scheme can be extended into multiple nested levels for power saving. A capacitor layout can mitigate or eliminated the error effects of parasitic capacitances on the pDAC operation. A mixed-signal CDS method can utilize the ADC's built-in capacitor array to cancel the ADC's input referred offset error without requiring additional digital or analog memories.

Various aspects disclosed herein relate to systems and methods that provide a sensory array with non-CDS random-access-reset pixels and multi-channel readout as well as a SAR ADC with forward error correction and mixed signal correlated-double-sampling. Such systems and methods can be suitable for a variety of applications, such as, for example, LDI, VLC, computer vision, robotics, and high-speed imaging. In various embodiments, a sensory array can provide high-fidelity readout and compressive readout channels and can re-configure readout paths for each sensor in the sensory array to facilitate flexible trade-off between performance metrics, such as power consumption, SNR, sensing speed, and data bandwidth.

In embodiments, a sensory array can be configured for forward error correction and mixed-signal CDS, for an SAR ADC with pDAC. In an aspect, the FEC's error correction range can be bipolar and input independent such that the SAR ADC's can compensate for device mismatch. The mixed-signal CDS can remove input offset by exploiting the SAR ADC's capacitor array such that additional amplifiers or memory are not needed. In an aspect, the pDAC can be extended to hierarchical implementations.

In an aspect, building a high SNR readout channel would have typically required either a high SNR amplifier coupled with an ADC with moderate quantization resolution or just a single ADC with very high quantization resolution. Both of these options can lead to high power-consumptions. Energy efficient architectures such as SAR ADCs have traditionally been limited to resolutions in the range of 7 b to 10 b due to limitations in device mismatch, noise, and circuit area. Embodiments disclosed herein can address these, as well as other, challenges and allow SAR ADCs to achieve high-resolutions in at least a 16 b region while maintaining energy consumption figure-of-merit (FoM) up to a target threshold.

To facilitate understanding of various embodiments disclosed herein, an analysis of the effect that noise PSD, $N_{tot}(v)$, has on perfusion, p is disclosed herein. In an aspect, the standard deviation of p, $\sigma_p$, can be given as a function of $$P_{N,tot} = \int_0^\infty N_{tot}(v)v = (1-\alpha)P_{N,w} + \alpha P_{N,1/f} \quad (1)$$

where $P_{N,tot}$ is the total noise at the input of the LDI function, $P_{N,1/f}$ is the 1/f noise power weighted by $\alpha$, and $P_{N,w}$ is the white noise power. In an aspect, if $\alpha=0$, $P_{N,tot}$ is entirely white it can be difficult to directly simulate $\sigma_p$ when $S(v)$ is set to zero. In another aspect, for large N (N is typically >256 for LDI), $S(0)$ can be considered to have very little variation, and the behavior of $\sigma_p$ can be estimated from the standard deviation of $\sigma_{M1}$, of various embodiments. $\sigma_{M1}$ can be a function of increasing total noise power, $P_{N,tot}$, at different ratios of $\alpha$. In an aspect, the value of $\sigma_{M1}$ increases at 40 dB/decade as $\sigma_{M1}^2$ is the fourth moment of the RMS voltage noise. In another aspect, white noise can have a larger impact on $\sigma_{M1}$ than 1/f noise. To achieve the same $\sigma_{M1}$, $P_{N,tot}$ must be larger (e.g., four times larger) for $\alpha=1$ than for $\alpha=0$. For instance, an LDI process equivalent of white noise RMS voltage, $v_{weq}$, can be estimated as $$v_{weq}^2 = v_{N,w}^2 + (v_{N,1/f}^2)/4 \quad (2)$$

where $v_{N,w}^2$ is the RMS voltage of $P_{N,w}$ and $v_{N,1/f}^2$ is the RMS voltage of $P_{N,1/f}$. In other words, $\sigma_{M1}$ can be significantly more sensitive to white noise sources due to thermal noise and ADC quantization noise. A measure of RMS noise voltage, $v_{rms,tot}$, can be defined as $$v_{rms,tot}^2 = v_{N,w}^2 + v_{N,1/f}^2 \quad (3)$$

The values of $\alpha$ can be estimated by taking two noise measurements: one with CDS ($v_{N,CDS}$) and one without CDS ($v_{N,nCDS}$), and applying:

$$v_{N,w}^2 = v_{N,CDS}^2/2 \quad (4)$$

$$v_{N,1/f}^2 = v_{N,nCDS}^2 - v_{N,w}^2 \quad (5)$$

$$\alpha = \frac{v_{N,1/f}^2}{v_{rms,tot}^2} \quad (6)$$

In another example, taking the $v_{weq}$ from the 5.3 μm (e.g., an exemplary pixel size used in various imaging arrays disclosed herein), degradation in LDI precision can be estimated by calculating the gain of $\sigma_{M1}$ after quantization noise (modeled as white) is added to a pixel's own noise power. Assuming quantization noise to be uniformly distributed across the quantization interval, $\delta_v$, and the quantization noise power, $P_{N,Q}$, can be estimated as $P_{N,Q}=\delta_v^2/12$. In an aspect, an ADC resolution of >12 b can be used in order to avoid any appreciable precision loss. If ADC resolution is reduced from 14 b to 10 b, the LDI precision can suffer a loss of more than 3.2 dB.

The effects of quantization noise due to low ADC resolution can be mitigated by placing high SNR analog amplification prior to the ADC stage. However, this approach shifts the design challenge from the ADC to the analog pre-amplifier, which still needs to pay the necessary costs in circuit area and power consumption to meet the same noise requirements. In another aspect, LDI sensors typically use large pixels. Large pixels are needed to measure when a limited laser source power is spread over a large imaging area. In various aspects, a 5.3 μm pixel pitch is utilized in examples for illustrative purposes. It is noted that other pixel pitches can be utilized. A LDI sensor's frame-rate, and to some extent its sensing accuracy (related to the number of FFT points), can be fundamentally limited by its ADC's sampling speed. Various embodiments disclosed herein provide an ADC with both high-speed and high-resolution at the same time within a reasonable power budget. In another aspect, various embodiments disclosed herein provide parallelization of the ADC into any array with the ADC having a limit size in order to fit inside a limited chip area. For instance, to achieve acceptable LDI performance in terms of sensing precision, speed, and accuracy, the sensor must use the largest possible pixel size (assuming same or better fill-factor) and its ADCs must be high-resolution (>12 b), must have a limited size (for parallelization), and meet other performance metrics, such as speed.

In conventional imaging applications, CDS is routinely used to suppress low-frequency noise and fixed pattern offset errors. CDS is, however, not always universally applicable to every application. Embodiments presented herein disclose pixel-reset designs that can eliminate the need for CDS under certain conditions.

A brief discussion will be made in the following paragraphs to show how CDS can have a detrimental effect on the sensing precision of the first moment in LDI. The velocity induced Laser Doppler shift of particle flow is calculated from the power spectrum, $S(v)$, of the back-scattered light. The particle concentration, c, and their perfusion, P, can be calculated from the zero$^{th}$, $M_0$, and first, $M_1$, moments respectively. For biomedical applications, 256 samples sampled at 40 kSa/s have been shown to provide sufficient spectral resolution. The conventional wisdom of the CDS process depicted is no longer valid when considering the weight of the first moment, $M_1$. Numerical analysis shows that when compared to the non-CDS case, CDS has a noise power gain of approximately 1.82 for 1/f noise. CDS can double the white noise power, the total noise power gain of CDS on $M_1$ should be between 1.82 and 2. Since $M_1$ is calculated directly from the PSD, its variance, $\sigma_{M1}^2$, is the fourth moment of the RMS voltage noise. Consequently the deterioration of precision in $M_1$ in terms of $\sigma_{M1}^2$ can be $<2^2$, or 6 dB.

For explanation, the detailed analysis of CDS and its implications on the LDI spectrum will be derived in the following paragraphs. The power spectral density (PSD) of the back-scattered light intensity signal, $S(v)$, is:

$$S(v)=|F(V_{sig}(i)|^2 \quad (7)$$

where F is the discrete Fourier transform (DFT) of the sampled light intensity signal $V_{sig}(i)$ over the time instances T, 2T, ..., iT, ..., NT. The moments of $S(v)$, $M_n$, are:

$$M_n = \sum_{v>0}^{F_s/2} v^n S(v) \quad (8)$$

The particle concentration, c, is proportional to the zero$^{th}$ moment:

$$c \propto M_0/S(0) \quad (9)$$

and the perfusion, P, is proportional to the first moment:

$$P \propto M_1/S(0) \quad (10)$$

In another aspect, let $X(\omega)$ be the pixel output PSD (discrete-time Fourier transform version of $S(v)$) with a response up to $F_s/2$ ($F_s$ is the sampling frequency) or $\pi$. The analog input to the ADC, $Y(\omega)$, is an up-sampled version of $X(\omega)$ modulated with 0.5, −0.5, 0.5 ..., or 0.5 cos($\pi n$). The quantized $Y(\omega)$ is passed though the CDS function, $$|H_{CDS}(\omega)|=|e^{-j\omega\tau}-1|=2 \sin(\omega\tau/2). \quad (11)$$

Quantization noise is lumped into the white part of the noise PSD, $N(\omega)$:

$$N(\omega)=N_f/\omega+N_o \quad (12)$$

Applying the first moment, $M_1$, to the 1/f noise power and taking into account that both the signal and its modulated image (centered at 0 and $2\pi$ respectively) fold into the post-CDS Nyquist band yields:

$$P_{f,CDS} = \frac{N_f}{2}\int_0^\pi \frac{2}{\omega} 4\sin^2\left(\frac{\omega}{4}\right)\omega\,d\omega + \frac{N_f}{2}\int_0^\pi \frac{2}{2\pi-\omega} 4\sin^2\left(\frac{\omega}{4}\right)\omega\,d\omega \quad (13)$$

The non-CDS case is simply $P_{f,non-CDS}=\pi N_f$ and $P_{f,CDS}/P_{f,non-CDS}\approx 1.82$.

While embodiments disclosed herein describe minimizing image sensor readout noise, ADC error, and power consumption are objects underlying certain implementations of the invention, it is noted that embodiments are not limited to systems that solve the problems noted herein.

Referring now to the drawings, with reference initially to FIG. 1, presented is a system 100 that can facilitate sensory readout in accordance with various aspects of this disclosure. Aspects of the systems, apparatuses or processes explained herein can constitute components embodied within machine(s), e.g., embodied in one or more machines. Such components, when executed by the one or more machines, e.g., computer(s), computing device(s), etc. can cause the machine(s) to perform the operations described herein.

System 100 can primarily include an image sensory component 102. Image sensory component 102 can comprise various components as described herein. As depicted, image sensory component 102 can primarily comprise a pixel array 108, a high-resolution (HR) readout channel 112, a compressive or low-resolution (LR) readout channel 116, a row detector(s) 122, a HR readout controller 126, a LR readout controller 132, a data output multiplexer (MUX) 140, a memory 164 that stores computer executable components and a processor 162 that executes computer executable components stored in the memory 164. It is noted that the system 100 can comprise more or different components to facilitate aspects disclosed herein. Moreover, while components are depicted as separate components, it is noted that the components can be comprised in one or more devices, in a single device, across devices, and the like. System 100 can be comprised in devices, such as in the form of an on-chip image sensor of in personal computers, servers, rack servers, laptop computers, tablet computers, smart phones, personal digital assistants, and the like.

In various aspects, pixel array 108 can comprise an array of sensory pixels. Such as an array of 128×208 pixels or the like. It is noted that the array can be of virtually any size and reference to a particular size is for illustrative purposes. It is further noted that pixel array 108 may be arranged in pixel blocks of determined sizes. In various embodiments, each pixel can comprise a photo detector (e.g., pinned photodiode, etc.), a floating diffusion, a transfer gate, a reset gate, a selection gate, and a source follower readout transistor. In at least one embodiment, a pixel can include in-pixel reset logic that can facilitate random-access-reset capability. As described in more detail herein, in-pixel reset logic can include NAND logic composed of a pull-up load, a N-type metal-oxide-semiconductor (NMOS) transistor (having a gate controlled by a horizontal reset signal (RSTm)), and an NMOS transistor (having a gate controlled by a vertical reset signal (RSTn)).

Row decoder(s) 122 can select rows of pixels from pixel array 108. In various embodiments, row decoder(s) 122 can randomly or semi-randomly select rows (e.g., non-overlapping rows). In embodiments, one or more rows can be selected simultaneously or within a threshold amount of time. For example, four non-overlapping rows can be selected at a common time. Row decoder(s) 122 can change an activation status of rows of pixels (e.g., active or non-active), such as via row drivers or activation signals. In an aspect, reset signals (e.g., RSTm and RSTn) can enable random access of a pixel within pixel array 108. Accordingly, pixels associated with different readout channels can be reset at different rates.

HR channel 112 can comprise a set of HR ADCs and associated MUX components. HR controller 126 can control the MUX components to enable connection paths associated with MUX components and associated pixels. In an aspect, each ADC can be multiplexed to one pixel in a pixel block. In various embodiments, HR controller 126 can determine whether to operate in a CDS mode (i.e., CDS enabled) or a non-CDS mode (i.e., CDS disabled). In a CDS mode, pixels are sampled after pixel reset and at the end of exposure. In a non-CDS mode, pixels can be sampled at the end of exposure without being sampled after pixels are reset.

LR channel 116 can read out values of pixels, representing non-overlapping pixel blocks of pixel array 108, independently to the HR channel 112. In an embodiment, LR channel 116 can comprise a set of compressive or LR readout MUX components that can read values associated with the pixels. LR controller 132 can control the LR readout MUX components to selectively readout or enable a select group of paths at any given time. In an aspect, LR channel 116 can comprise LR ADC components, such as 16 parallel LR ADC components. MUX 140 can select data received from HR channel 112 and LR channel 116 to output (e.g., DATA OUT 104).

Processor 162 can be coupled to image sensory component 102. In an embodiment, processor 162 can receive data output 104 from various components of image sensory component 102 (e.g., such as HR channel 112 or LR channel 116 multiplexed by MUX 140). Processor 162 can facilitate execution of computer executable components to process data output 104. In embodiments, processor 162 can reconfigure HR controller 126 and the LR controller 132 to alter modes of operation. For example, processor 162 can switch mode of operation to facilitate adaptation (or optimization) of the quality of captured data and various other performance metrics. For instance, processor 162 can redefine a region of interest (ROI) or region of selection for the HR channel 112 or LR channel 116. While two data channels are depicted in FIG. 1, it is noted that system 100 can comprise additional channels or sub-channels. Each channel can be associated with one or more controllers and processor 162 can alter or instruct controllers to alter a mode of operation. For instance, the control loop described herein can be generalized for systems of any number of data channels and their associated controllers.

Figure 2:
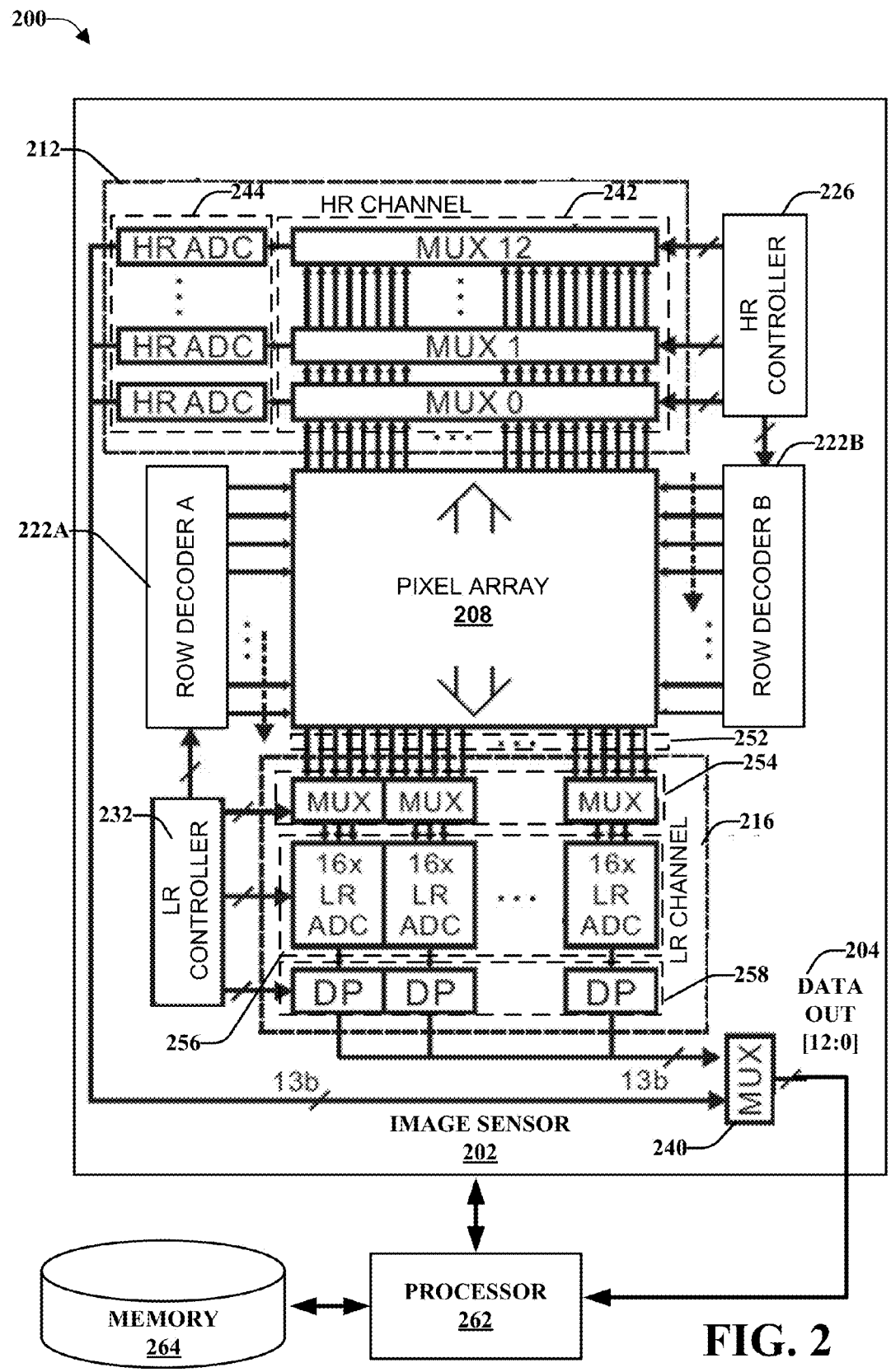
FIG. 2 illustrates an example functional block diagram of a system for image sensing comprising a sensory array and high and low readout channels in accordance with various embodiments.

Referring now to FIG. 2, with reference to FIG. 1, presented is a system 200 depicting an image sensory component 202 (e.g., image sensory component 102) in greater detail. Image sensory component 202 can comprise various components as described herein. As depicted, image sensory component 202 can primarily comprise a pixel array 208, a high-resolution (HR) readout channel 212, a compressive or low-resolution (LR) readout channel 216, a row detector(s) 222A and 222B, a HR readout controller 226, a LR readout controller 232, a data output multiplexer (MUX) 240, a memory 264 that stores computer executable components and a processor 262 that executes computer executable components stored in the memory 264. It is noted that the system 200 can comprise more or different components to facilitate aspects disclosed herein. Moreover, while components are depicted as separate components, it is noted that the components can be comprised in one or more devices, in a single device, across devices, and the like. System 200 can be comprised in devices, such as in the form of an on-chip image sensor in personal computers, servers, rack servers, laptop computers, tablet computers, smart phones, personal digital assistants, and the like. It is noted that like named components of FIGS. 1 and 2 can perform or comprise substantially similar functionality unless context suggests otherwise.

As depicted, HR readout channel 212 can comprise a set of MUX components 242. MUX components 242 can multiplex pixels of a pixel block of pixel array 208 to HR ADCs 244. HR controller 226 can control MUX components 242 to activate or deactivated switches that enable connection paths. In an embodiment, HR controller 226 can be configured to activate one or more connection paths at a time. HR ADCs 244 can convert analog signals to digital signals as described in more detail herein. For instance, HR ADCs 244 can sample HR readouts received from MUX components 242 by sampling switches. In another aspect, HR ADCs 244 can quantize signals using compactor feedback to a DAC output and storing it in a SAR. In various embodiments, HR ADCs 244 can generate bits of data (e.g., 19 bits of data) for each sample. It is noted that the generated bits of data can include redundancy bits. As described herein, CDS can be enabled or disabled.

LR readout channel 216 can receive data from pixel array 208, such as via column outputs 252. In various embodiments, column outputs 252 can comprise groups of consecutive column outputs representing non-overlapping pixel blocks that are multiplexed to LR channels 216, such as via a set of MUX components 254. MUX components 254 can multiplex pixels of a pixel block of pixel array 208 to LR ADCs 256. LR ADCs 256 can be configured in parallel. In another aspect, each LR ADC of LR ADCs 256 can comprise comparators, DACs, and SARs that provide different quantization resolutions in comparison with HR ADCs 244. The different quantization resolutions can be utilized to configure speed and power consumption of system 200.

LR controller 232 can control MUX components 254. For instance, MUX components 254 can comprise a number of switches (e.g., analog switches) that can enable communication paths. LR controller 232 can selectively activate one or more groups of communication paths at a given time. In various embodiments, LR ADCs can be configured to output data to a bit-serial digital processor from MSB to LSB. A digital processor can digitally compress pixel blocks. For example, system 200 can be utilized in a VPIC system.

Processor 262 can select or facilitate selection of any combination of data output 204 from the HR ADC 244 or LR digital processor (DP 258) multiplexed by MUX 240. In an aspect, processor 262 can determine whether to alter a state or mode of system 200 based on analysis of the selected data output 204. For instance, processor 262 can reconfigure the HR controller 226 and the LR controller 232 to put the system 200 into a new mode of operation or switch between modes in order to adapt (or optimize) the quality of captured data and various other performance metrics. For instance, processor 262 can determine whether to alter a mode of operation based on a desired application of system 200, a desired level of image resolution, or the like. In some embodiments, system 200 can include a control path that couples processor 262 directly to LR controller 232 and a control path that couples processor 262 directly to HR controller 226. While two data channels are depicted in system 200, it is noted that a different number of data channels and controllers can be utilized. In another aspect, the control loop described herein can be generalized for systems of any number of data channels and their associated controllers.

Figure 3:
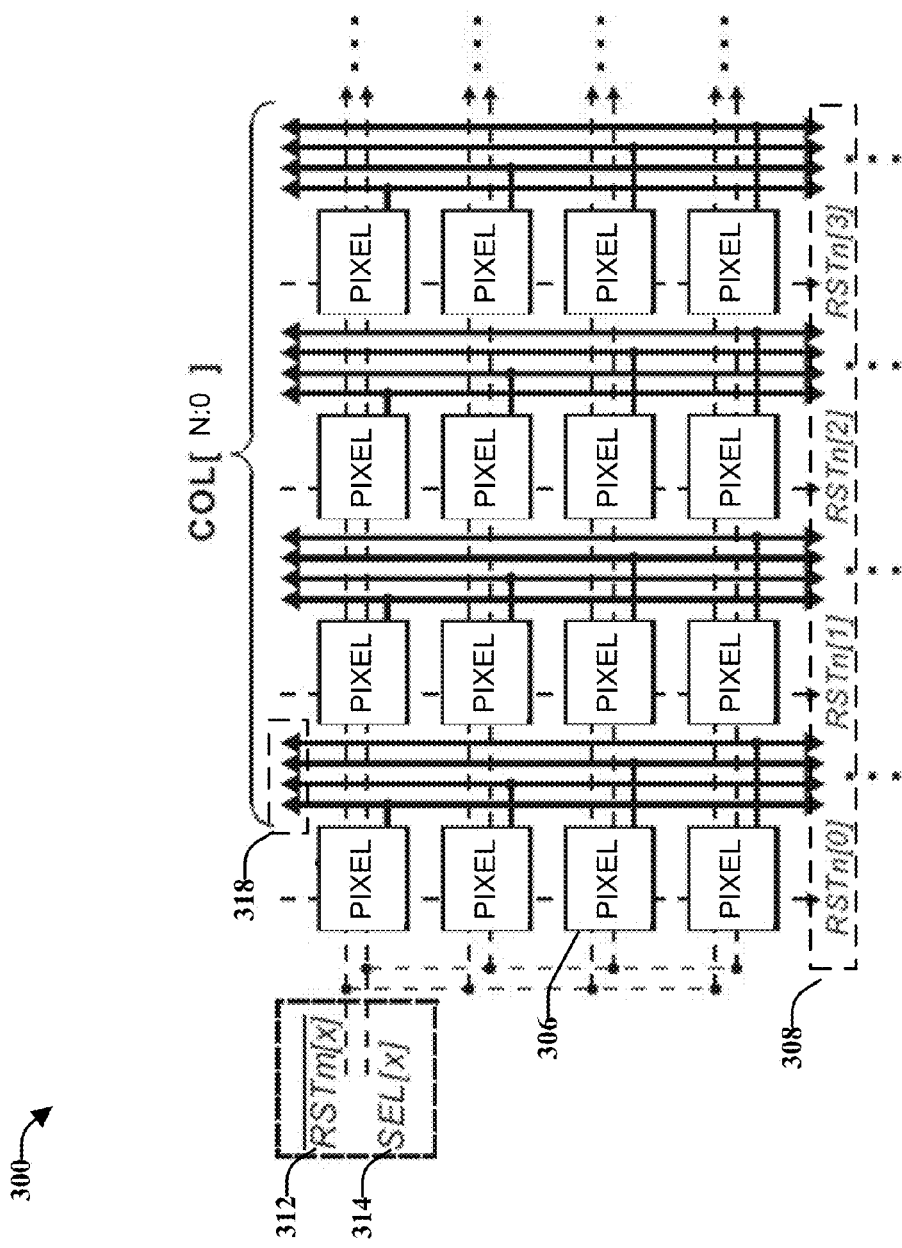
FIG. 3 illustrates an example functional block diagram of a system comprising a pixel array in accordance with various embodiments.

Turning to FIG. 3, there depicted is a high-level diagram of a system comprising a pixel array 300 according to embodiments of this disclosure. In an aspect, pixel array 300 can comprise pixel array 108, 208, or the like. In various aspects, pixel array 300 can comprise a portion of a larger pixel array, a different number of pixels, or the like. For instance, pixel array 300 can be a portion (e.g., 4×208 pixel block) of a larger pixel array, such as a 128×208 pixel array. In embodiments, pixel array can comprise a number of pixels (e.g., pixel 306) that are arranged in rows and columns. It is noted that other arrangements can be utilized. For sake of brevity, embodiments describe pixels arranged in rows and columns herein.

In embodiments, pixel array 300 can utilize block read structures where non-overlapping rows are selected at a time via a row decoder (e.g., row decoder(s), 122, 222A, 222B, etc.). For example, a row decoder can supply signals SEL[x] 312 and RSTm[x] 314. A pixel (e.g., pixel 306) can be selected from pixel array 300. For instance, pixels can be, multiplexed at column outputs (e.g., column output 318). Signal pairs, such as RSTm[x] 314 and RSTn[y] 308 can be utilized for addressing of a single pixel of pixel array 300. It is noted that the pixels can be randomly selected based on signal pairs. In an aspect, this allows pixels belonging to different readout channels to be reset at different rates or times.

Figure 4:
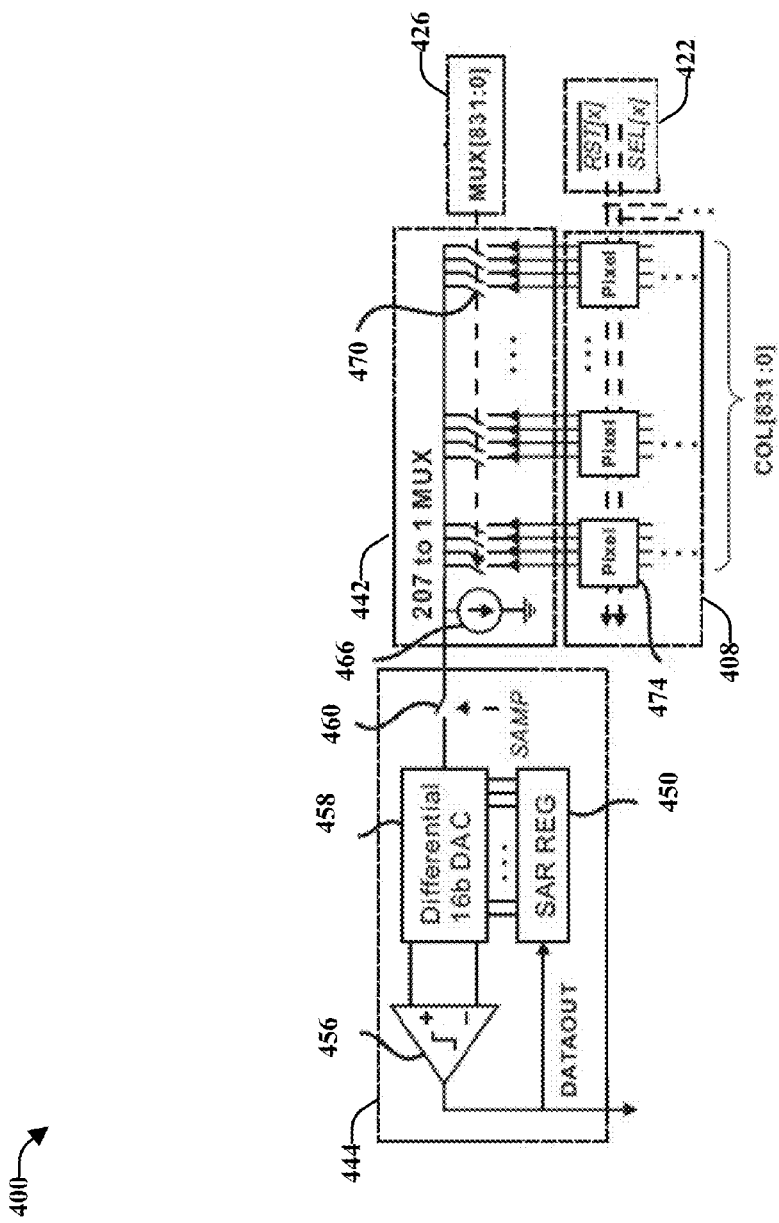
FIG. 4 illustrates an example functional block diagram of a system comprising a high-resolution readout channel in accordance with various embodiments.

Turning to FIG. 4, presented is a system 400 that can provide for an HR channel in accordance with various embodiments of the subject disclosure. In an aspect, system 400 can primarily comprise pixel array 408 (which can include an array of pixels (e.g., pixel 474)), a row decoder 422, a HR controller 426, a MUX(s) 442, and an ADC(s) 444. It is noted that the system 400 can comprise more or different components to facilitate aspects disclosed herein. Moreover, while components are depicted as separate components, it is noted that the components can be comprised in one or more devices, in a single device, across devices, and the like. It is further noted that like named components of FIGS. 1-3 can perform or comprise substantially similar functionality unless context suggests otherwise.

In embodiments, ADC 444 is multiplexed from a pixel (e.g., pixel 474) or a pixel block by MUX 442. For example, each ADC 444 of a set of ADCs can (e.g., 13 ADCs) be multiplexed to one pixel of a block of a particular size (e.g., 4×208). MUX 442 can comprise a series of switches 470 (e.g., analog switches) controlled by HR controller 426 to enable a connection path at a determined time. In some embodiments, HR controller 426 can be configured to only enable one path at any time. An output source follower circuit can be completed by current source 466. The ADC 444 samples the output of MUX 442 by sampling switch 460 and quantizes the signal via a comparator 456 feedback received by a DAC 458 output and storing it in SAR 450. ADC 444 can generate, for example, 19 bits of data (including redundancy bits) for each sample. It is further noted that CDS can be enabled or disabled according to a desired mode of operation.

Figure 5:
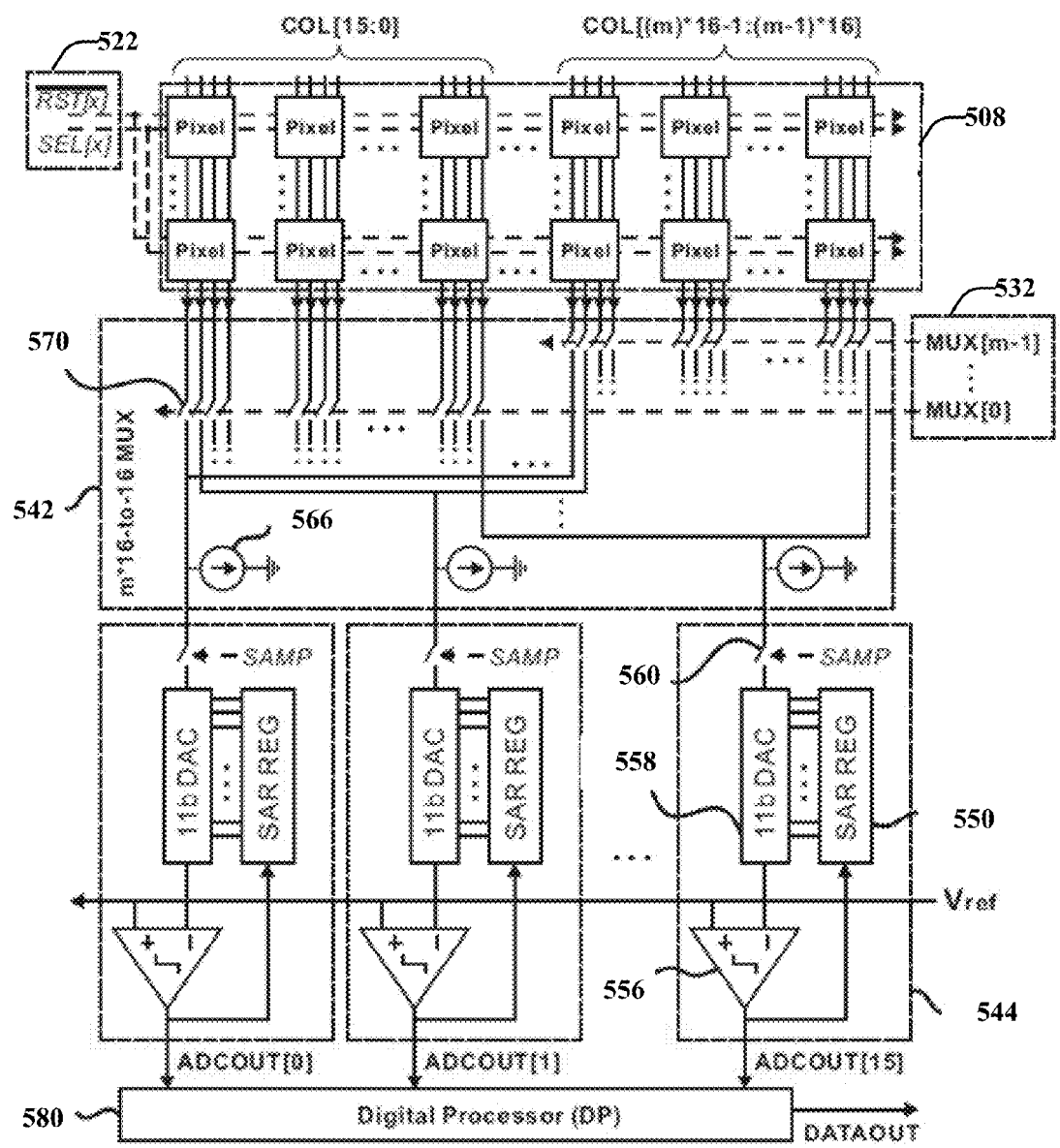
FIG. 5 illustrates an example functional block diagram of a system comprising a low-resolution readout channel in accordance with various embodiments.

Turning to FIG. 5, presented is a system 500 that can provide for a LR channel in accordance with various embodiments of the subject disclosure. In an aspect, system 500 can primarily comprise pixel array 508, a row decoder 522, a LR controller 532, a MUX(s) 542, an ADC(s) 544, and a digital processor (DP) 580. It is noted that the system 500 can comprise more or different components to facilitate aspects disclosed herein. Moreover, while components are depicted as separate components, it is noted that the components can be comprised in one or more devices, in a single device, across devices, and the like. It is further noted that like named components of the various embodiments can perform or comprise substantially similar functionality unless context suggests otherwise.

In various embodiments, groups of 16 consecutive column outputs are multiplexed to each LR channel by MUX(s) 542. Switches 570 (e.g., analog switches) can be controlled by a LR controller 532. In an aspect, LR controller 532 can enable a select group of paths at any time. The output source follower circuit is completed by a current source 566. A LR channel can further comprise a set of parallel ADCs (e.g., ADC 544), such as a set of sixteen parallel ADCs. ADC 544, for example, can comprise a comparator 556, a DAC 558, a SAR 550, and a sampling switch 560. SAR 550 can generate different quantization resolution in comparison with an HR ADC. The different quantization resolutions can be utilized to positively affect (e.g., optimize) speed, power consumption, or other metrics. ADC 544 can output to a DP 580, such as via a bit-serial DP from an MSB to an LSB. DP 580 can digitally compress a pixel block via various algorithms or processes (e.g., VPIC).

In an embodiment, image compression can be based on statistical rank ordering of pixel values among pixel blocks. In such embodiments, power can be saved via ADC 544. For example, ADC 544 can utilize a (e.g., MSB to LSB) statistical filter. In an aspect, each ADC of a system that are servicing a pixel block can comprise outputs (e.g., digital output) connected to input of the statistical filter. In another aspect, the statistical filter can receive quantization results in a bit-serial fashion. For instance, during a bit-wise quantization process, outlier values can be discarded and corresponding ADCs can be turned off to reduce power consumption. Only ADCs corresponding to the desired rank result need to be fully powered during the quantization cycle.

Figure 6:
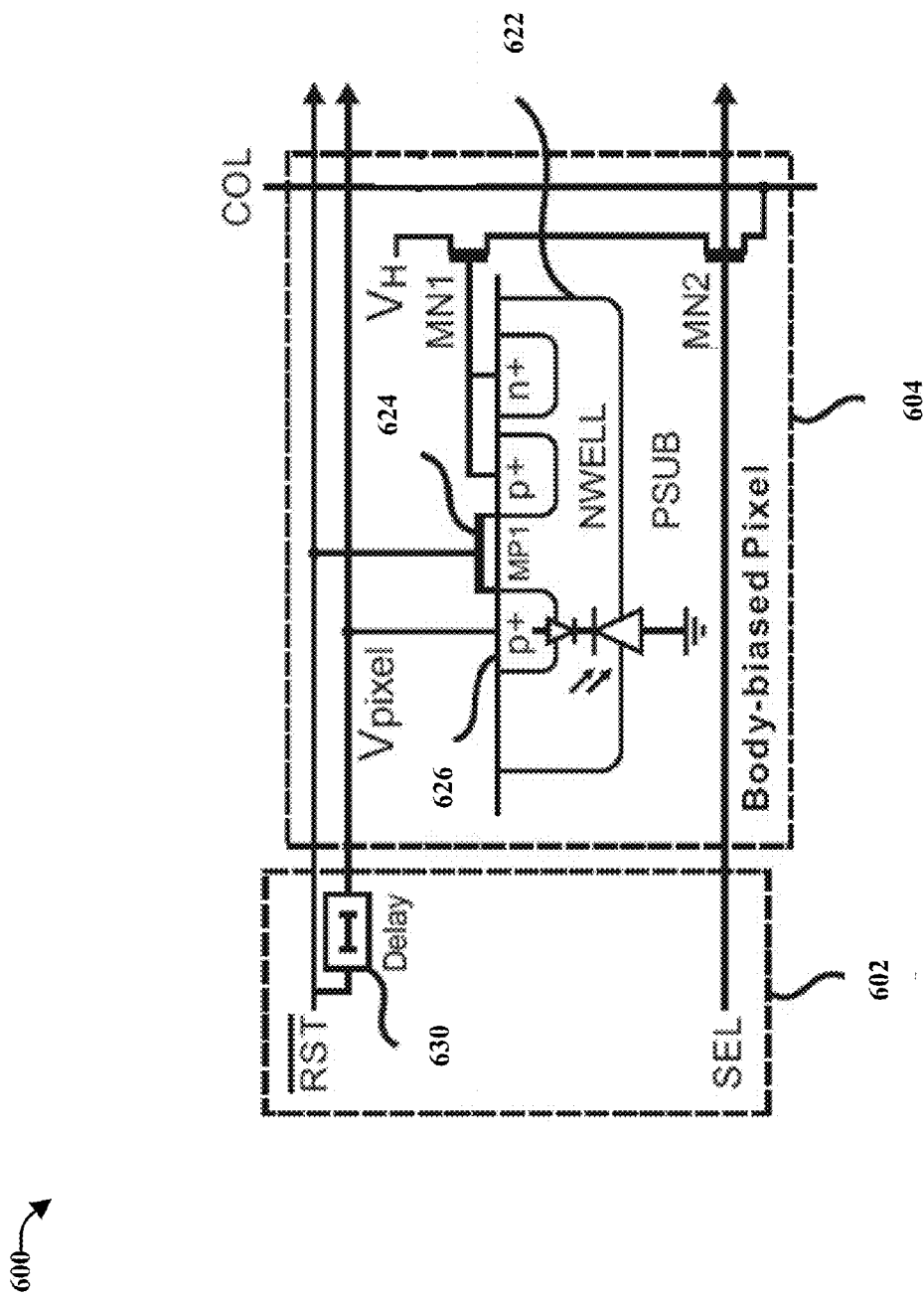
FIG. 6 illustrates an example functional block diagram of a system comprising a pixel in accordance with various embodiments.

Turning to FIG. 6, presented is a system 600 that can provide a pixel in accordance with various embodiments of the subject disclosure. In an aspect, system 600 can comprise a pixel 604 of a pixel array (e.g., pixel array 108, 208, 300 or the like) and a row decoder 602. In an aspect, pixel 604 can be a body-biased pixel. In various aspects, pixel 604 can comprise various other components or configurations not shown for readability. Pixel 604 can be coupled to row decoder 602 (e.g., row decoder(s), 122, 222A, 222B, etc.) and various other components.

Pixel 604 can comprise a photo-diode 622 (e.g., a NWELL-Psub (or n-well) photo diode). In an aspect, photo-diode 622 can be relatively large to enable high sensitivity and SNR photo-detection. A reset transistor 624 (e.g., a P-type metal-oxide-semiconductor (PMOS) reset transistor in an N+-implant-P-substrate photodiode, an NMOS reset transistor in a P+-implant-N-substrate photodiode, etc.) can be placed within the photo-diode 622, as depicted. In this aspect, the pixel can be compact leading to a reduced physical space need for a pixel array. It is noted that reset transistor 624 can eliminate or reduce image lag between samples and can ensure all photo-diodes are operating at the same bias point with similar charge-to-voltage gains. It is further noted that a pixel with a PWELL (or p-well) photo-diode and a similar body-biased transistor reset pixel structure can comprise an NMOS reset transistor instead of a PMOS reset transistor.

Figure 7:
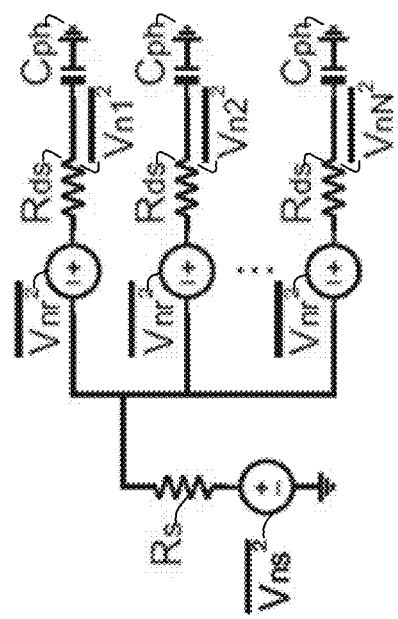
FIG. 7 illustrates an example functional block diagram of a system illustrating pixel reset noise in accordance with various embodiments.

Turning to FIG. 7, with reference to FIG. 6, there illustrated is an exemplary system 700. A noise source contributing to pixel reset noise can be given as, $\overline{v_{ni}^2}|_{i \in 1, 2, \ldots, N}$. The ratio of the source impedance, $R_s$, to the reset transistor 624's drain-to-source impedance, $R_{ds}$, play a critical role in determining the value of $\overline{v_{ni}^2}$. It can be shown that for a N pixel system:

$$\overline{v_{ni}^2} = \frac{kT}{C_{ph}} \left( \frac{R_s + R_{ds}}{NR_s + R_{ds}} \right) \quad (14)$$

If $R_{ds} \ll NR_s$, the source impedance, $R_s$, effectively sees N capacitors connected in parallel and $kT/C_{ph}$ is reduced by a factor of N. If $Rd_{ds} \gg NR_s$, then each pixel sees an independent noise source dominated by $R_{ds}$. In conventional pixels with NMOS reset, where a PMOS resist transistor is replaced with an NMOS transistor, the NMOS reset transistor spends most of the reset phase in cut-off region, and the reset noise can be shown by temporal analysis to be approximately $kT/2C_{ph}$. The disclosed PMOS reset can have an advantage when $R_{ds} < NR_s$. A 0.22 µm wide and 0.3 µm long 3.3 V PMOS transistor in Global Foundries 0.18 µm process has a $R_{ds}$ of 14.6 kΩ. If $R_s$=100Ω, then $\overline{v_{ni}^2} < kT/2C_{ph}$ when N>146. It is noted that low-frequency noise sources are not described here as the LDI operation inherently discriminates against them, however, various embodiments can utilize low-frequency noise sources.

In an aspect, burying a PMOS resist transistor in a photo-diode NWELL can result in the parasitic diode 626 becoming forward biased between the source and body of reset transistor 624. For instance, parasitic diode 626 becomes forward biased when the photo-diode 622 voltage is discharged beyond its on-voltage. However, as depicted in FIG. 6, a reset voltage ($V_{pixel}$) can be pulled to ground with a time delay 630 after reset transistor 624 is turned off by $\overline{RST}$ from row decoder 602. In this way, the parasitic diode 626 can be reverse biased during photo-integration.

Figure 8:
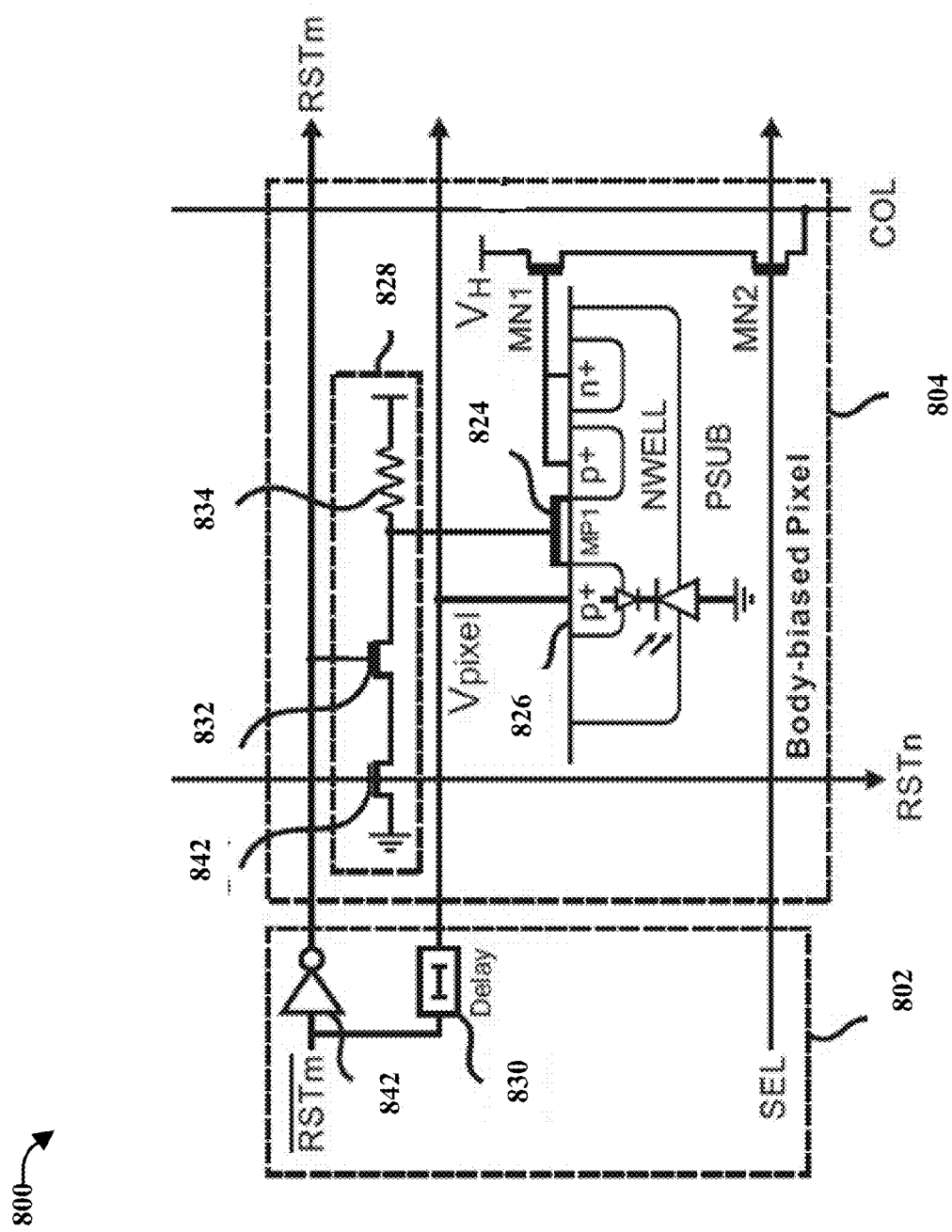
FIG. 8 illustrates an example functional block diagram of a system comprising a pixel with random-access-reset capability in accordance with various embodiments.

FIG. 8 depicts a system 800 that can provide a pixel with RAR capability in accordance with various embodiments of the subject disclosure. In an aspect, system 800 can comprise a pixel 804 of a pixel array (e.g., pixel array 108, 208, 300 or the like) and a row decoder 802. In an aspect, pixel 804 can be a body-biased pixel. In various aspects, pixel 804 can comprise various other components or configurations not shown for readability. Pixel 804 can be coupled to row decoder 802 (e.g., row decoder(s), 122, 222A, 222B, etc.) and various other components. Pixel 804 can be a pixel of a pixel array in accordance with various aspects disclosed herein. It is noted that other arrangements can be utilized. For sake of brevity, embodiments describe pixels arranged in rows and columns herein.

In embodiments, pixel 804 can be a body-biased pixel with RAR capability enabled via pixel reset component 828. For instance, pixel reset component 828 can comprise a NAND logic comprising pull-up load resistor 834, an NMOS transistor 832 whose gate is controlled via a horizontal reset signal (RSTm), and another NMOS transistor 842 whose gate is controlled by the vertical reset signal (RSTn). The signal pair RSTm and RSTn can enable random addressing of any single pixel in a pixel array (e.g., a 2D pixel array). It is noted that other signals can be utilized according to a desired pixel array (e.g., a 3D pixel array). The gate of a reset photo-diode 824 can be pulled low only when both RSTm and RSTn are high. The RAR feature enabled by pixel reset component 828 that can allow pixels belonging to different readout channels to be reset at different rates.

Figure 9:
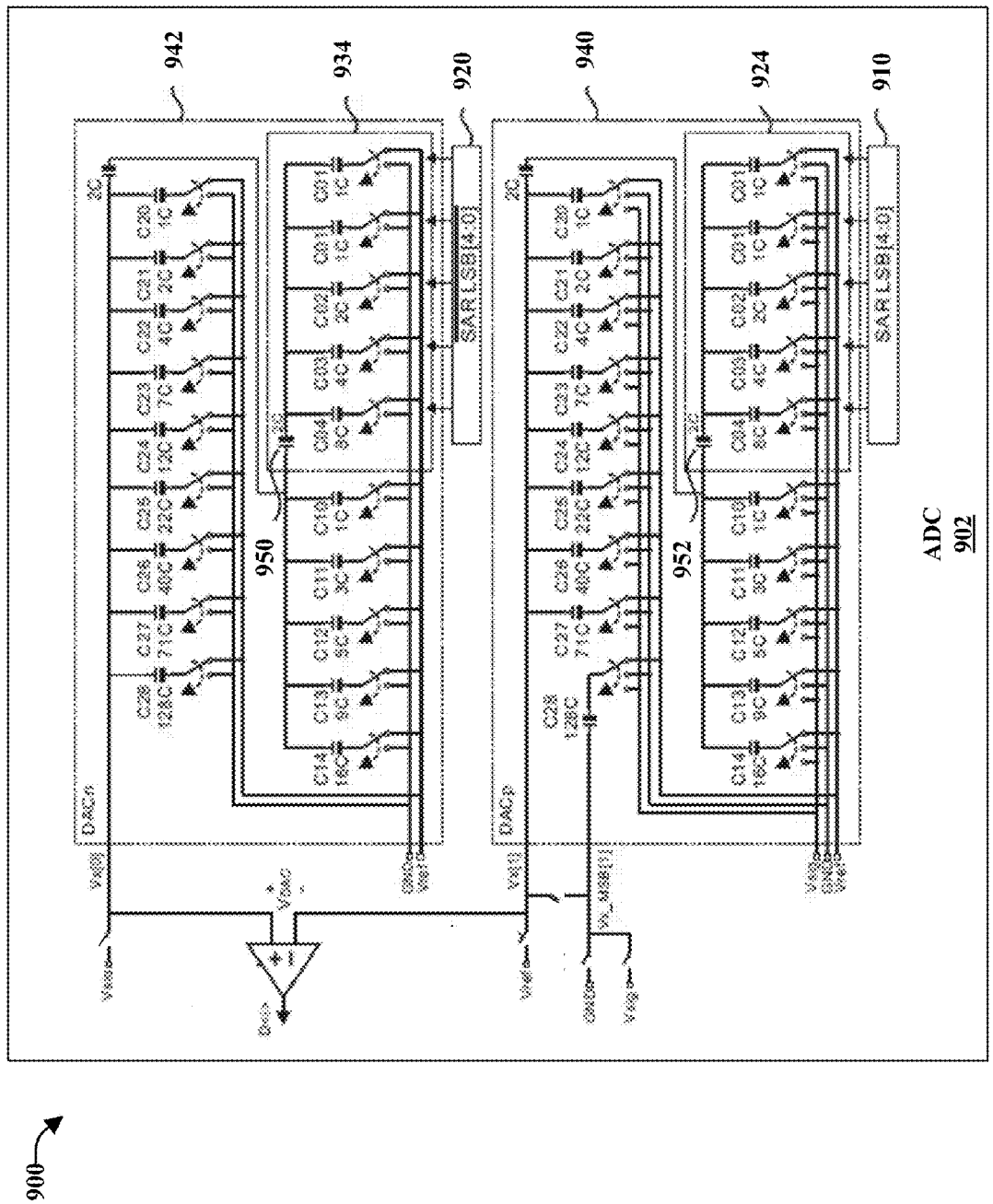
FIG. 9 illustrates an example functional block diagram of a sensory system comprising SAR ADC in accordance with various embodiments.

FIG. 9 presents a system 900 that can provide an HR ADC in accordance with various embodiments of the subject disclosure. As depicted, system 900 can be an HR ADC 902 in a 16 b embodiment. It is noted that other bit embodiments can be utilized. For instance, system 900 can be a portion of a larger system (e.g., system 100, 200, etc.). It is noted that other arrangements can be utilized. It is further noted that system 900 can comprise various other components or configurations not shown for readability.

In at least one embodiment, system 900 can comprise ADC 902. ADC 902 can comprise a differential sub-radix-2 DAC comprising a positive DAC (DACp 940) and a negative DAC (DACn 942). DACp 940 and DACn 942 can each comprise a determined number of weights. The weights can be partitioned or split into sections. For instance, DACp 940 and DACn 942 can each comprise nineteen weights and split into three sections. In another aspect, an MSB array can be sized so $kT/C \approx 1LSB_{rms}$. A unit capacitor can be a 5 um×5 um 28 fF MIM capacitor. In such embodiments, DACn 942 can comprise an LSB DAC 934. LSB DAC 934 can be driven by a SAR LSB 920 (e.g., SAR LSB[4:0] from SAR LSB 920). DACn 942 can further comprise a capacitor array connected to an MSB DAC via a bridge capacitor 950. In another aspect, DACp 940 can comprise LSB DAC 924 that can be driven by a SAR LSB 910 (e.g., SAR LSB[4:0] from SAR LSB 910). DACp 940 can further comprise a capacitor array connected to an MSB DAC via a bridge capacitor 952.

Figure 10:
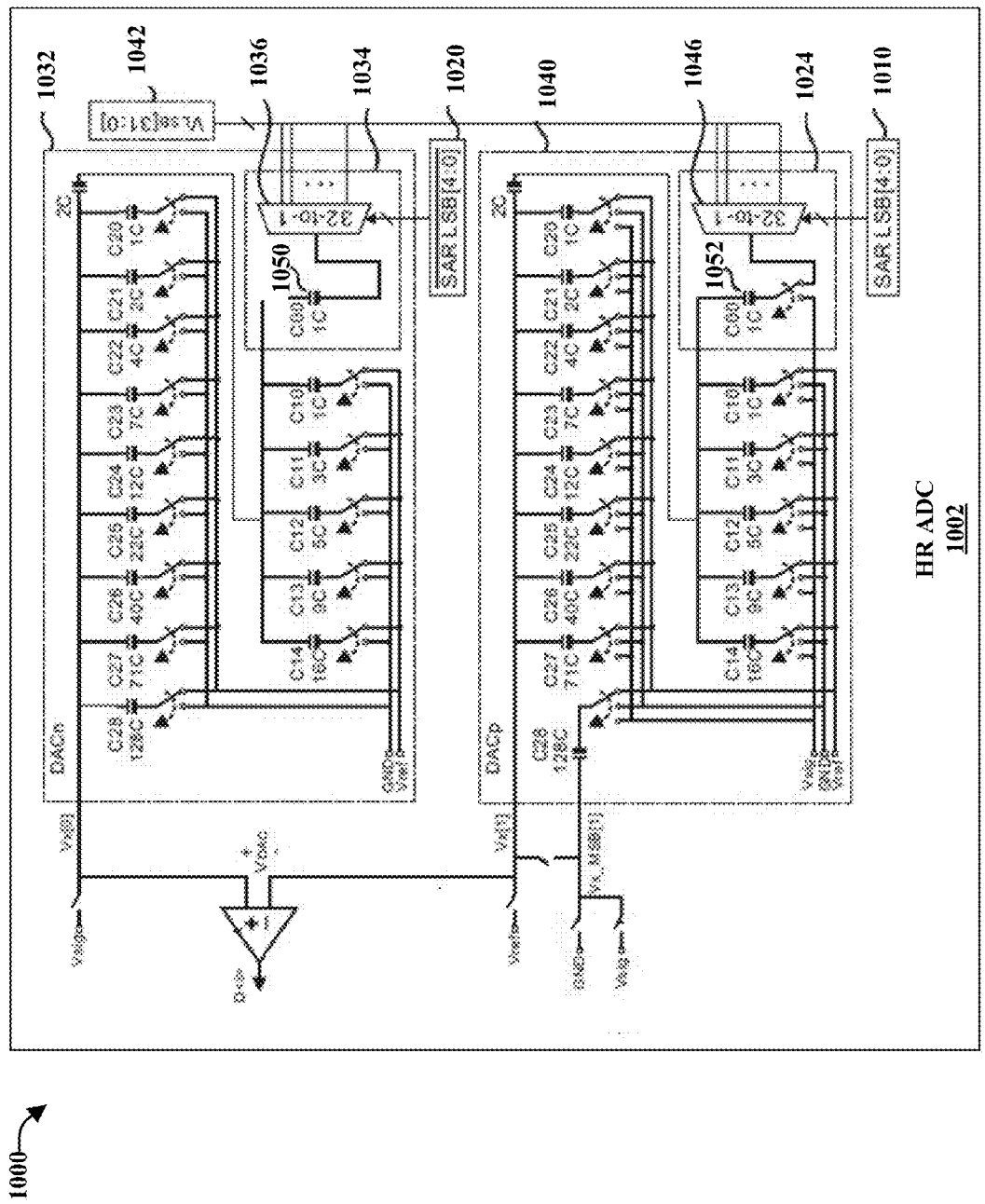
FIG. 10 illustrates an example functional block diagram of a sensory system comprising SAR ADC and an alternative least significant bit selection in accordance with various embodiments.

FIG. 10 depicts a system 1000 that can provide an HR ADC in accordance with various embodiments of the subject disclosure. As depicted, system 1000 can comprise an HR ADC 1002 such as in a 16 b embodiment. It is noted that various other bit embodiments can be utilized. For instance, system 1000 can be a portion of a larger system (e.g., system 100, 200, etc.). It is noted that other arrangements can be utilized. It is further noted that system 1000 can comprise various other components or configurations not shown for readability.

Figure 11:
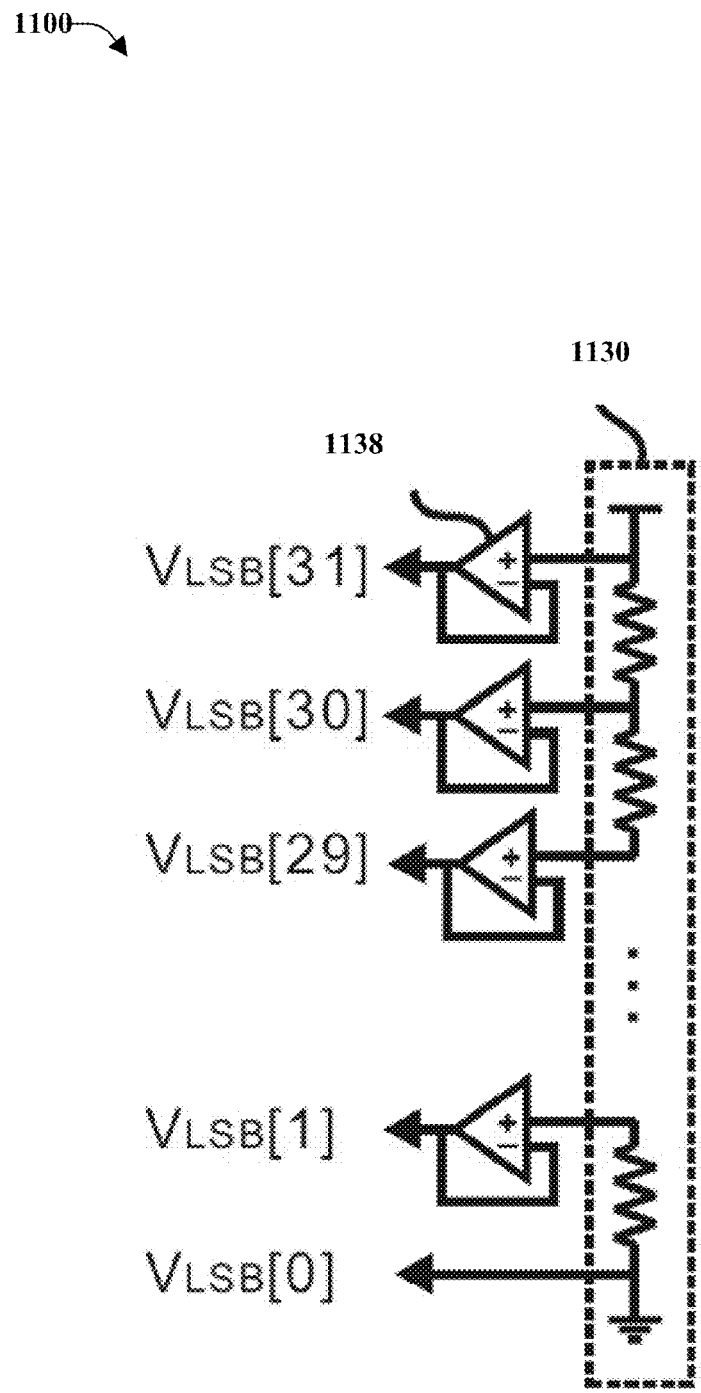
FIG. 11 illustrates an example functional block diagram of a sensory system comprising a reference generator of an SAR ADC in accordance with various embodiments.
Figure 12:
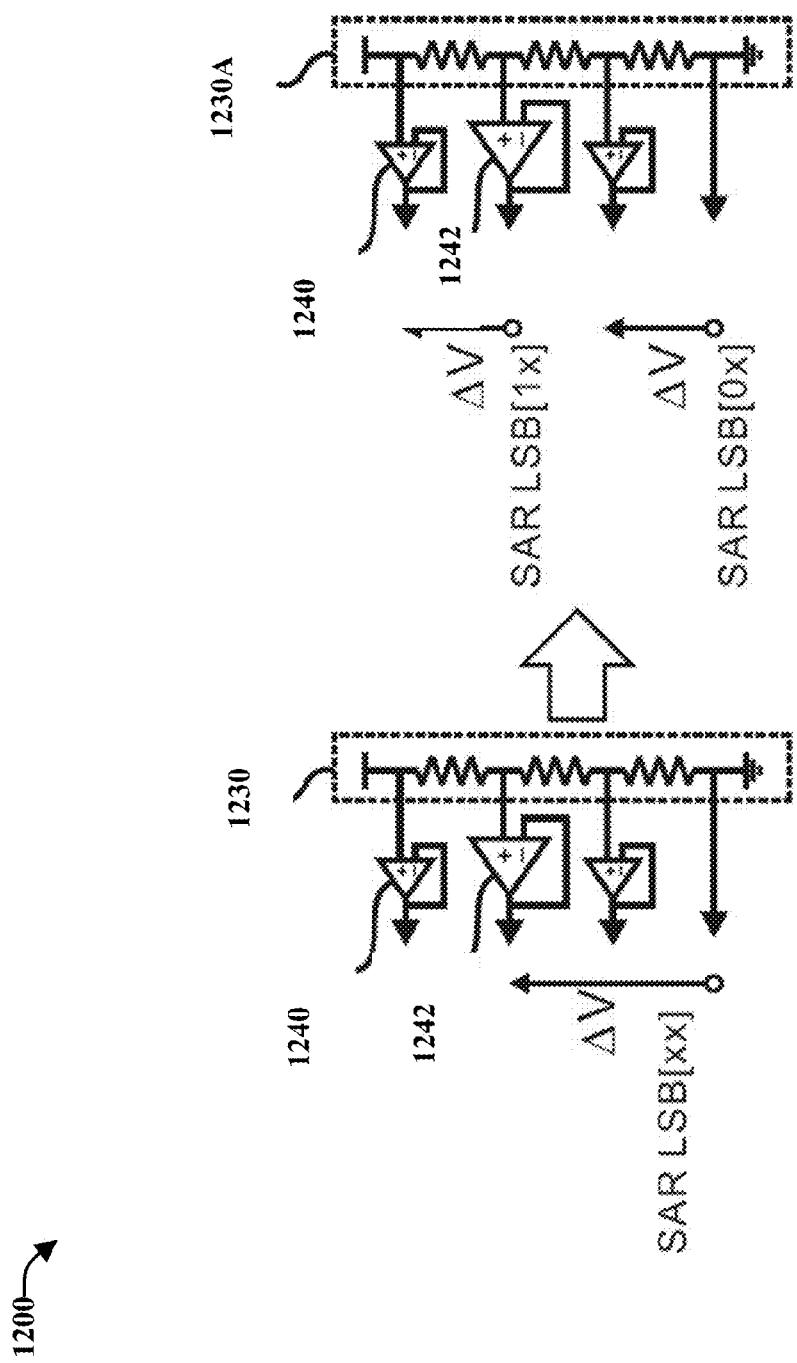
FIG. 12 illustrates an example functional block diagram of a sensory system comprising reference generator of an SAR ADC of a two bit system in accordance with various embodiments.

In an embodiment, LSB DAC 1034 can comprise a bridge capacitor 1050 and an analog MUX 1036. A $V_{LSB}[31:0]$ (e.g., one of thirty-two $V_{LSB}[31:0]$) LSB reference voltages 1042 can be chosen by SAR LSB[4:0] from SAR LSB 1020. The reference voltages can be generated by a resistor with an analog LSB buffer. For example, with reference to FIGS. 11 and 12, there depicted are systems 1100 and 1200. Systems 1100 and 1200 can generate reference voltages, such as via resistor latter or analog buffers. As shown in FIG. 11, reference voltages can be generated via a resistor ladder 1130 with an analog buffer 1138. In another aspect, the buffers can be sized according to desired voltage step size requirements associated with each bit decision to alter (i.e., optimize or substantially optimize) power consumption. A two bit embodiment of this concept is shown in FIG. 12 via resistor ladder 1230. An analog buffer 1240 with a smaller size and power consumption can be used for small voltage steps while an analog buffer 1242 with a relatively larger size and power consumption can be used for larger voltage steps. For example, resistor latter 1230A depicts an example of resistor latter 1230 in operation.

Figure 13:
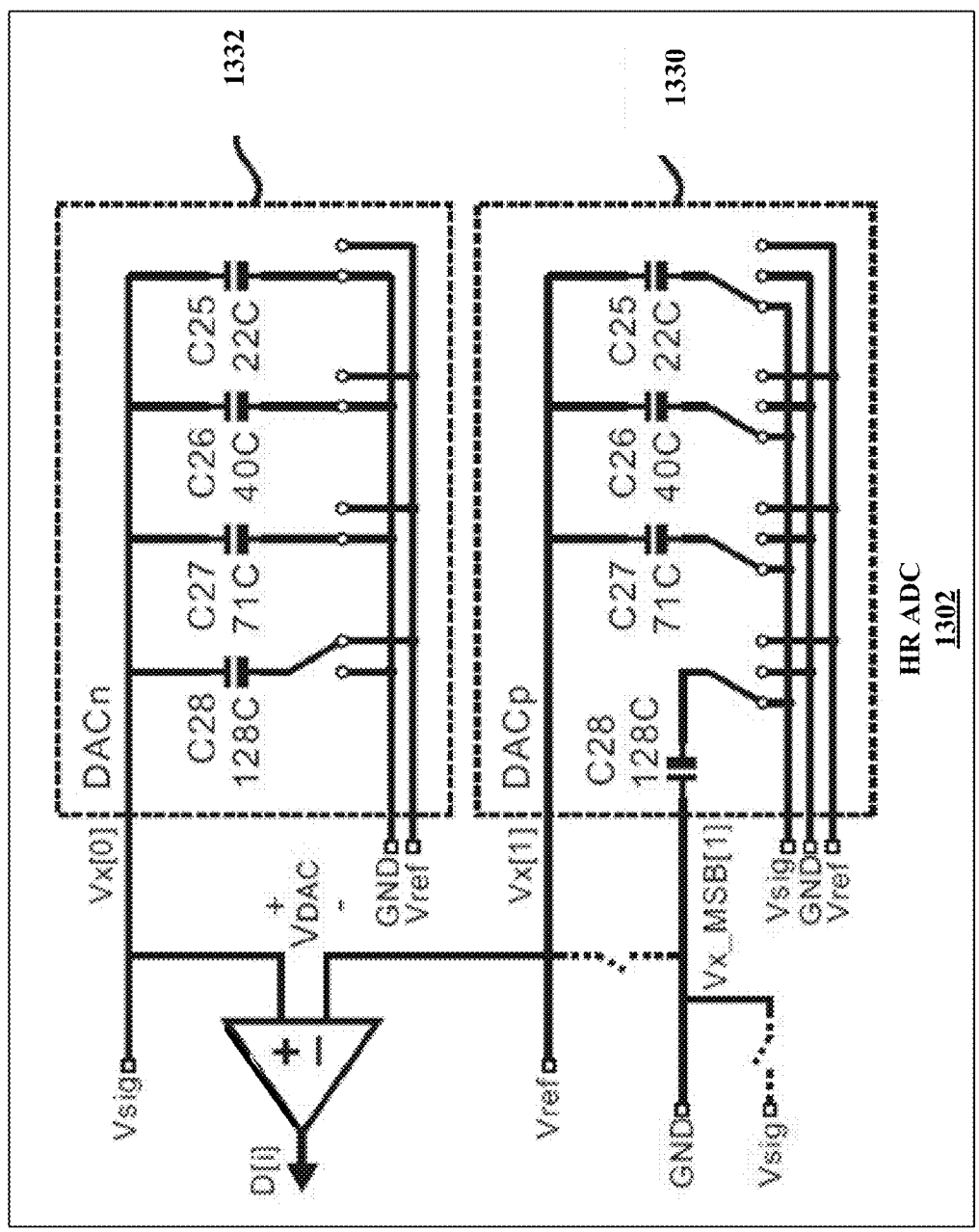
FIG. 13 illustrates an example functional block diagram of a sensory system comprising a reference generator of an SAR ADC in a sampling phase in accordance with various embodiments.
Figure 14:
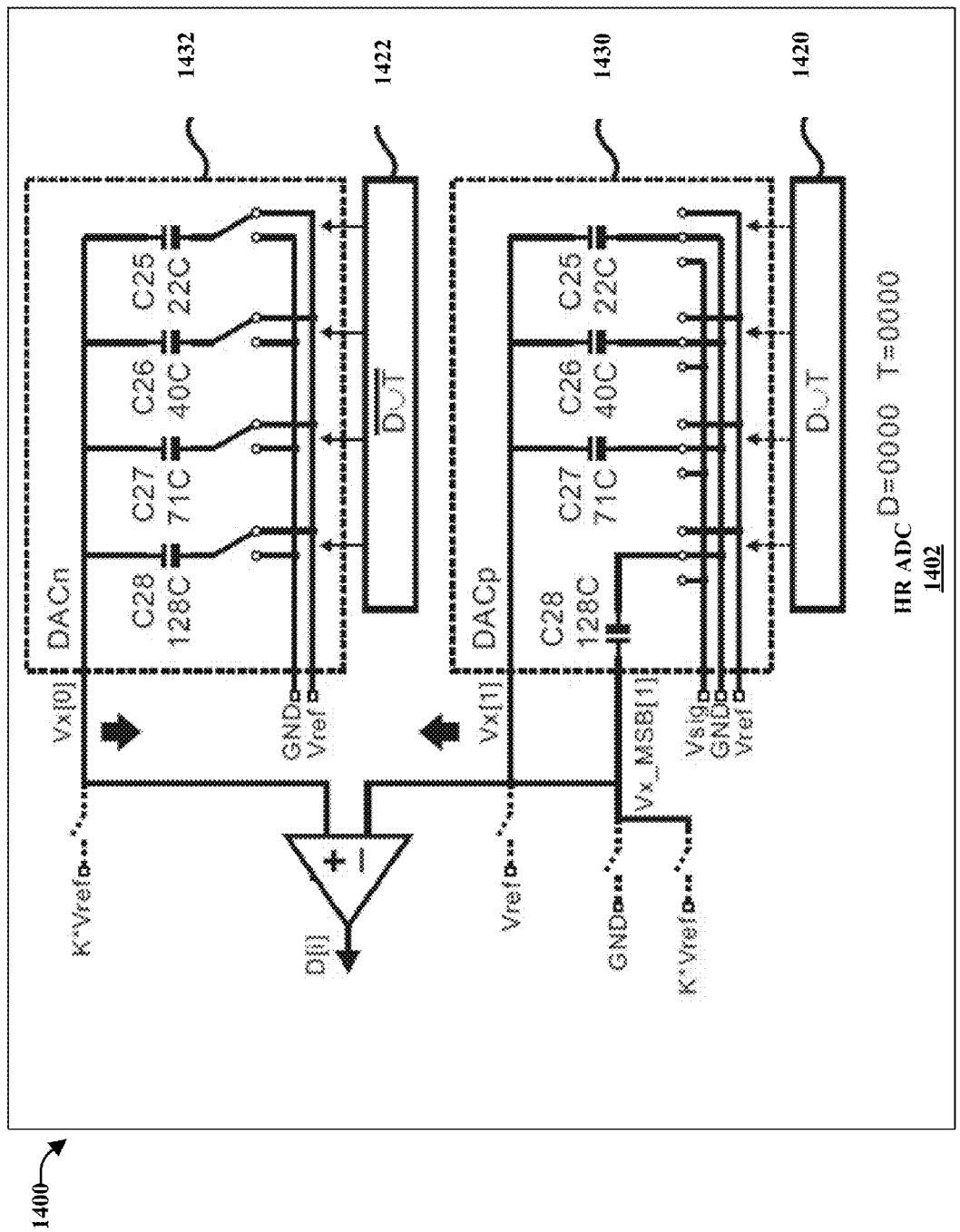
FIG. 14 illustrates an example functional block diagram of a sensory system comprising a reference generator of an SAR ADC after a sampling phase, but before a first MSB evaluation in accordance with various embodiments.

Turing to FIGS. 13-14, there depicted are systems 1300 and 1400, respectively. The systems 1300 and 1400 depict operation of HR ADCs in an embodiment of a DACn and DACp. System 1300 depicts operation of HR ADC 1302 on a simplified embodiment of a 4 b HR DACn 1332 and an HR DACp 1330. During the sampling phase, bottom-plates of all capacitors are in the negative HR DACn 1332, except for the MSB capacitor connected to GND, while their top-plates sample the input signal, $V_{sig}$. Meanwhile, the top-plates of all capacitors are in HR DACp 1330 except for the MSB capacitor which can be connected to $V_{ref}$ while their bottom-plates sample the input signal, $V_{sig}$.

System 1400 depicts an HR ADC 1402 comprising an HR DACn 1432 and an HR DACp 1430. HR DACn 1432 and HR DACp 1430 are settled after the sampling phase but before the first MSB is evaluated, the DAC output, $V_{DAC}$, as the difference between the HR DACn 1432 output, $V_x[0]$, and the HR DACp 1430 output, $V_x[1]$, becomes:

$$V_{DAC} = V_x[0] - V_x[1] \quad (15)$$
$$= (KV_{ref} + V_{sig}) - (KV_{ref} - V_{sig})$$
$$= 2V_{sig}$$

where the DAC offset factor, K, is:

$$K = \frac{\sum\limits_{i \neq 2, j \neq 8} C_{ij}}{\sum\limits_{i,j} C_{ij}} \quad (16)$$

Figure 15:
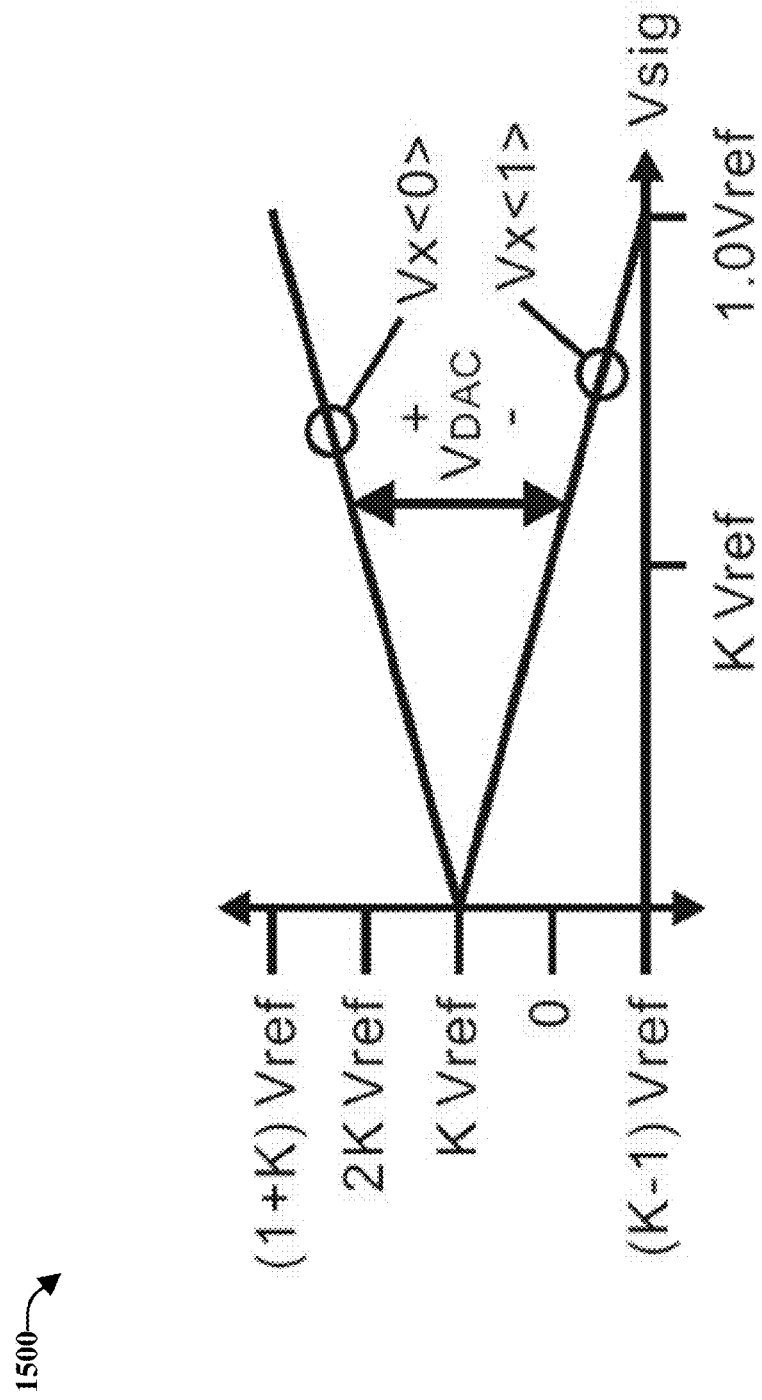
FIG. 15 illustrates an example graph of post-sample settling voltage for different input voltages of a sensory system comprising a DAC in accordance with various embodiments.

Referring now to FIG. 15, there depicted is a graph 1500 of a DAC settling voltage as a function of $V_{sig}$, in accordance with various embodiments disclosed herein. A differential DAC output to a SAR comparator, $V_{DAC}$, can be $2V_{sig}$. In embodiments using disclosed sampling schemes a DC bias of a comparator input is determined by K. Such sampling schemes can simplify comparator design complexity as the comparator only needs to work for one common-mode input voltage instead of a wide range. In another aspect, $V_{sig}$ can have an inherent voltage gain of ×2 through the sampling process. For instance, since both DACn and DACp are connected to $V_{sig}$ during sampling, the kT/C thermal noise requirement is satisfied by the sum of $C_{ij}$ from both DACs. During successive approximation, the capacitance at each comparator input is halved, but because of the DACs' gain in the voltage domain, the comparator's effective input referred noise is still attenuated by 3 dB.

Referring again to FIGS. 9 and 10, a DACn (e.g., DACn 942, 1032) and a DACp (DACp 940, 1040) can be calibrated via on-chip self-calibration. During sampling in self-calibration mode, the ADC input, $V_{sig}$, is held at the common-mode voltage $K*V_{ref}$ while the capacitor bottom-plates are configured to the register value R by SARs (e.g., SAR LSBs 910, 920, 1010, and 1020). The perturbation mask, R, is typically a digital word with all zero values except for one bit. The non-zero bit is the weight under calibration. After the first sampling phase, the bottom-plates are restored to ground and charge-redistribution will settle the capacitor voltage to:

$$V_{DAC} = Q^{-1}(R) \quad (17)$$

where $V_{DAC}$ is the DAC output, $Q_{-1}$ is the DAC function (it converts a digital word into its equivalent DAC output voltage):

$$Q^{-1}(A) = \sum_{j=1}^{N} \alpha_j w_j \quad (18)$$

where $w_1, w_2, \ldots, w_N$ represent the N capacitor weights and $a_j$ are the bit values of A.

In the subsequent quantization phase, a SAR's (e.g., SAR LSBs 910, 920, 1010, and 1020) quantization result, D, is always evaluated from the next MSB to the current weight under calibration with upper MSB values set to zero. For example, if R=1000, the bit trial register T will start from T=0100 with the first bit of D assumed to be zero. Likewise, if R=0100, the bit trial register T will start from T=0010 with the first two bits of D assumed to be zero. In essence, each weight $w_j$ will be quantized by a combination of its LSB weights:

$$w_j \approx \sum_{i<j}^{N} d_i w_i \quad (19)$$

and $d_i=0$ for $i \geq j$.

The effect of noise on the evaluation of $d_i$ can be removed by averaging $d_i$ over a large number of repetitions. In the end, N−1 equations in the form of $$w_j \approx \sum_{i<j}^{N} d_i w_i$$

can be obtained from calibrating N weights. By setting one weight to a constant value (e.g., the MSB weight $w_N$), the rest of the weights can be determined in proportion to this weight by standard matrix regression techniques.

Figure 16:
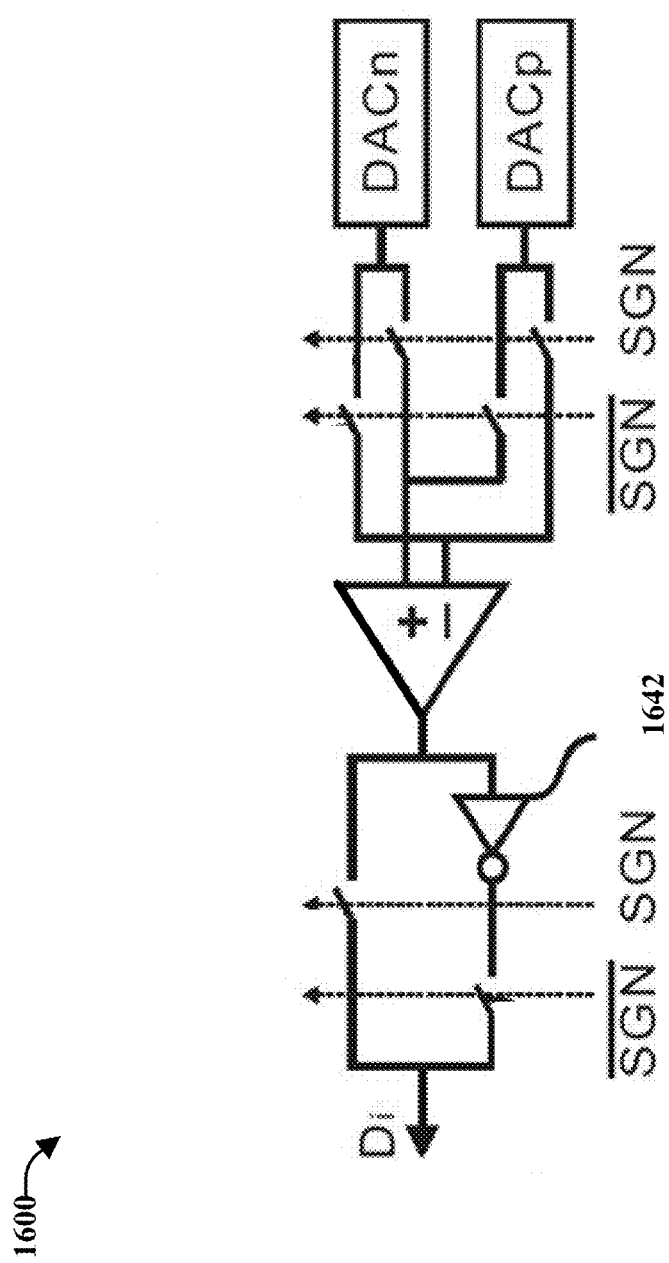
FIG. 16 illustrates an example functional block diagram of a sensory system comprising an ADC in a chopping mode in accordance with various embodiments.

For example, FIG. 16 illustrated a system 1600 that can toggle chopping by SGN. Inverter 1642 can produce a digital compliment result. When calibrating the smaller weights, the calibration may be saturated by a comparator's offset error, $V_{off}$:

$$V_{DAC} = Q^{-1}(R) - V_{off} < 0, \quad (20)$$

if $Q^{-1}(R) < |V_{off}|$. Chopping can be used to reverse the polarity of $V_{off}$ and prevent $V_{DAC}$ from saturating to <0. For instance, chopping can be toggled via SGN.

Figure 17:
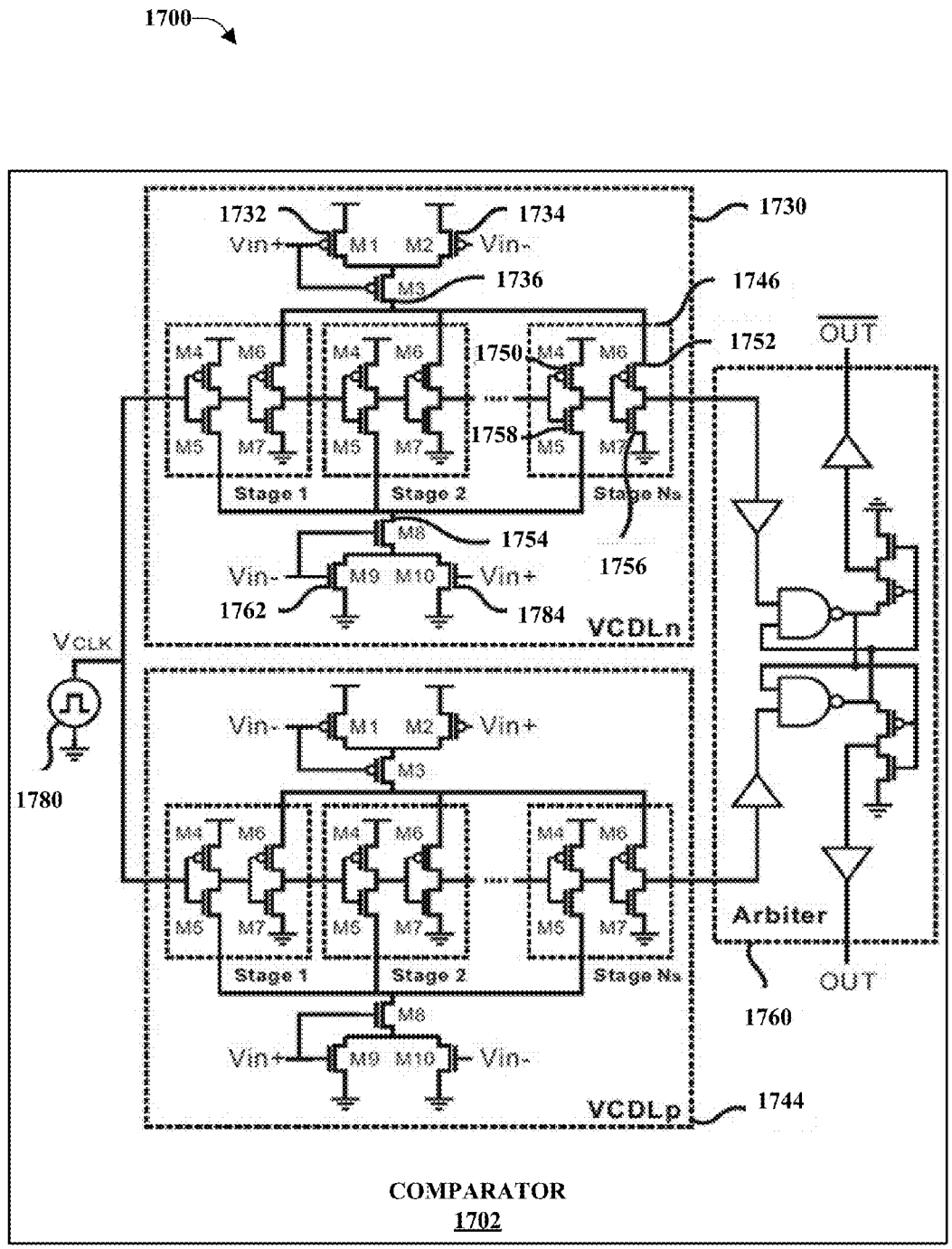
FIG. 17 illustrates an example functional block diagram of a sensory system comprising a comparator in accordance with various embodiments.

Turning to FIG. 17, system 1700 is depicted. System 1700 can comprise a comparator 1702 in accordance with various embodiments disclosed herein. In an aspect, comparator 1702 can comprise various circuit components as depicted. In various aspects, comparator 1702 can comprise various other components or configurations not shown for readability. It is noted that other arrangements can be utilized. Comparator 1702 can be comprised in larger systems, such as system 100, 200, etc.

The resolution of a SAR ADC can be limited by the input referred noise of its comparator, especially from a power consumption's point of view. Various embodiments disclose SAR ADCs that can overcome noise and power consumption limitations via a noise-averaging time-domain comparator (e.g., comparator 1702). In an aspect, comparator 1702 can be the core of various comparators described herein. In embodiments, comparator 1702 can comprise a number of voltage controlled delay lines, such as two voltage controlled delay lines (VCDL): VCDLn 1730 and VCDLp 1744. In another aspect, a delay stage 1746 can comprise transistors M4 1750, M5 1758, M6 1752, and M7 1756 for the $V_{CLK}$ clock 1780 to propagate a pulse through. M4 1750, M5 1758, M6 1752, and M7 1756 are sized to be larger than other transistors (e.g., M3 1736 and M8 1754). For example, M4 1750, M5 1758, M6 1752, and M7 1756 can be approximately eight times larger than M3 1736 and M8 1754. For instance, M4 1750, M5 1758, M6 1752, and M7 1756 can operate in the linear region and have low gain. In another aspect, M3 1736 and M8 1754 can be biased in the saturation region because of their smaller size. The gate voltage predominantly, of M3 1736 and M8 1754, can control the current supplied to M4 1750, M5 1758, M6 1752, and M7 1756, and can determine the delay of VCDLn 1730 and VCDLp 1744. In various disclosed embodiments, inverters formed by M4 1750 and M5 1758 can see a common noise source, M8 1754, and similarly the inverters formed by M6 1752 and M7 1756 can receive a common noise source, M3 1736. This ensures that the phase noise, $\overline{n_T^2}$, of each delay stage 1746 is added equally and does not experience a cascaded gain, where the first inverter stage will have the largest noise contribution. The net effect, as the $V_{CLK}$ clock 1780 pulse propagates through the inverter chain, is that $N_s$ (total number of delay stages) observations of $\overline{n_T^2}$ is added to the total inverter chain delay power ($T_{delay}^2$), where $$T_{delay}^2 = (N_s A_T V_{in})^2 + N_s \overline{n_T^2} \quad (21)$$

and where $A_T$ is the voltage-to-time gain of a single inverter-pair stage comprising M4 1750, M5 1758, M6 1752, and M7 1756. In another aspect, $N_s A_T V_{in}$ can represent the voltage-to-time conversion gain of the entire VCDLn 1730. $N_s \overline{n_T^2}$ can represent the time-domain noise power summed from the $N_s$ inverter-pair stages. The output SNR can be estimated by:

$$SNR = \frac{N_s (A_T V_{in})^2}{\overline{n_T^2}}. \quad (22)$$

The noise power term, $\overline{n_T^2}$, can be attenuated by a factor of $N_s$, which is the noise-averaging factor of the comparator 1702. Intuitively, this is the result of the output noise current of M3 1736 and M8 1754 being integrated over the time period of $T_{delay}$.

The transistors M1 1732, M2 1734, M9 1762, and M10 1784 are biased by the common-mode input voltage. They serve the purpose of tuning the bias conditions of M3 1736 and M8 1754 to minimize $\overline{v_{ni}^2}$ and enlarge $A_T$. A larger $A_T$ can reduce noise contributions from the arbiter.

Figure 18:
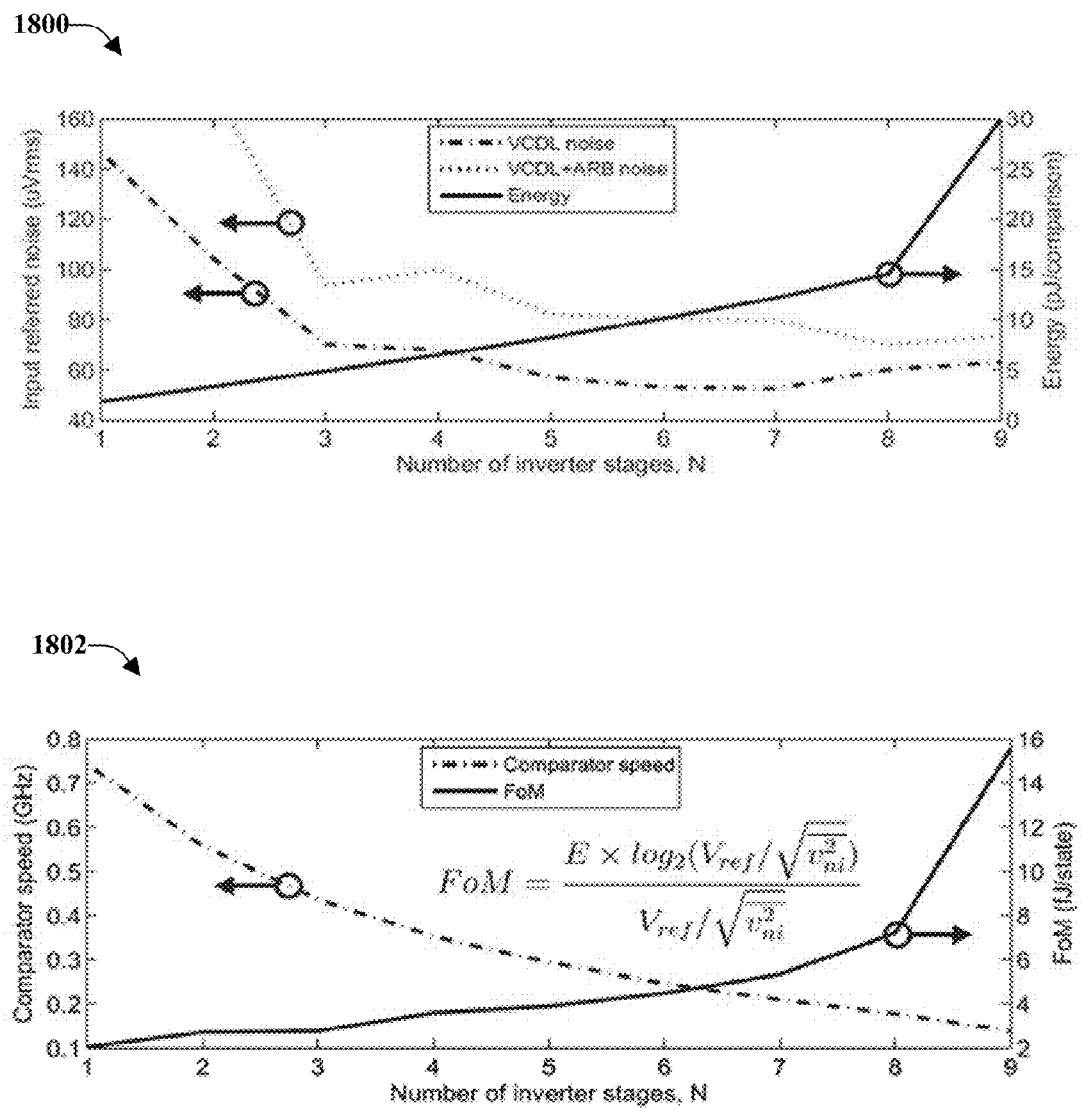
FIG. 18 illustrates example graphs comparing noise and energy consumption, and comparing speed and FoM of a comparator in accordance with various embodiments.

FIG. 18 depicts exemplary graphs 1800 and 1802 depicting various aspects of embodiments disclosed herein. In an aspect, graph 1800 depicts a comparator's (e.g., comparator 1702) input referred noise, $$\sqrt{\overline{v_{ni}^2}},$$

and energy consumption per comparison, E, against an increasing number of delay stages (e.g., delay stage 1746). As depicted, the supply and reference voltage, $V_{ref}$, is set to 1.8 V, and the load capacitance, $C_L$, is 15 fF. The lower bound of $$\sqrt{\overline{v_{ni}^2}}$$

observed in graph 1800 can be attributed to the noise contributions from the inverter-pairs, which follow a noise model of cascaded amplifier chains.

Graph 1802, depicts a comparator's (e.g., comparator 1702) speed is inversely related to the number of delay stages (e.g., delay stage 1746). For various LR ADC's described herein, data points to the right of graph 1802, such as five or six stages, offer acceptable performance trade-offs. For various LR ADC's, data points to the left of graph 1802 can deliver lower power consumption and smaller size at the expense of increased noise.

Figure 19:
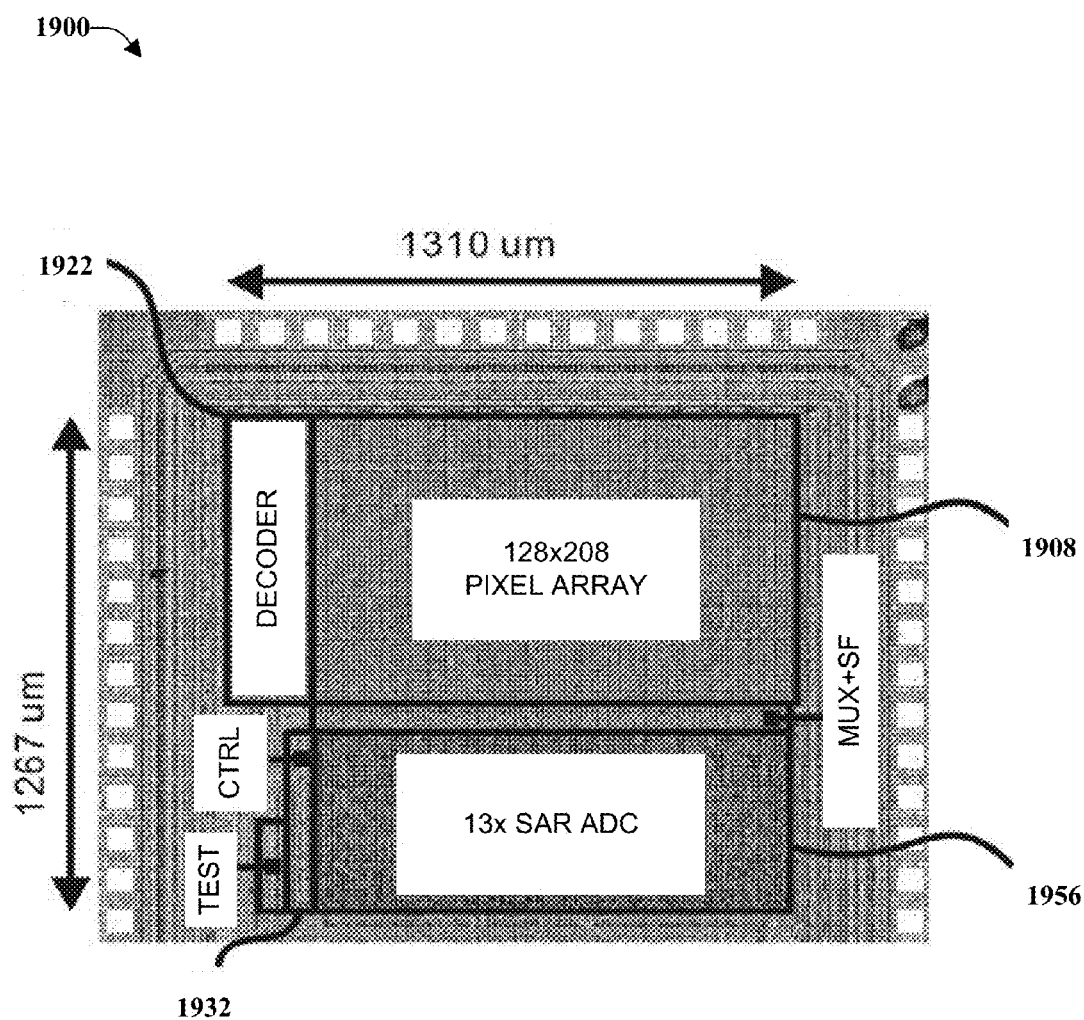
FIG. 19 illustrates an example block diagram of a sensory system that can facilitate LDI sensing in accordance with various embodiments.

FIG. 19 depicts an image sensor system 1900 in accordance with various embodiments disclosed herein. It is noted that various other systems (e.g., 100, 200, 300, etc.) can be comprised by system 1900. In another aspect, system 1900 can be comprised in larger systems, such as imaging systems, sensors, desktop computers, camera systems, tables, laptops, and the like. It is further noted that various configurations can be utilized.

As depicted, system 1900 can primarily comprise a pixel array 1908, SAR ADC 1956, decoder 1922, and controller 1932. In an aspect, system 1900 can be fabricated in a Global Foundry 1P6M 0.18 µm mixed-signal technology or the like. As depicted, system 1900 can be 1,310 µm by 1,276 µm. Various performance aspects are described in the table below, where DNL and INL are measured from a first ADC (e.g., of SAR ADC 1956) channel in an array (e.g., pixel array 1908). The Figure-of-Merit (FoM) calculated for each imaging mode and also the ADC itself (without CDS) is based on the effective resolution, ER. In an aspect, this definition is utilized for the below table for image sensors since the output from the pixel array can be considered to be a DC signal as opposed to a full-range sinusoid.

| | Standard Image | | LDI Image | |
|---|---|---|---|---|
| | no CDS | CDS | no CDS | CDS |
| Process | 0.18 µm 1P6M CMOS | | | |
| Supply voltage | 3.3 V, 1.8 V | | | |
| ADC Area | 518 × 84 µm² | | | |
| Clock frequency | 20 MHz | | | |
| Pixel resolution | 128 × 208 | | | |
| Frame rate (fps) | 340 | 167 | 1.4 | 0.67 |
| Pixel rate (kSa/s) | 0.340 | 0.167 | 44.6 | 43.1 |
| Pixel size | 5.3 µm × 5.3 µm | | | |
| Fill factor | 45% | | | |
| Dark current | <4688 e⁻/sec | | | |
| Sensitivity | 26900 e⁻/Lux.sec @ 201 Lux | | | |
| Dynamic range | 74 dB | | | |
| ADC rate (kSa/s) | 683 | 335 | 714 | 345 |
| ADC noise | 110 µV$_{rms}$ (4 LSB) | | | |
| DNL | +3.0/−2.8 LSB | | | |
| INL | +24/−17 LSB | | | |
| column FPN (µV) | 22700 | 138 | — | — |
| Pixel noise@256 Lux (µV$_{rms}$) | 509 | 449 | — | — |
| Pixel noise@dark (µV$_{rms}$) | 477 | 427 | — | — |
| SF noise (µV$_{rms}$) | 812 | 873 | 812 | 873 |
| ER | | 13.6 b | | |
| Imager power (mW) | 4.46 | 4.75 | 4.75 | 4.73 |
| Energy (nJ/pixel) | 0.50 | 1.09 | 131 | 270 |
| Imager FoM (fJ/step)$^a$ | 31 | 66 | 31 | 64 |
| ADC FoM (fJ/step)$^a$ | | 23 | | |

Figure 20:
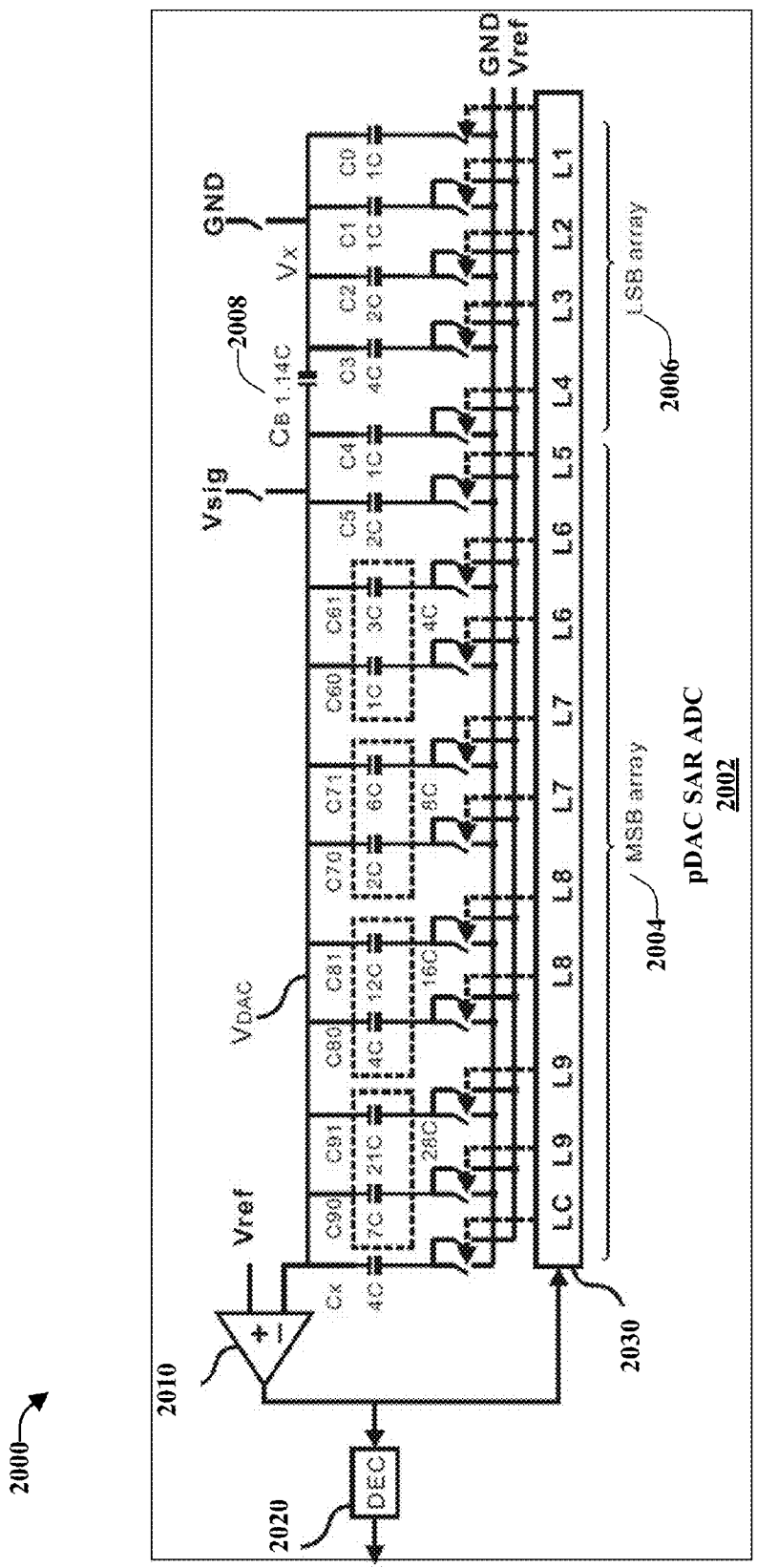
FIG. 20 illustrates an example functional block diagram of a sensory system comprising an ADC with one level of segmented pDAC and an error correction capacitor in accordance with various embodiments.

Referring now to FIG. 20, presented is a system 2000 that can facilitate sensory readout in accordance with various aspects of this disclosure. System 2000 can be comprised in devices, such as in the form of an on-chip image sensor of in personal computers, servers, rack servers, laptop computers, tablet computers, smart phones, personal digital assistants, and the like. In another aspect, system 2000 can be utilized by various systems disclosed herein, such as system 100, 200, 300, etc. For instance, system 2000 can be utilized by an HR channel or an LR channel as described herein.

System 2000 can primarily include a split capacitor pDAC SAR ADC 2002. pDAC SAR ADC 2002 can comprise a SAR controller 2030, a comparator 2010, and a decoder 2020. As depicted, pDAC SAR ADC 2002 can be a N-bit, where N is a real number (e.g., N=9), split capacitor pDAC SAR ADC with a k bit Most-Significant (MSB) array, where k is a real number (e.g., k=6) and p bit pDAC section (e.g., p=4). In embodiments, pDAC SAR ADC 2002 has one level of pDAC hierarchy (h=1). SAR controller 2030 stores bit-decisions ($L_i$, i∈{N, N−1, ..., 2, 1, C}) from comparator 2010 and configures each pair of switches connected to each capacitor's bottom-plate in one of three states: disconnected, connected to $V_{ref}$ ('1'), or connected to GND ('0'). In general, for a N bit split capacitor array consisted of a k bit MSB array 2004 and a N−k bit LSB array 2006 joined together by a bridging capacitor, $C_B$ 2008, which can have a size:

$$C_{MSB} = \sum_{i=N-k+1}^{N} C_i \quad (23)$$

$$C_{LSB} = \sum_{i=0}^{N-k} C_i \quad (24)$$

$$C_B = \frac{2^{N-k}}{2^{N-k}-1} C \quad (25)$$

where C is the unit-capacitor.

In an aspect, pDAC SAR ADC 2002 can split the first p MSBs of the k bit MSB array 2004 into a small group of sub-capacitors, $C_{i0}$, where:

$$p = k - 2 \quad (26)$$

$$C_i = \sum_j C_{ij} \quad (27)$$

$$C_{i0} = \frac{1}{4} C_i \quad (28)$$

$$C_{i1} = \frac{3}{4} C_i \quad (29)$$

$$C_{pDAC} = \sum_{i=N-p+1}^{N} C_{i0} \quad (30)$$

The pDAC SAR ADC 2002 capacitors, $C_{i0}$, can be chosen with reference to $C_i$, such as to be ¼ of $C_i$. For instance, ¼ of $C_i$ can yield a target trade-off between circuit complexity and power savings. It is noted that other ratios can be chosen based on a target trade-off. However, it is noted that splitting these capacitors into bigger $C_i/C_{i0}$ ratios can increase the device mismatch error between $C_{i0}$ and $C_{i1}$ which would require a larger error correction margin (e.g., a bigger $C_X$) to accommodate it. It is noted that a hierarchical pDAC (h>1) can also be utilized for high $C_{i1}/C_{i0}$ ratios, as described herein.

In at least one embodiment, system 2000 can comprise a non-binary partitioning for the $C_N$ (N=9 for a 9 b ADC) capacitor. It is noted that the $C_{N0}$ weight is still ⅓ of $C_{N1}$, $C_{N0}+C_{N1}$ and can be scaled to be smaller than $2C_{N-1}$ to make room for the error correction capacitor $C_X$ in system 2000. In an exemplary embodiment, $C_X=2\times C_{N-p}$ for possible improvement in error correction coverage. The $C_X$ weight can be utilized during FEC. In some embodiments, the $C_X$ weight may only be utilized during the FEC phase, and can operate as input-independent. As such, the error correction range can be made uniform throughout the input range. Additionally, further redundancy is introduced by the non-binary weighting of $C_{N0}$ which protects the ADC against non-linearities caused by any mismatch in $C_N$.

Figure 21:
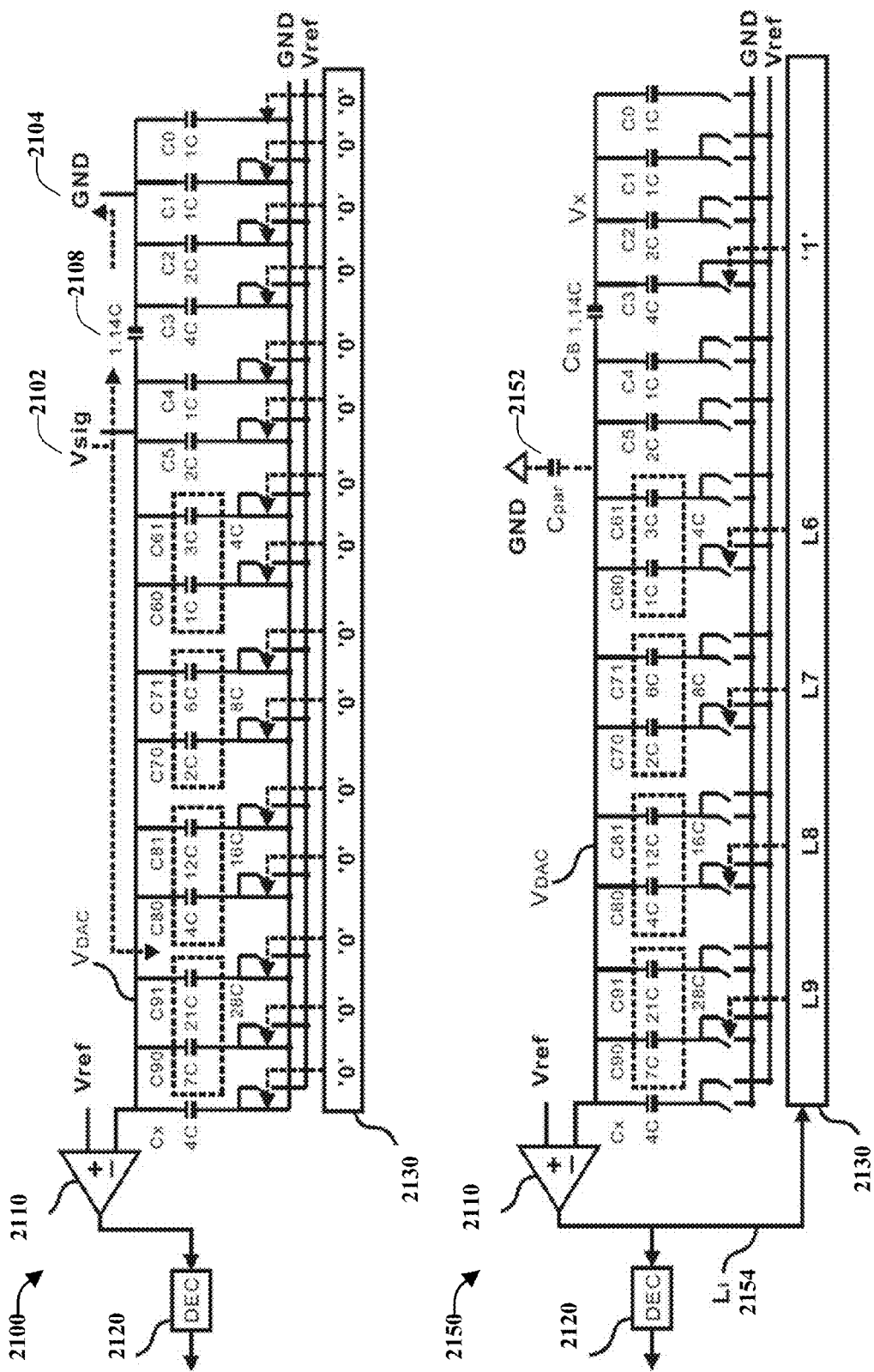
FIG. 21 illustrates an example functional block diagram of a sensory system comprising an ADC with one level of segmented pDAC and an error correction capacitor in various stages of operation in accordance with various embodiments.

FIG. 21 presents system 2000 in a sampling phase 2100 and in an MSB phase 2150. In the sampling phase 2100, the input signal $V_{sig}$ 2102 is sampled (e.g., via a switch) onto the top-plate of the entire capacitor array while their bottom-plates are held at ground (0). The capacitive load seen by the signal source is 64 C, the total capacitance. It is noted that the load can vary depending on desired configurations.

In the MSB phase 2150, the pDAC sub-array, $C_{pDAC}$, can determine a number of MSB bits ($L_{[9:6]}$) via a SAR controller 2130, such as four bits as shown. The bottom-plates of the pDAC capacitors, $C_{i0}$ for N≥i>N−p, are switched between Vref ('1') and ground (GND or '0') to modulate the DAC output, $V_{DAC}$ against the reference voltage $V_{ref}$. The bit decision from the SAR comparator ($L_9$ down to $L_6$) is written to the SAR controller 2130, which configures the switch pair to either '1' or '0' based on its associated bit decision. The pDAC array can be one quarter of the size of the MSB array minus $C_X$, as described herein. Once the four MSBs are determined, the rest of the MSB and LSB capacitors are connected on the fifth clock and configured by the SAR based on the earlier pDAC results ($L_9$ down to $L_6$) without any additional trial-and-error. This approach reduces the DAC's power consumption. The driving requirement of the reference generator producing $V_{ref}$ is also relaxed for the same sampling speed. The ADC is permitted to operate at a higher clock speed due to the smaller capacitor load of the pDAC section. In this example, the $C_3$ capacitor is asserted during the MSB phase to create an artificial offset. It is noted that other capacitors or a combination of capacitors can be chosen to create this artificial offset. This allows the error correction to be bipolar. The DAC output, $V_{DAC}$, during N≥i≥N−p+1, is:

$$V_{DAC_i} = V_{ref}\left(\frac{C_{i0} + \sum_{j=i+1}^{N} C_{j0}L_j + (C_{N-k}PC_B)}{C_{pDAC} + C_{N-k}PC_B + C_{par}}\right) + V_{sig} \quad (31)$$

The $C_{N-k}$, or $C_3$, in the illustrated example is chosen for practical reasons. For instance:

$$\frac{C_{par} + C_{N-k}PC_B}{C_{pDAC} + C_{par} + C_{N-k}PC_B} \approx \frac{C_X}{C_{MSB} + C_BPC_{LSB} + C_X} \quad (32)$$

$$\Rightarrow C_{par} + C_{N-k}PC_B = 2C \quad (33)$$

so scaling errors to the relationship of $$C_{i0} = \frac{1}{4}C_i$$

can be avoided when the rest of the DAC is connected. In an aspect, this can help to improve (e.g., maximize) the FEC margin. The choice of $C_{N-k}$ depends on the observed parasitic capacitance, $C_{par}$. Capacitors other than $C_{N-k}$ can be chosen to satisfy equation (32), and the set can be constrained such that:

$$C_{N0} < \frac{1}{2}(C_{pDAC} + C_{N-k}PC_B + C_{par}) \quad (34)$$

which can provide additional redundancy to protect against Differential Non-Linearity (DNL) errors in the MSB code transition. If the pDAC is not exactly one quarter of the capacitor array, wrong bit-decisions made during pDAC switching will be much larger than 1 LSB, and missing codes will occur because $V_{DAC}$ can never converge to $V_{ref}$ in subsequent bit-decisions. This scenario is probable because the smaller pDAC will have worse device mismatch than the full-sized capacitor array.

Figure 22:
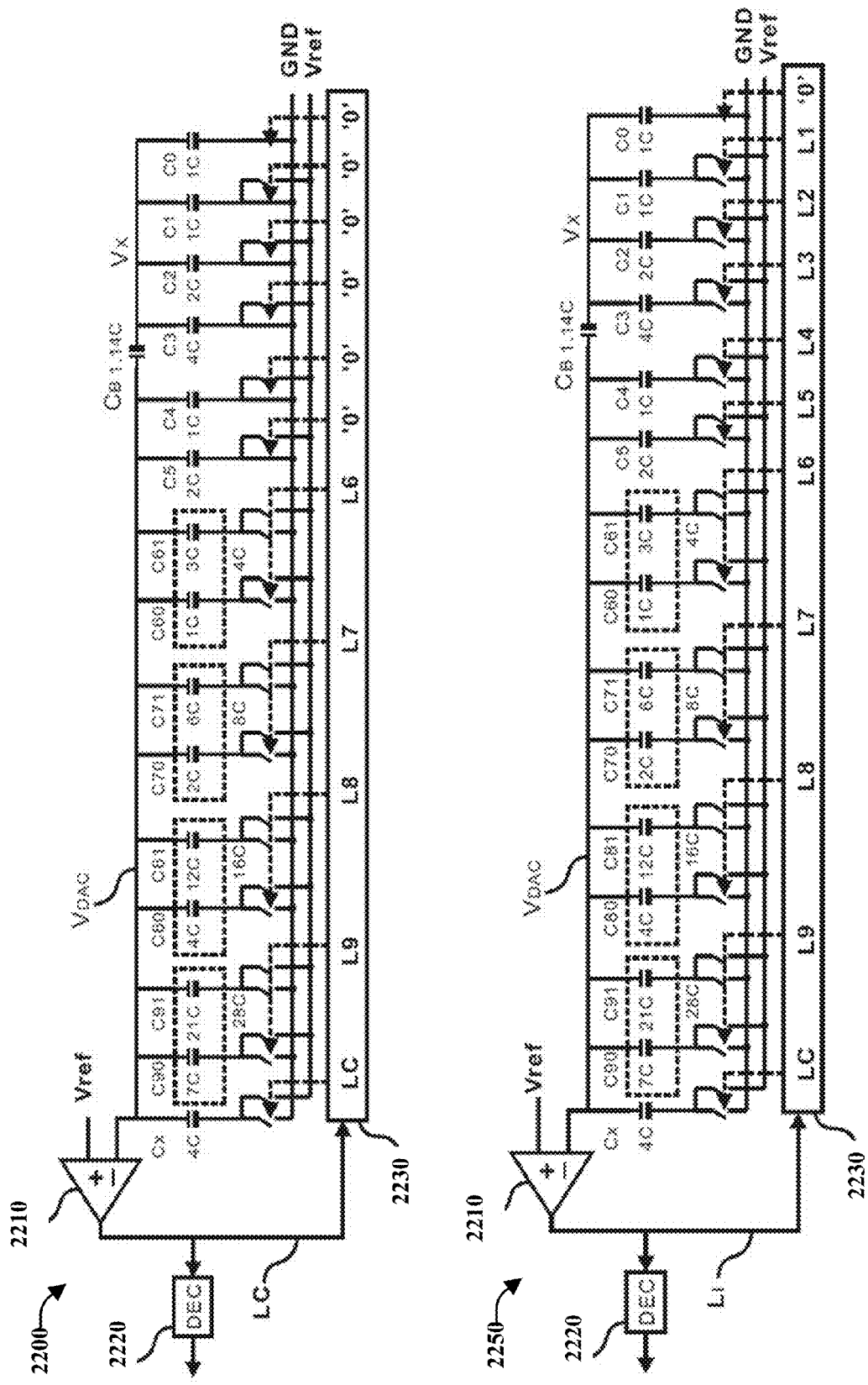
FIG. 22 illustrates an example functional block diagram of a sensory system comprising an ADC with one level of segmented pDAC and an error correction capacitor in various stages of operation in accordance with various embodiments.

FIG. 22 presents system 2000 in a redundant bit-decision 2200 and in a final conversion 2250, in accordance with various aspects disclosed herein. In a redundant bit-decision 2200, during an FEC clock, $C_{N-k}$ can be restored to GND. Restoring $C_{N-k}$ can create a negative perturbation on $V_{DAC}$. Both positive and negative errors from earlier bit-decisions can be recovered by the $C_X$ weight under the accuracy of the full-sized capacitor array, for i=N−p:

$$V_{DAC_i} = V_{ref}\left(\frac{C_X + \sum_{j=i+1}^{N}(C_{j0} + C_{j1})L_j}{C_{MSB} + C_BPC_{LSB}}\right) + V_{sig} \quad (35)$$

Since the switching of $C_X$ is input-independent, the error correction range is uniform throughout the input range, and it is approximately ±16 LSBs for the example illustrated in redundant bit-decision 2200.

In final conversion 2250, the last five LSBs are obtained using the conventional switching method. It is noted that the entire array is connected at this point and the final conversion result can utilize the same precision and accuracy as the conventional switching method. The final SAR ADC result, $D_{SAR}$, is calculated in the decoder 2220 (e.g., an FEC decoder) by:

$$D_{SAR} = \quad (36)$$

$$\left((2^{p-1} - 1)L_N + \sum_{i=N-p+1}^{N-1} 2^{i+p-N-1}L_i + L_C\right) \times 2^{N-p} + \sum_{i=1}^{N-p} 2^{i-1}L_i$$

Figure 23:
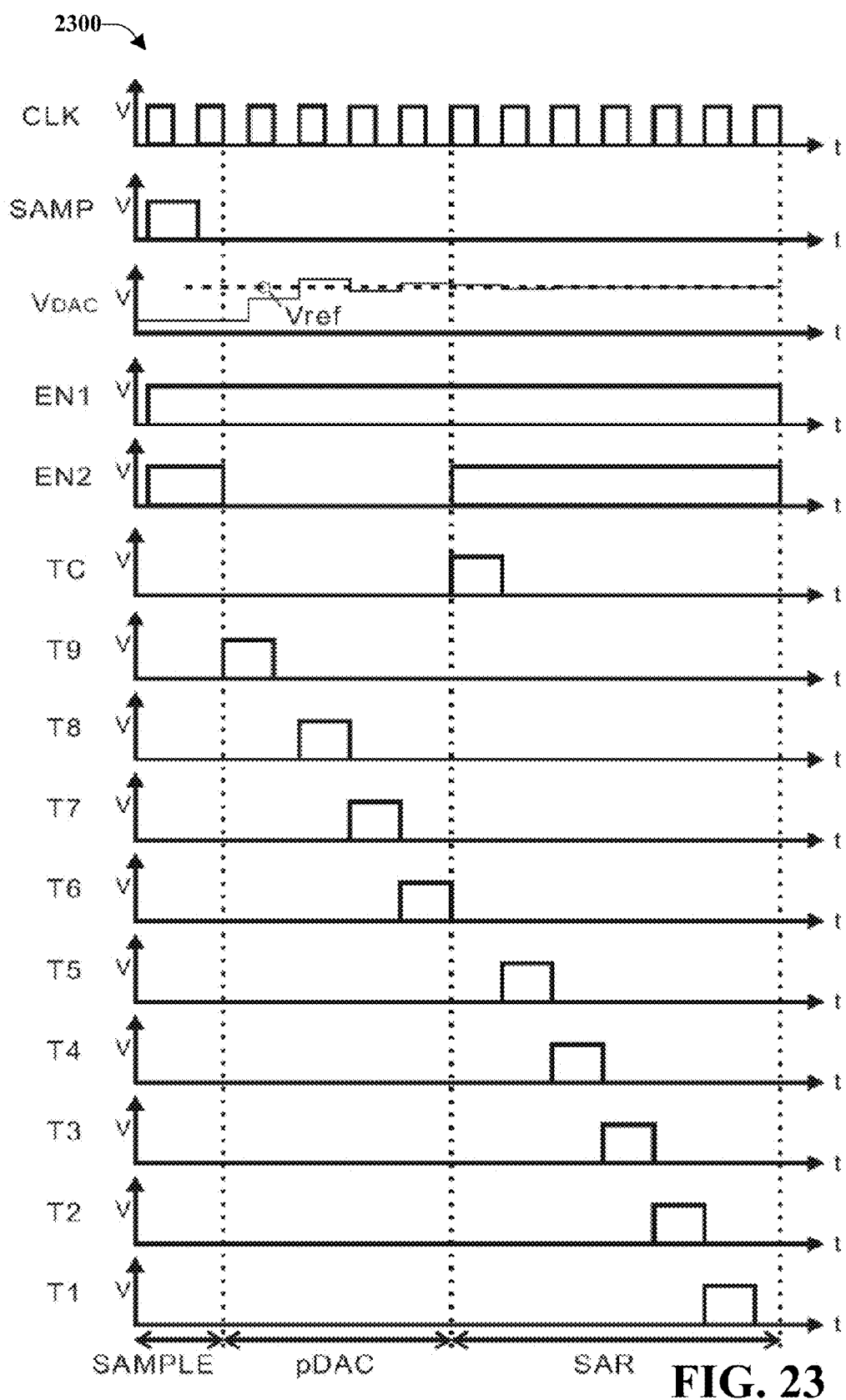
FIG. 23 illustrates an example timing diagram of a sensory system comprising an ADC with one level of segmented pDAC and an error correction capacitor in accordance with various embodiments.

Referring now to FIG. 23, either reference to FIGS. 20-22, presented is a timing diagram 2300 associated with system 2000 in accordance with various aspects disclosed herein. In an aspect, timing diagram 2300 can illustrate control of pDAC SAR ADC 2002. The clock signal is represented as CLK. pDAC SAR ADC 2002 is in sampling phase when SAMP is asserted high. The bottom-plates of $C_{i0}$ are disconnected and left floating when EN1 is low, and the bottom-plates of $C_{i1}$ are disconnected and left floating when EN2 is low. When EN1 is asserted high, the bottom-plates of $C_{i0}$ are connected to $V_{ref}$ if $T_i$ is high ('1') else it is connected to GND. When EN2 is asserted high, the bottom-plates of $C_{i1}$ are connected to $V_{ref}$ if $T_i$ is high ('1') else it is connected to GND. The DAC output, $V_{DAC}$, settles within the negative phase of CLK. The bit decision is made by comparator 2010 on the positive edge of CLK. The SAR controller 2030 can store bit-decision during the positive phase of CLK.

Figure 24:
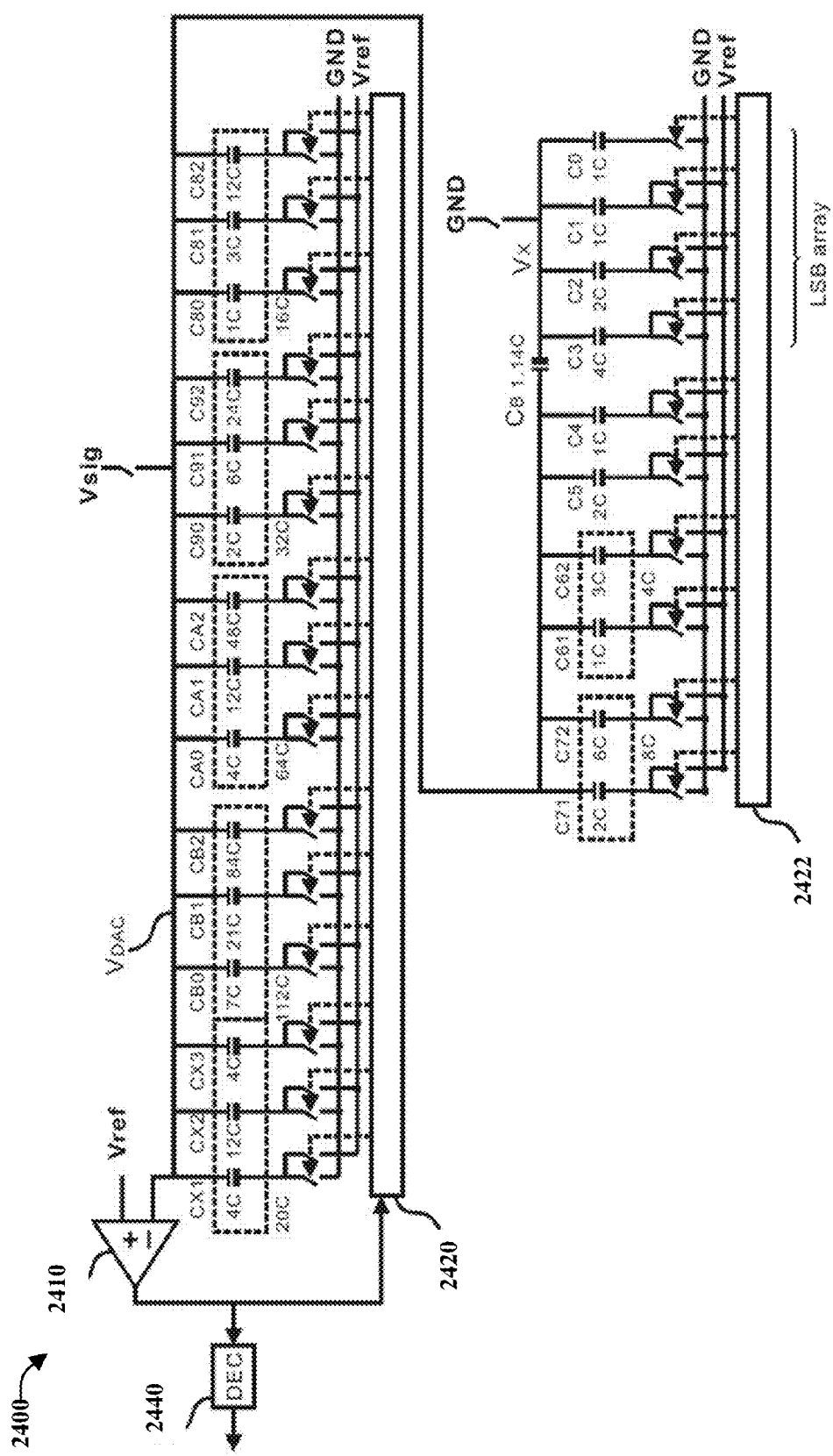
FIG. 24 illustrates an example functional block diagram of a sensory system comprising an eleven bit ADC with two levels of segmented pDAC in accordance with various embodiments.
Figure 25:
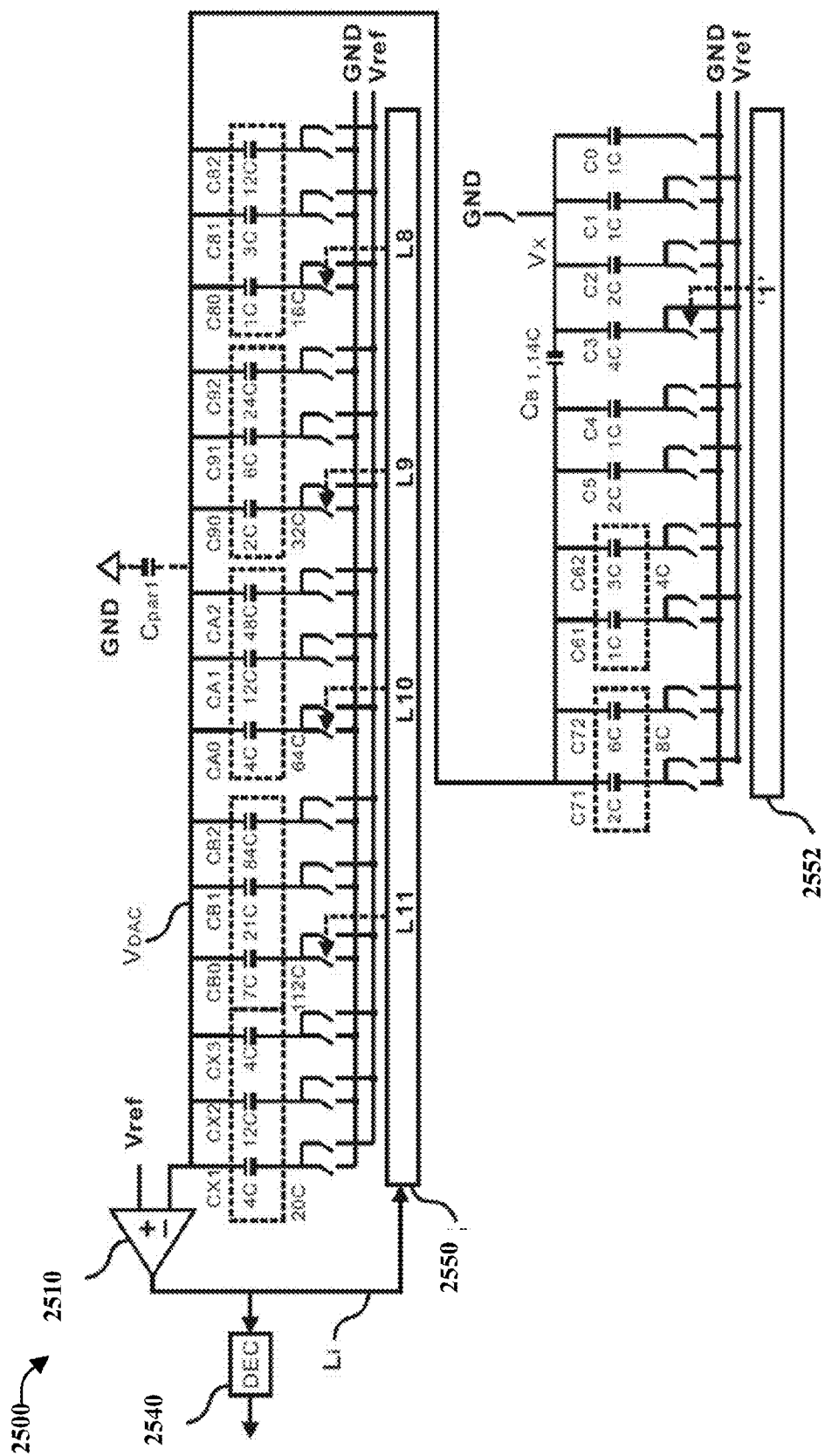
FIG. 25 illustrates an example functional block diagram of a sensory system comprising an eleven bit ADC with two levels of segmented pDAC that can facilitate determining a number of MSBs in accordance with various embodiments.
Figure 26:
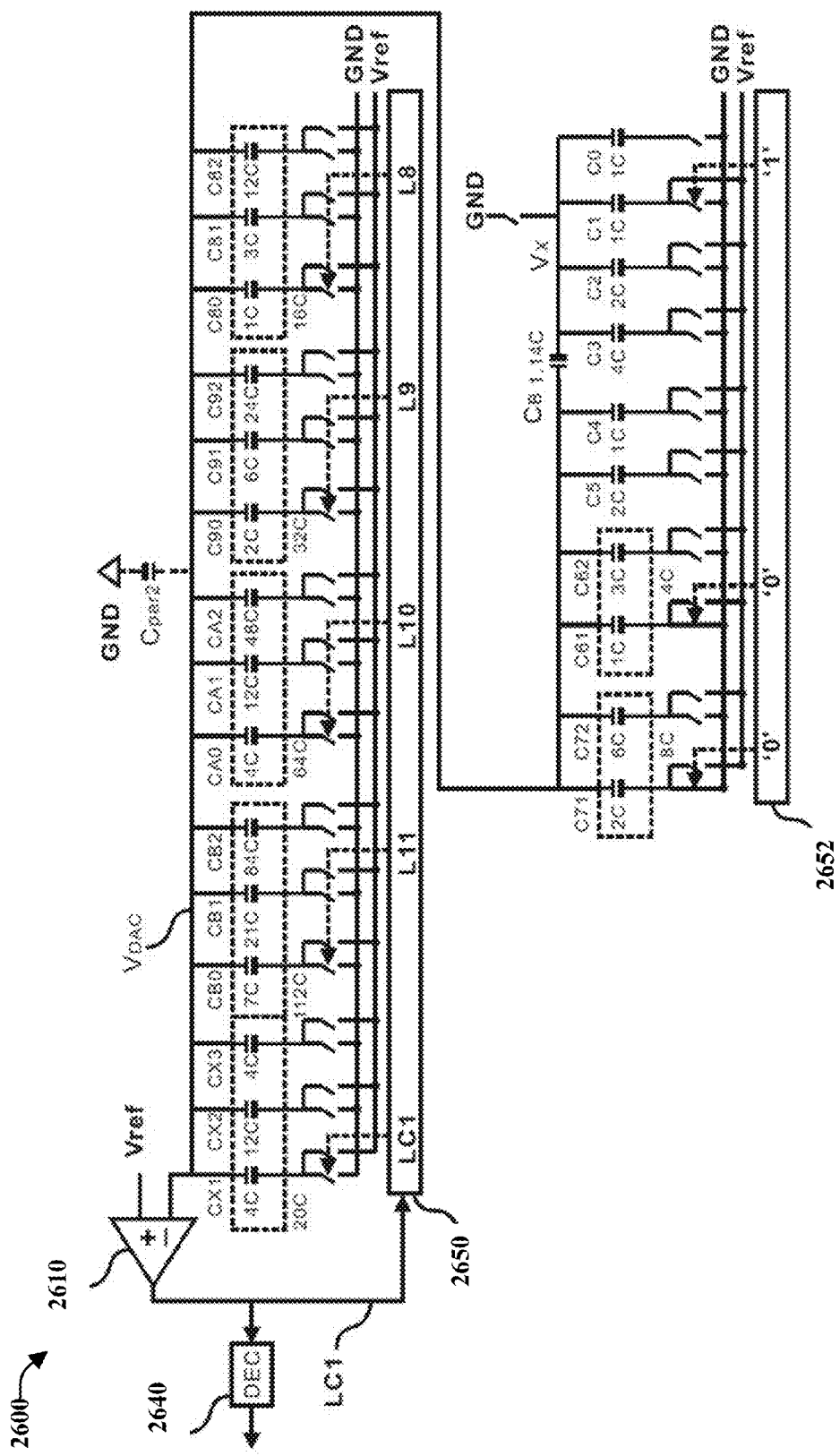
FIG. 26 illustrates an example functional block diagram of a sensory system comprising an eleven bit ADC with two levels of segmented pDAC that can facilitate determining a FEC bit in accordance with various embodiments.
Figure 27:
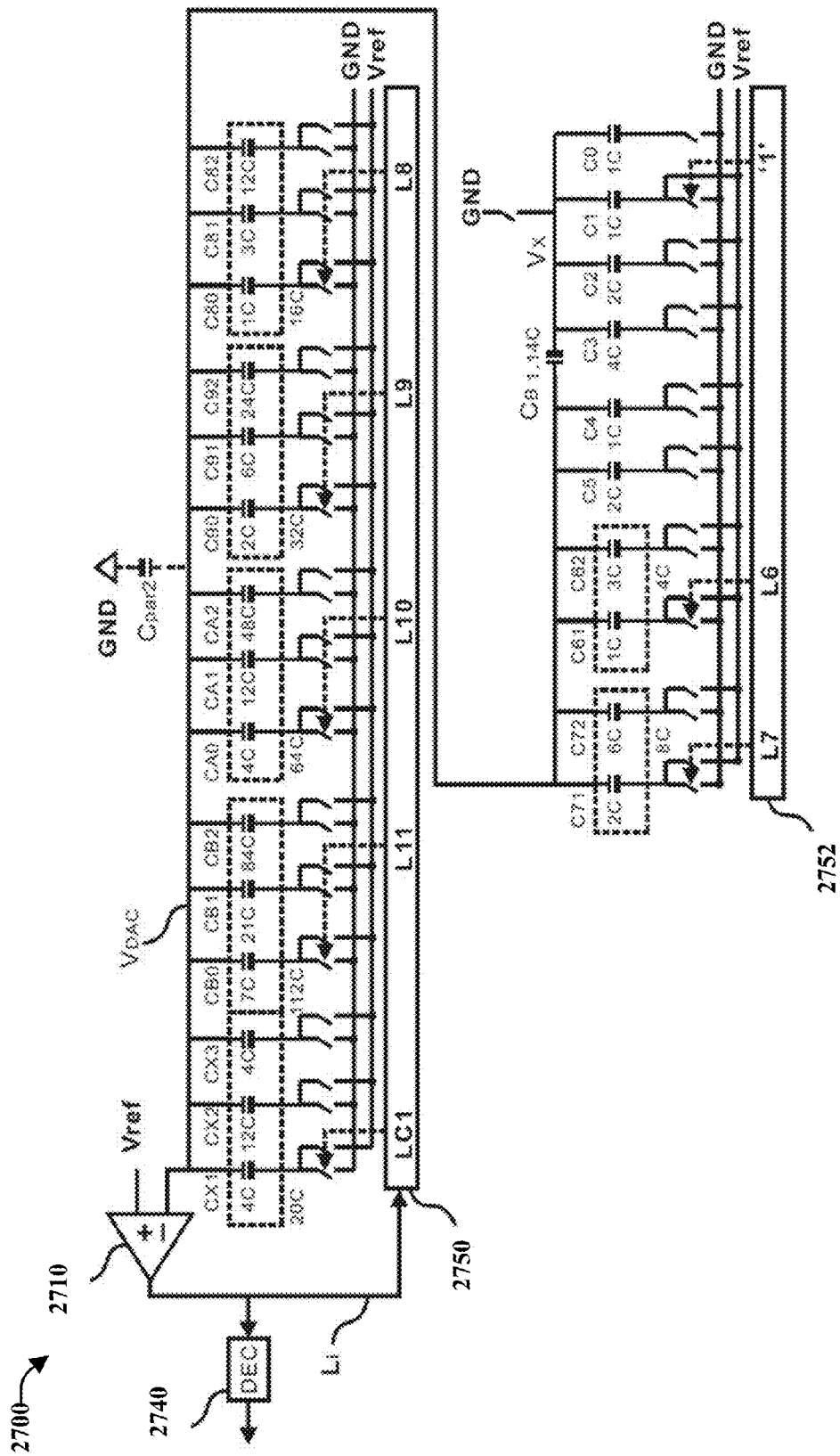
FIG. 27 illustrates an example functional block diagram of a sensory system comprising an eleven bit ADC with two levels of segmented pDAC that can facilitate determining a number of MSBs in a second pDAC level in accordance with various embodiments.
Figure 28:
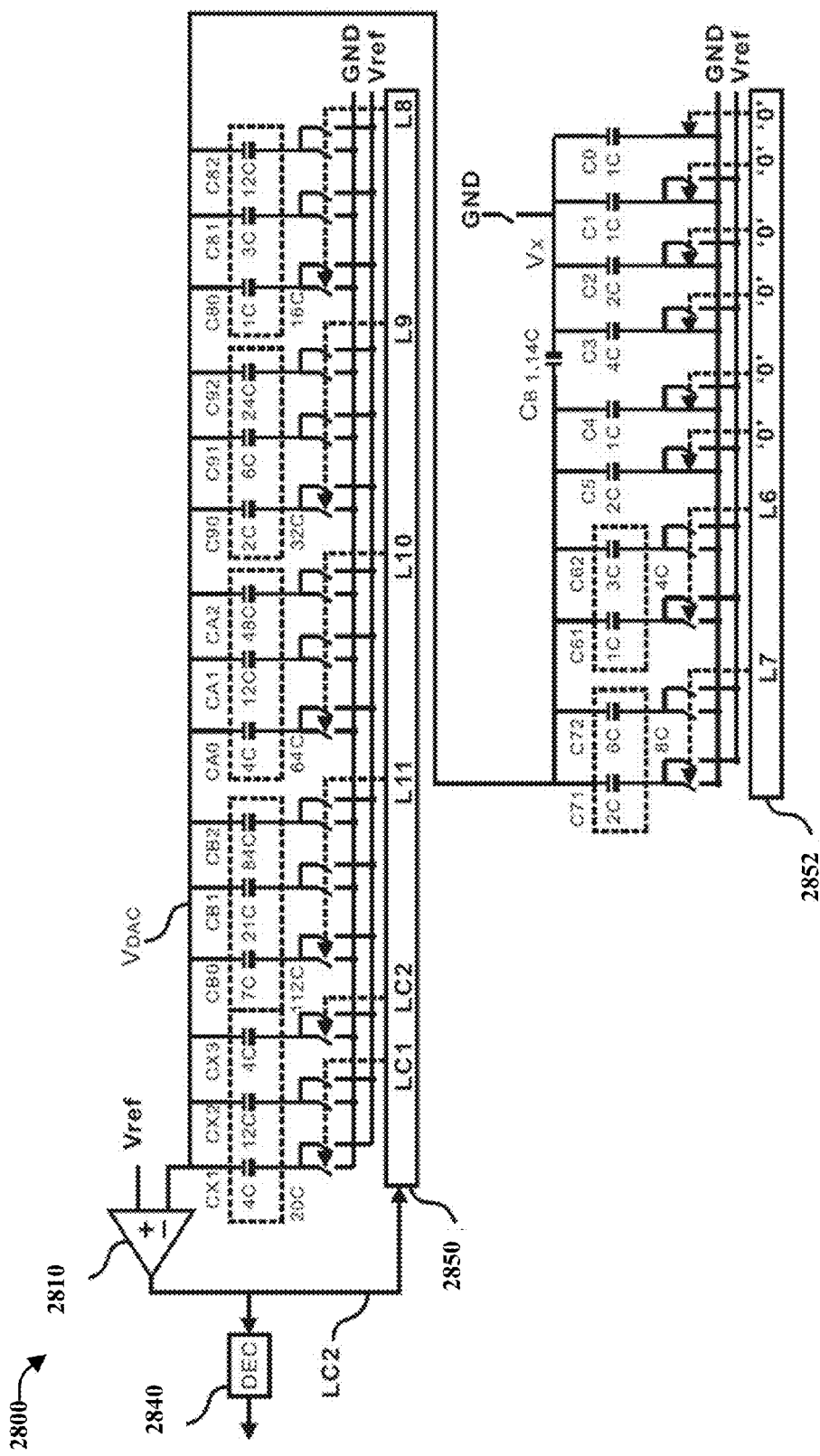
FIG. 28 illustrates an example functional block diagram of a sensory system comprising an eleven bit ADC with two levels of segmented pDAC that can facilitate determining a FEC bit in a second pDAC level in accordance with various embodiments.

FIG. 24 presents system 2400 that can facilitate a hierarchical pDAC in accordance with various aspects disclosed herein. It is noted that system 2400 can be comprised in larger systems (e.g., system 100, 200, etc.) and can have various other configurations. In embodiments, system 2400 can comprise a hierarchical pDAC having one or more controllers (e.g., SAR controller 2420 and SAR controller 2422). It is noted that SAR controller 2420 and SAR controller 2422 can comprise a single controller or multiple controllers. It is further noted that SAR controller 2420 and SAR controller 2422 can comprise similar or substantially similar functionality.

SAR controllers 2420 and 2422 can store (e.g., via a computer readable memory) bit-decisions ($L_i$, i∈{N, N−1, ..., 2, 1, C1, C2}) from the comparator 2410. In another aspect, SAR controllers 2420 and 2422 can configure each pair of switches connected to each capacitor's bottom-plate in one of three states: disconnected, connected to $V_{ref}$ ('1'), or connected to GND ('0'). The capacitor segmentation and error correction are hierarchically nested in two levels (h=2). Similar to system 2000, the segmentation scaling factor can be ¼ (s=¼). As depicted, system 2400 is an eleven bit ADC (N=11) with an eight bit MSB array (k=8), however other sizes and implementations can be utilized. According to the depicted example:

$$p = k - h \times \log_2\left(\frac{1}{s}\right) = k - 4 \quad (37)$$

The FEC capacitors grouped in $C_{Xi}$ can be given by:

$$C_{X(h+1)} = 2C_{N-k+2} = 4C \tag{38}$$

$$\sum_{j=h-1}^{h} C_{Xj} = \frac{1}{s} \times C_{X(h+1)} = 16C \tag{39}$$

$$C_{X(h-1)} = s \times \sum_{j=h-1}^{h} C_{Xj} = 4C \tag{40}$$

In general, $$C_X = \sum_j C_{Xj} = 2C_{N-k+2} \sum_{j=0}^{h-1} \left(\frac{1}{s}\right)^j. \tag{41}$$

In another aspect, a MSB capacitor can be sized according to:

$$C_N = \sum_j C_{Nj} = \text{round}\left(\frac{2C_{N-1} - C_X}{\left(\frac{1}{s}\right)^h}\right) \times \left(\frac{1}{s}\right)^h \tag{42}$$

where round(x) rounds x to the closes integer. This produces the desired redundancy in the MSB weight ($C_N < 2C_{N-1}$). In another aspect, each $C_{ij}$ capacitor in $C_i$ is segmented according to:

$$C_{i0} = s^h C_i = s^h \sum_j C_{ij}, \tag{43}$$

for $h \geq j > 0$ $$C_{ij} = \left(\frac{1}{s} - 1\right) \times \sum_{k=0}^{j-1} C_{ik} \tag{44}$$

In various embodiments, system 2400 can comprise a binary embodiment, where the total size of each $C_i$ for $N > i > N-k$ is:

$$C_i = \sum_j C_{ij} = 2^{i-(N-k)-1}C \tag{45}$$

FIGS. 25-28, depict various hierarchical pDAC systems 2500, 2600, 2700, and 2800 in different states in accordance with various aspects disclosed herein. The various systems can be comprised in larger systems (e.g., system 100, 200, etc.) and can have various other configurations. In embodiments, the systems can comprise a hierarchical pDAC having one or more controllers, decoders, and comparators.

System 2500 depicts a pDAC in a first MSB phase in accordance with various aspects disclosed herein. Capacitors $C_{i0}$ (hexadecimal notations are used in FIG. 25 where A=10, B=11, etc.) are used to determine the MSBs $L_{11}$ down to $L_8$ by comparing the DAC output $V_{DAC}$ against the reference voltage $V_{ref}$ via the comparator 2510. The capacitor $C_3$ is connected to $V_{ref}$ to introduce the intentional offset. It is noted that other capacitors or combinations of capacitors can be chosen to create this offset. Other capacitors among $C_i$ may be chosen to satisfy equation (32) and $C_{par} = C_{par1}$, for the first level of the pDAC hierarchy.

System 2600 depicts a pDAC in an FEC phase of the first hierarchy in accordance with various aspects disclosed herein. Capacitors $C_{i1}$ are connected to the capacitor array. The capacitors $C_{i1}$ for $N \geq i > N-p$ are connected and configured by the controller 2650 without trial and error. A redundant bit comparison, $L_{C1}$, is made using the $C_{X1}$ weight, while the bottom-plates of $C_{71}$ and $C_{61}$ are connected to ground. The capacitor $C_1$ is connected to $V_{ref}$ to introduce the FEC offset. It is noted that other capacitors or combinations of capacitors can be chosen to create this artificial offset. Other capacitors among $C_i$ may be chosen to satisfy equation (34) and $C_{par} = C_{par2}$.

System 2700 depicts a pDAC in the second MSB phase in accordance with various aspects disclosed herein. As depicted capacitors weights $C_{71}$ and $C_{61}$ are switched to determine $L_7$ to $L_6$ via the comparator 2710. It is noted that system 2700 can represent the second level of the pDAC hierarchy.

System 2800 depicts a pDAC in the FEC phase of a hierarchy in accordance with various aspects disclosed herein. As depicted, capacitors $C_{i2}$ and all other remaining capacitors are connected to the capacitor array. The capacitors $C_{i2}$ for $N \geq i > N-p-\log_2(1/s)$ are connected and configured by the controller 2550 without trial and error. A redundant bit comparison, $L_{C2}$, is made with the $C_{X3}$ weight, while the bottom-plates of $C_i$ for $N-p-\log_2(1/s) \geq i$ are connected to ground. The LSBs, $L_i$ for $N-p-\log_2(1/s) \geq i$, are determined using the conventional switching method. The final ADC result, $D_{SAR}$, can be calculated via decoder 2840 by combining equations (23), (24), and (25) with:

$$D_{SAR} = \frac{\left(L_{C1} \sum_{i=1}^{2} C_{Xi} + L_{C2}C_{X3} + \sum_{i=N-k+1}^{N} L_i C_i + \frac{C_B P C_{LSB}}{C_{LSB}} \sum_{i=0}^{N-k} L_i C_i\right)}{C_X + C_{MSB} + C_B P C_{LSB}} \times 2^N \tag{46}$$

It is noted that a hierarchical pDAC can be extended to more nested loops (h>2). In another aspect, each capacitor weight $C_i$ can be adjusted. For instance, each capacitor weight $C_i$ can be exponentially segmented according to equations (42), (43), (44), and (45). In an aspect, an FEC capacitor will consist of a group of exponentially segmented capacitors sized according to equations (38), (39), (40), and (41). In various embodiments, an FEC phase can be inserted between the transitions from one level of hierarchy to the next level of hierarchy.

Figure 29:
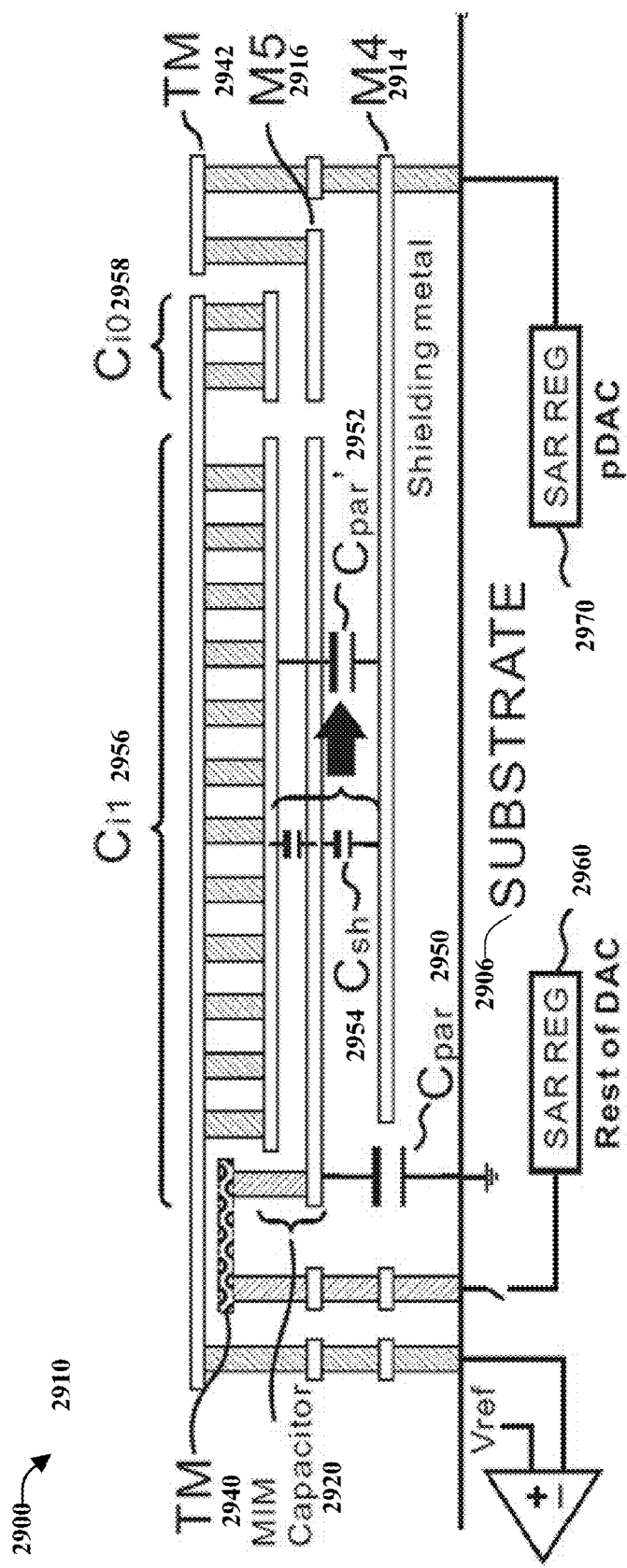
FIG. 29 illustrates an example functional block diagram of a sensory system comprising a metal layer that can facilitate shielding a capacitor in accordance with various embodiments.

Referring now to FIG. 29, presented is a system 2900 that can facilitate image sensing in accordance with various aspects disclosed herein. It is noted that the system 2900 can comprise more or different components to facilitate aspects disclosed herein. Moreover, while components are depicted as separate components, it is noted that the components can be comprised in one or more devices, in a single device, across devices, and the like. System 2900 can be comprised in devices, such as in the form of an on-chip image sensor of in personal computers, servers, rack servers, laptop computers, tablet computers, smart phones, personal digital assistants, and the like. It is noted that like named components of various figures can perform or comprise substantially similar functionality unless context suggests otherwise.

In an aspect, system 2900 can provide for a SAR ADCs having a DAC implemented by MIM or MOM capacitors overlapped on top of an active circuit. System 2900 can comprise a substrate 2906 (which comprise various substances such as silicon substrates), a shielding metal formed by metal layer M4 2914, a MIM capacitor 2920 (having a common top-plate TM 2942), one or more non-pDAC capacitors ($C_{i1}$ 2956) formed by bottom-plate TM 2940, one or more pDAC capacitors ($C_{i0}$ 2958) formed by bottom-plate M5 2916, an inherent parasitic capacitance $C_{par}$ 2950), a SAR (register) REG 2970 controlling the pDAC capacitor(s) ($C_{i0}$ 2958) of the DAC, a SAR REG 2960 controlling the non-pDAC capacitor(s) ($C_{i1}$ 2956) of the DAC. It is noted that system 2900 can comprise various other components or configurations. As such, FIG. 29 depicts but one exemplary embodiment of this disclosure. As depicted, the bottom-plate of the $C_{i1}$ 2956 can be disconnected from the SAR REG 2960 and left floating during pDAC operation. In an aspect, any parasitic capacitance, $C_{par}$ 2950, on these bottom-plates will lead to errors in the MSB weights according to equation (31). While depicted as a six metal layer MIM process, it is noted that various other layers or capacitors can be utilized. In embodiments, the six metal layer MIM where TM 2942 is the top metal layer and the MIM capacitor is formed between TM 2942 and M5 2916 below it, a method is disclosed here to use the fourth metal layer (M4 2914) as a shield between the MIM capacitor (M5 2916 and TM 2942) and the active circuits (a third metal layer and below) underneath.

The M4 2914 shielding layer is segmented and connected to individual bit in the SAR REG 2970 from the pDAC section. They are always held at a well defined voltages. If the parasitic capacitor sizes of these shielding segments ($C_{sh}$ 2954 or equivalently $C_{par}'$ 2952) are made to correlate with the capacitor weights ($C_{i0}$ 2958) to which they are connected with at the point of the SAR REG 2970, as shown depicted, the errors contributed by their parasitic capacitance, $C_{par}'$ 2952, is proportional to $C_{i0}$:

$$C_{par}' = C_{i1} P C_{sh} \approx C_{sh} \propto C_{i1} \quad (47)$$

This scaling effect mitigates the error introduced by $C_{par}$ 2950 and allows for a very compact ADC circuit. Without shielding, $C_{par}$ 2950 can introduce additional DNL errors to the ADC result.

Figure 30:
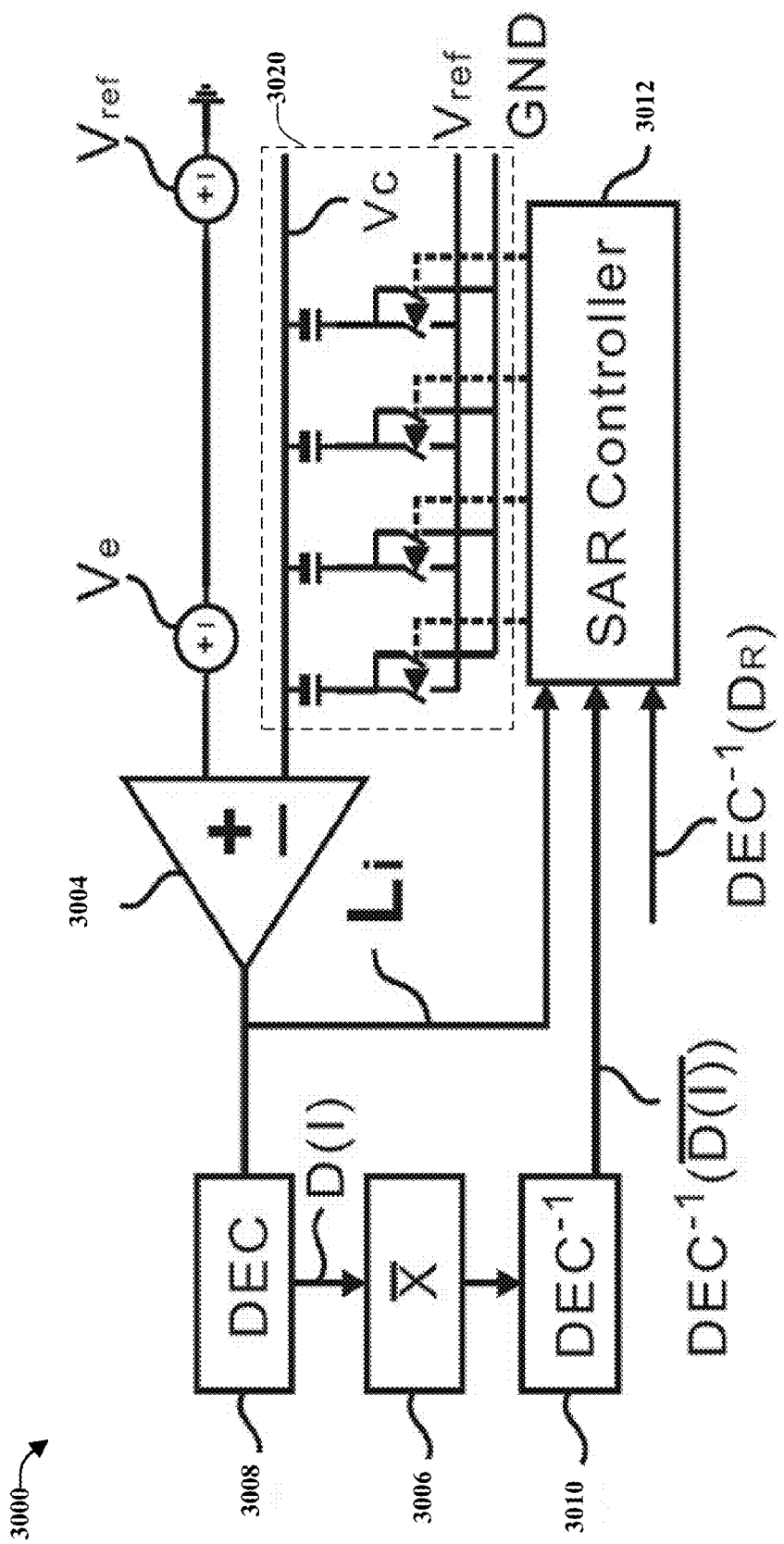
FIG. 30 illustrates an example functional block diagram of a sensory system that can facilitate a CDS scheme using a pre-loaded SAR DAC in accordance with various embodiments.

Referring now to FIG. 30, presented is a system 3000 that can facilitate image sensing in accordance with various aspects disclosed herein. It is noted that the system 3000 can comprise more or different components to facilitate aspects disclosed herein. Moreover, while components are depicted as separate components, it is noted that the components can be comprised in one or more devices, in a single device, across devices, and the like. System 3000 can be comprised in devices, such as in the form of an on-chip image sensor of in personal computers, servers, rack servers, laptop computers, tablet computers, smart phones, personal digital assistants, and the like. It is noted that like named components of various figures can perform or comprise substantially similar functionality unless context suggests otherwise. System 3000 can primarily comprise a comparator 3004, a decoder 3008, an inverse decoder 3010, an inverter 3006, a capacitor array 3020, and a SAR controller 3012.

In embodiments, system 3000 can depict a SAR ADC's DAC capacitors that can be utilized for performing mixed-signal CDS. In an aspect, system 3000 can mitigate the comparator offset error without additional analog or digital memories. For instance, a mixed-signal CDS can be utilized in a SAR ADC, according to various embodiments disclosed herein. In an aspect, described processes can be utilized for DACs with redundancy and partially non-binary capacitor weights such as pDAC. In the sampling phase, the input signal is connected to the top-plate, $V_C$, of the capacitor array 3020. In another aspect, during this sampling phase, instead of holding the bottom-plates of the DAC capacitors at ground, an SAR controller 3012 can configure the bottom-plates of capacitor array 3020 according to $DEC^{-1}(D_R)$, where $D_R$ is a pre-defined digital value. $DEC^{-1}(x)$ takes a binary value x, and converts it to a binary word mapping where each bit, $L_i$, represents whether the bottom-plate of the associated capacitor $C_i$ of capacitor array 3020 is connected to $V_{ref}$ ('1') or GND ('0'). In an aspect, this can be the inverse function of equations (46) and (36). In the case of DACs with redundancy and partially non-binary capacitor weights such as the case with pDAC, a mapping of $L_i$ is found for each given choice of $D_{SAR}$. In an example, this can be achieved by setting $L_C = L_9$ for any nine bit binary input, x. After the first sampling phase, the bottom-plates are restored to ground and charge-redistribution will settle the DAC output voltage, $V_C$, to $$V_C(1) = V_{RST} - Q^{-1}(D_R) \quad (48)$$

where $V_C(1)$ is the DAC output at time 1, $Q^{-1}$ is the DAC function (it converts a binary value into its equivalent analog DAC output voltage), and $V_{RST}$ is the first input signal. The $Q^{-1}$ function includes the $DEC^-$ 3010 function. The analog value of $Q^{-1}(x)$ is the DAC output, $V_C$, when the capacitor bottom plates are configured according to $DEC^-(x)$.

When the SAR ADC quantization is finished, an evaluated digital value from a decoder is:

$$D(1) = Q(V_{ref} + V_e - V_C(1)) \quad (49)$$

where Q is the quantization function, $V_e$ is the comparator offset error, and $V_{ref}$ is the SAR ADC reference voltage. Taking the complement of D(1) from the output of SAR inverter 3006 and expanding $V_C(1)$ yields:

$$\overline{D(1)} = Q(V_{ref}) - Q(V_{ref} + V_e - V_{RST} + Q^{-1}(D_R)) - 1 \quad (50)$$

If the bottom-plates of the DAC capacitors are held at $DEC^{-1}(\overline{D(1)})$ by multiplexing SAR controller 3012 to take the output of inverse decoder 3010 during the second sampling phase, when they are restored to ground after the sampling phase, the voltage across the capacitor array 3020 will settle to:

$$V_C(2) = V_{sig} + V_e - V_{RST} + Q^{-1}(D_R) - Q^{-1}(1), \quad (51)$$

where $V_{sig}$ is the second input voltage.

The quantization of $V_C(2)$ approximates to $$D(2) \approx Q(V_{ref} - (Q^{-1}(D_R) - (V_{RST} - V_{sig}))) + 1 \quad (52)$$

and the offset error, $V_e$, is canceled. For instance, $Q(V_{ref})$ and $D_R$ are constants, the desired result of $V_{RST} - V_{sig}$ can be obtained by subtracting D(2) with $(Q(V_{ref}) - D_R)$, as long as $V_{RST} > V_{sig}$ to avoid overflow. For the case of $V_{RST} < V_{sig}$, simply set $D_R = 0$ and follow the same process as outlined above, such that $V_{sig} - V_{RST}$ can be obtained by $Q(V_{ref}) - D(2)$.

Figure 31:
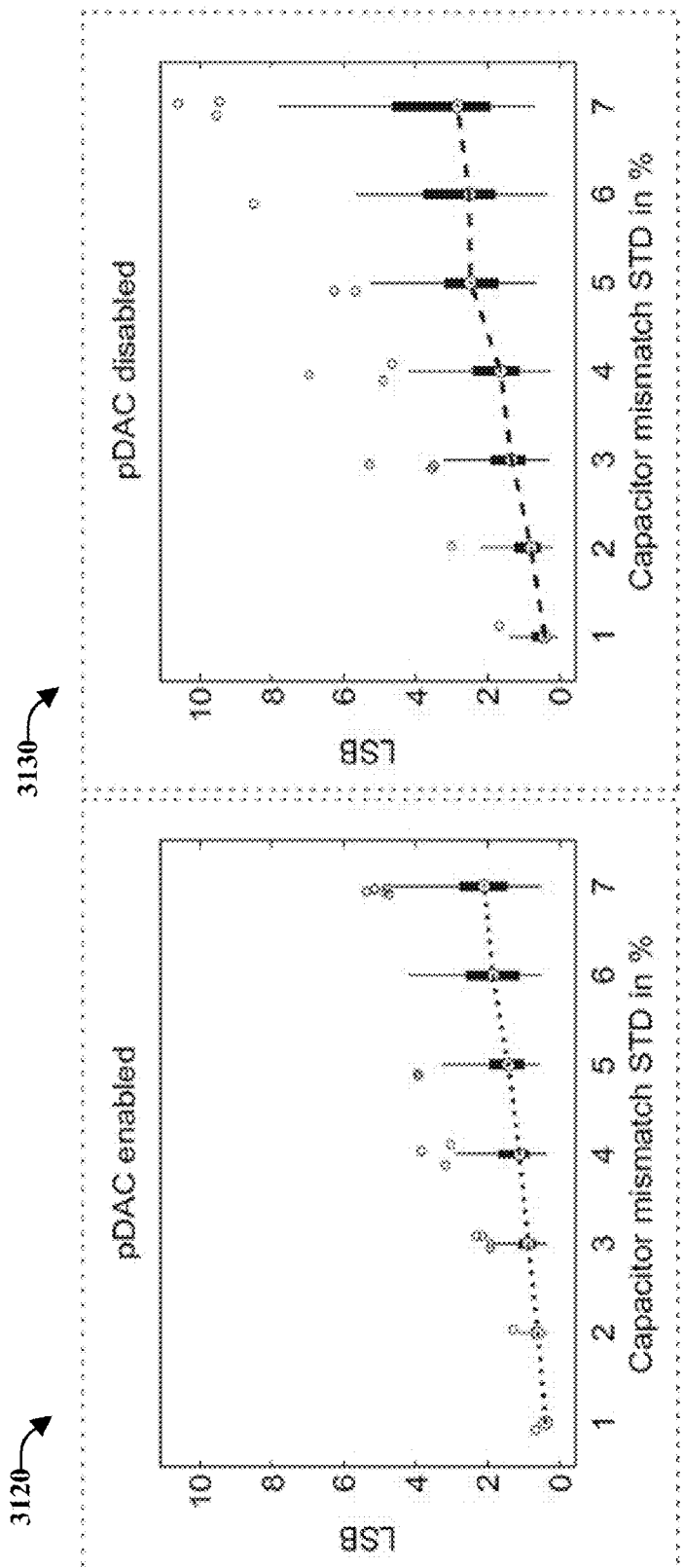
FIG. 31 illustrates an example graph depicting distribution of maximum Differential Non-Linearity (DNL) from each instance under increasing capacitor mismatch in accordance with various embodiments.
Figure 32:
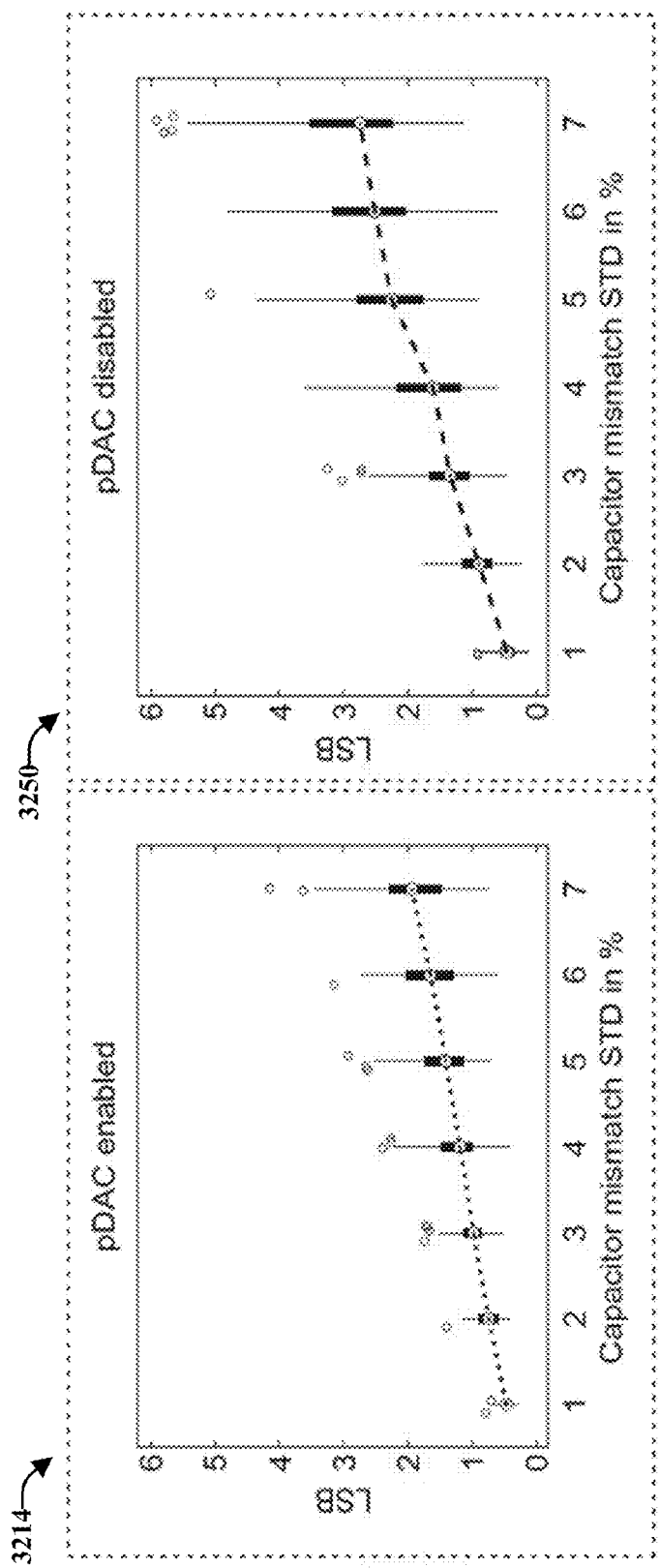
FIG. 32 illustrates an example graph depicting Integral Non-Linearity (INL) from each instance under increasing capacitor mismatch in accordance with various embodiments.

With reference to FIG. 20, FIGS. 31 and 32 depict the effect of capacitor mismatch on system 2000 based on one hundred instances of Monte Carlo simulation in graphs 3120, 3130, 3214, and 3250. In an aspect, FIG. 31 describes distribution of maximum Differential Non-Linearity (DNL) from each Monte Carlo instance under increasing capacitor mismatch and FIG. 32 depicts Integral Non-Linearity (INL)

from each Monte Carlo instance under increasing capacitor mismatch. Graphs 3130 and 3250 are associated with a conventional switching scheme. Graphs 3120 and 3214 are associated with a pDAC switching scheme. The capacitor mismatch is defined to be a Gaussian distribution with a standard deviation (STD) normalized to a unit capacitor. A parasitic capacitor, $C_{par}$, is assumed to be two unit-capacitors (with appropriate mismatch) in FIGS. 31 and 32.

For small mismatches, as depicted, the conventional switching method leads to smaller non-linearities because it can enjoy the advantage of higher precision in its MSB weights. At increased capacitor mismatch, large non-linearity errors begin to emerge due to wrong bit decisions made by poorly matched MSB weights. The pDAC scheme has an advantage under these circumstances because the combined redundancy of its FEC and non-binary MSB can tolerate some error in the MSB weights.

In an embodiment, a system can comprise a number of SAR ADCs as depicted in FIG. 20. As an example, a system with 160 of the SAR ADC in parallel can be fabricated in Global Foundry 1P6M 0.18 μm mixed-signal technology (e.g., for image sensor applications). The ADC performance is summarized in below, it is noted that different values can be generated based on desired configurations. Further, the quoted FoM is calculated for a single ADC without CDS.

|  | with pDAC | without pDAC |
|---|---|---|
| Process | 0.18 μm 1P6M CMOS | |
| Supply voltage | 3.3 V, 1.8 V | |
| Area | 7.4 × 490 μm² | |
| Clock frequency | 2.06 MHz | 2 MHz |
| Pixel resolution | 920 × 256 | |
| Frame rate | 9 fps | |
| Read noise | 5300 μV$_{rms}$ (1.5 LSB) | |
| Sample rate | 66.67 kSa/s | |
| DNL | 1.2 LSB | 3.5 LSB |
| INL | 4 LSB | 4 LSB |
| column FPN (CDS) | 0.5% | 3.2% |
| ER | 8.20 bit | 6.97 bit |
| ADC power | 1.25 μW | 1.27 μW |
| Energy consumption | 18.7 pJ/Sa | 19.0 pJ/Sa |
| FoM (ADC only) | 64 fJ/step | 152 fJ/step |

The ENOB is defined as $$ENOB = \log_2\left(\frac{2^N}{\varepsilon}\right) \quad (53)$$

where N is the ADC resolution in bits, and ε is the maximum between DNL and noise, which can be the effective error seen by the ADC (INL is not critical for image sensors). This definition of ENOB is acceptable for image sensors since the output from the pixel array can be considered to be a DC signal as opposed to a full-range sinusoid.

The ADC Figure-of-Merit (FoM) is calculated using the standard expression:

$$FoM = \frac{P}{F_s \times 2^{ENOB}} \quad (54)$$

where, P is the circuit power consumption, and $F_s$ is the sampling frequency.

In view of the example system(s) and apparatuses described above, example method(s) that can be implemented in accordance with the disclosed subject matter are further illustrated with reference to flowcharts of FIGS. 33-35. For purposes of simplicity of explanation, example methods disclosed herein are presented and described as a series of acts; however, it is noted that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described.

Figure 33:
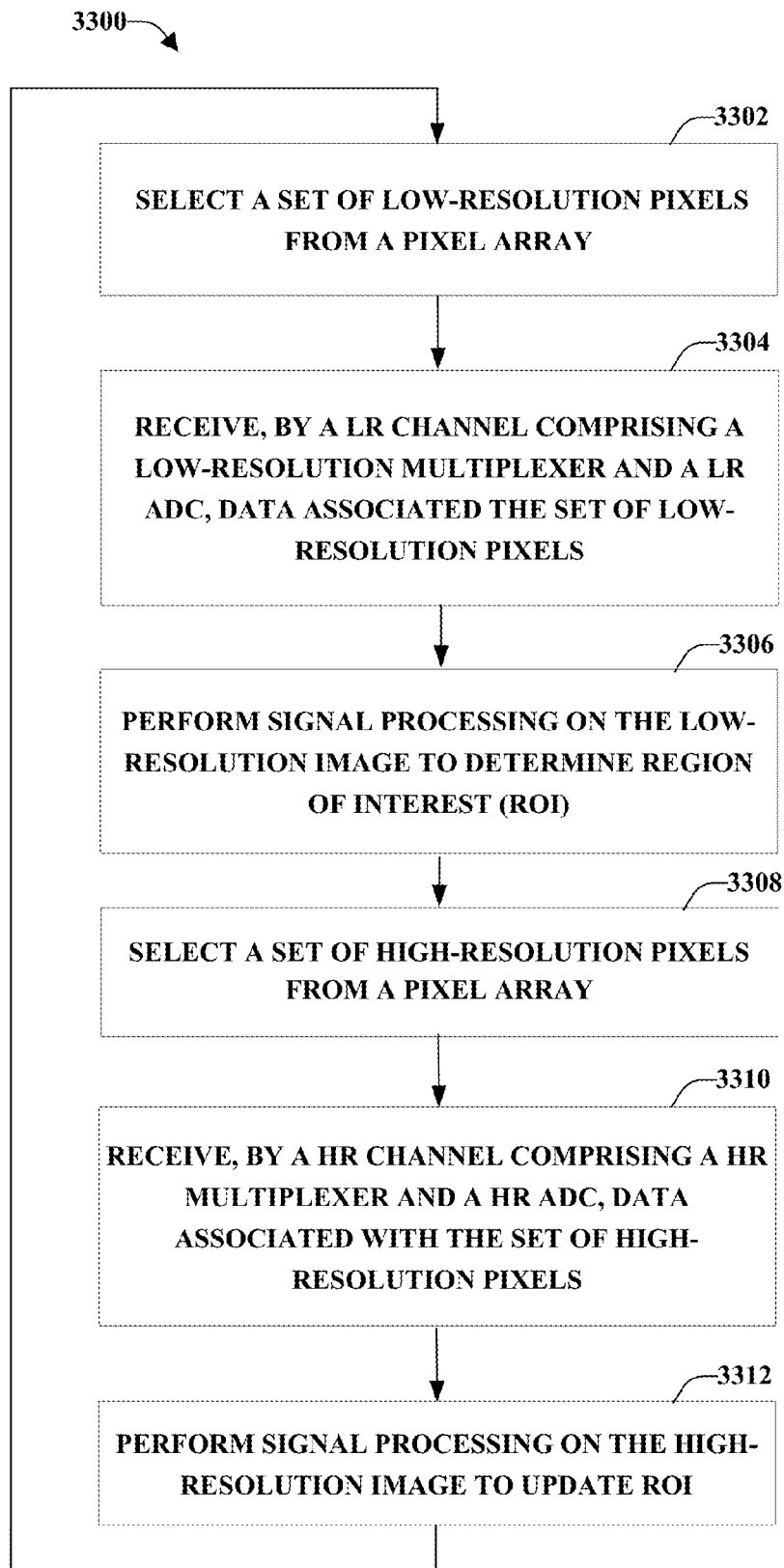
FIG. 33 illustrates an example flow diagram of a method for multichannel pixel readout in a sensory system in accordance with an embodiment.

Turning to FIG. 33, there illustrated is an exemplary method 3300 to facilitate multichannel pixel readout in a sensory system. In an aspect, method 3300 can generate an HR readout channel and a LR readout channel as described herein, (e.g., via system 100, 300, 400, etc.). It is noted that efficiency(ies) of method 3300 results from using various aspects of this disclosure.

At 3302, the system can select (e.g., via row decoder 122) a set of low-resolution pixels from a pixel array. In an aspect, the set of low-resolution pixels can comprise pixels associated with achieving a determined level of detail as a result of processing the low-resolution pixels. For example, an LR channel can compress data associated with the low-resolution pixels.

At 3304, the system can receive, by a LR channel (e.g., LR channel 116) comprising a low-resolution multiplexer and a LR ADC, data associated with the set of low-resolution pixels. In an aspect, the LR channel can be configured for trading off a select set of performance metrics to achieve a performance criterion.

At 3306, the system can (e.g., via processor 162) perform signal processing on the low-resolution image to determine, for instance, a region of interest (ROI).

At 3308, a system can select a set of high-resolution pixels from a pixel array according to the ROI. In an aspect, the set of high-resolution pixels can comprise pixels associated with achieving a determined level of detail as a result of processing the high-resolution pixels.

At 3310, a system can receive, by an HR channel (e.g., HR channel 112) comprising an HR multiplexer and an HR ADC, converter, data associated with the set of high-resolution pixels. In an aspect, the HR channel can be configured for trading off, in a disparate manner than the LR channel, a select set of performance metrics to achieve a performance criterion. For example, the HR channel and the LR channel can be associated with disparate processing speeds, bandwidth, SNRs, power consumptions, and the like.

At 3012, a system can (e.g., via processor 162) perform further signal processing on the high-resolution image to update the ROI to refine the set of low-resolution pixels chosen in 3302. In an aspect, the system can continue at 3302 in a control loop.

Figure 34:
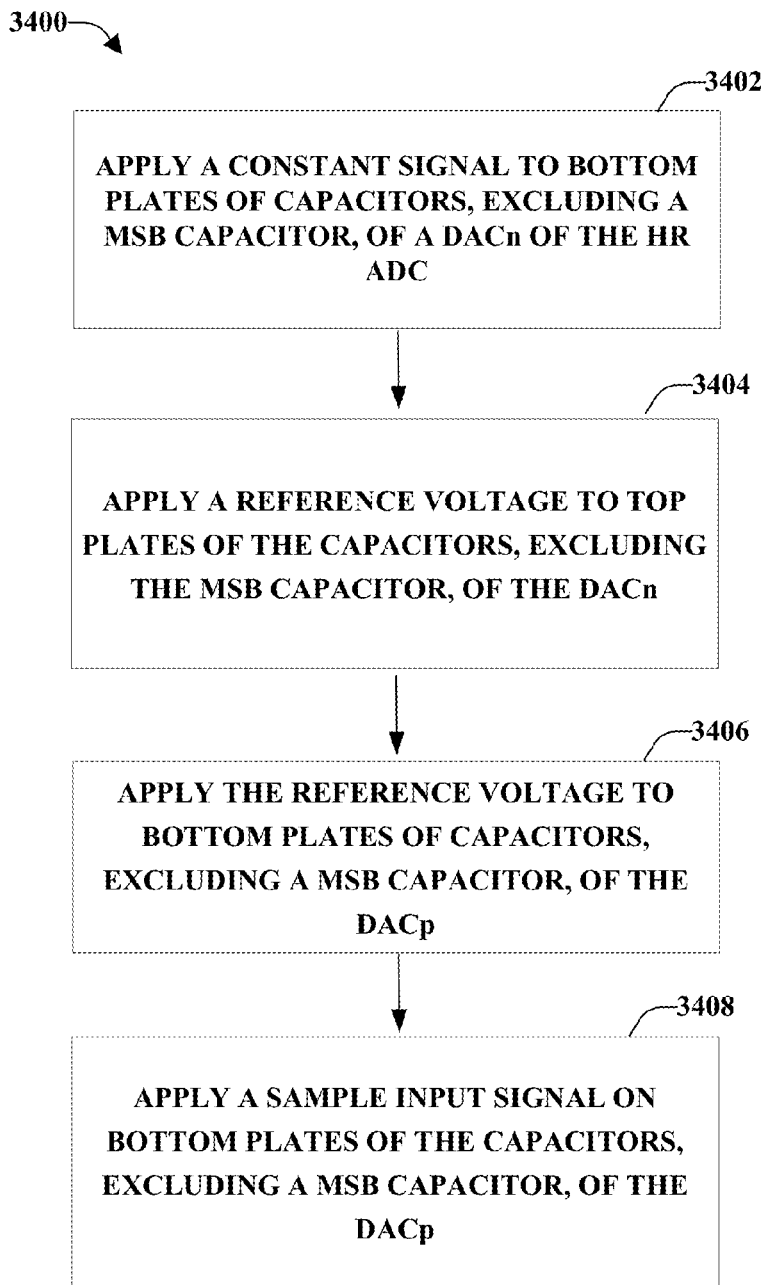
FIG. 34 illustrates an example flow diagram of a method for sampling a signal in a sensory system in accordance with an embodiment.

Turning to FIG. 34, there illustrated is an exemplary method 3400 that can facilitate sampling a signal in a sensory system according to various aspects disclosed herein. In an aspect, method 3400 can sample a signal of a pixel of a pixel array as described herein (e.g., via system 100, 300, 400, etc.). It is noted that efficiency(ies) of method 3400 results from using various aspects of this disclosure.

At 3402, a system can apply a constant signal (e.g., ground) to bottom plates of capacitors, excluding an MSB capacitor, of a DACn of the HR ADC. For example, an HR ADC (e.g., system 400) can comprise a set of capacitors (e.g., MUX 442) and an HR ADC (e.g., HR ADC 444). At 3404, a system can apply a reference voltage to top plates of the capacitors, excluding the MSB capacitor, of the DACn. At 3406, a system can apply the reference voltage to bottom plates of capacitors, excluding an MSB capacitor, of the DACp. At 3408, a system can apply a sample input signal on bottom plates of the capacitors, excluding an MSB capacitor, of the DACp. For example, with reference to FIGS. 13-14, bottom plates of capacitors, excluding an MSB capacitor, of the DACn 1332 or 1432, can be connected to a ground. During a sampling process, the bottom plates of bottom plates of capacitors, excluding the MSB capacitor, of the DACn 1332 or 1432, can be connected to the reference voltage. In another aspect, bottom plates of capacitors, excluding an MSB capacitor, of the DACp 1330 or 1430 can be connected to a reference voltage. The top plates of the capacitors, excluding the MSB capacitor, of the DACp 1330 or 1430 can be connected to a received input signal.

Figure 35:
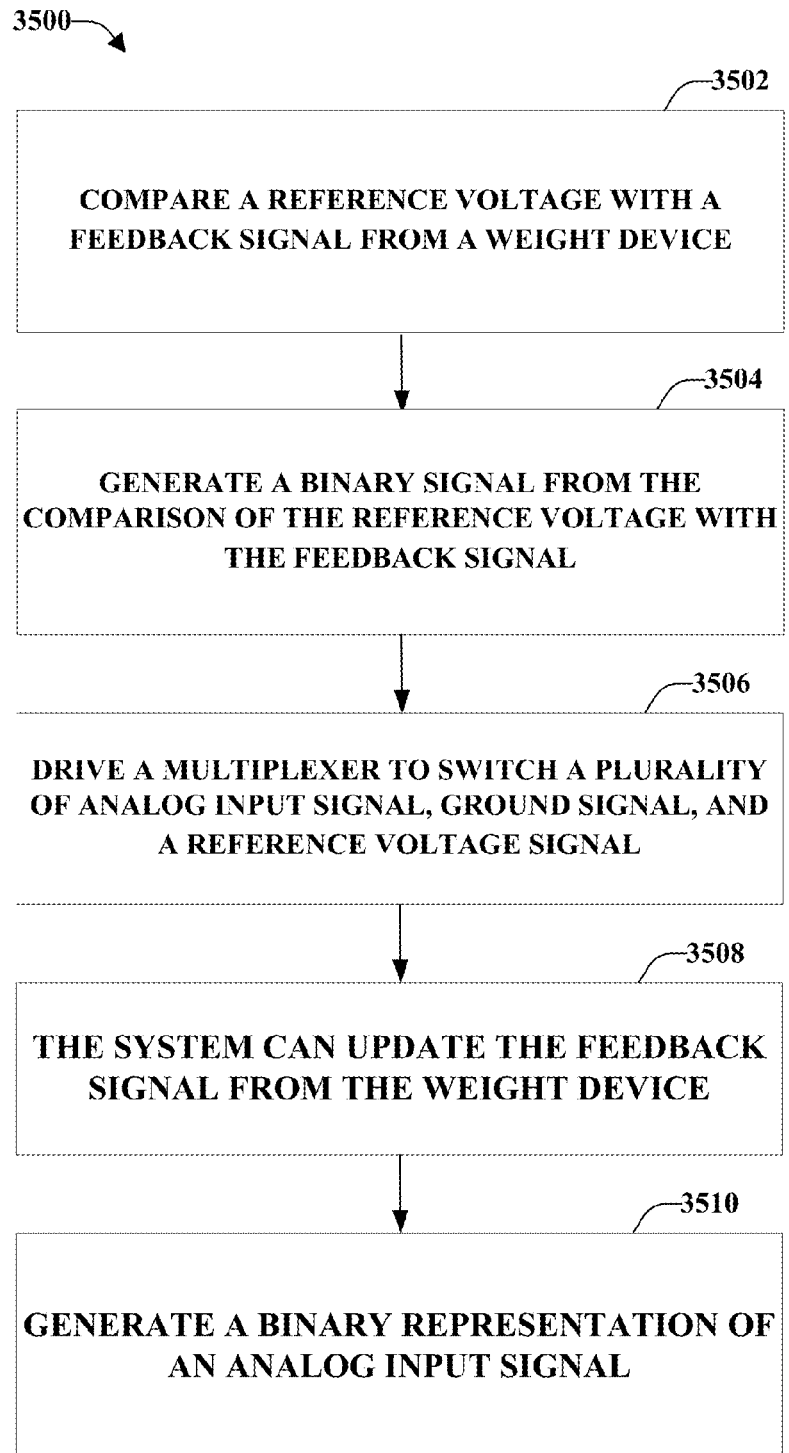
FIG. 35 illustrates an example flow diagram of a method for SAR in an ADC conversion process in a sensory system in accordance with an embodiment.

Turning to FIG. 35, there illustrated is an exemplary method 3500 that can facilitate SAR in an ADC conversion process in a sensory system according to various aspects disclosed herein. Method 3500 can be facilitated via various embodiments described herein (e.g., via system 100, 300, 400, etc.). It is noted that efficiency(ies) of method 3500 results from using various aspects of this disclosure.

At 3502, a system can compare a reference voltage with a feedback signal. At 3504, the system can generate a binary signal from the comparison of the reference voltage with the feedback signal. At 3506, the system can drive a multiplexer to switch a plurality of analog input signal, ground signal, and a reference voltage signal. At 3508, the system can update the feedback signal from the weight devices. At 3510, the system can generate a binary representation of an analog input signal.

For instance, with reference to FIG. 2, MUX components 242 can multiplex pixels of pixel array 208 to HR ADCs 244. HR controller 226 can control MUX components 242 to activate or deactivated switches that enable connection paths, in an aspect, the MUX components 242 can activate only one transmission path (e.g., set of pixels of a pixel block) at a time. HR ADCs 244 can sample HR readouts received from MUX components 242 and can quantize signals using a compactor feedback to a DAC output and storing it in a SAR and output the results to MUX 240. MUX components 254 can multiplex pixels of pixel array 208 to LR ADCs 256. LR controller 232 can control MUX components 254 to activate or deactivated switches that enable connection paths, in an aspect, the MUX components 254 can activate only one group of transmission paths (e.g., set of pixels of a pixel block) at a time. LR ADCs 256 can sample LR readouts received from MUX components 254 and can quantize signals using a compactor feedback to a DAC output and storing it in a SAR. The DP 258 can process and compress the SAR output and output the results to MUX 240. Then processor 262 can reconfigure MUX 240 to process the HR and LR data output 204 and reconfigure HR controller 226 and LR controller 232 into new modes of operation to improve quality of data capture or any given performance metric of them system 200.

Figure 36:
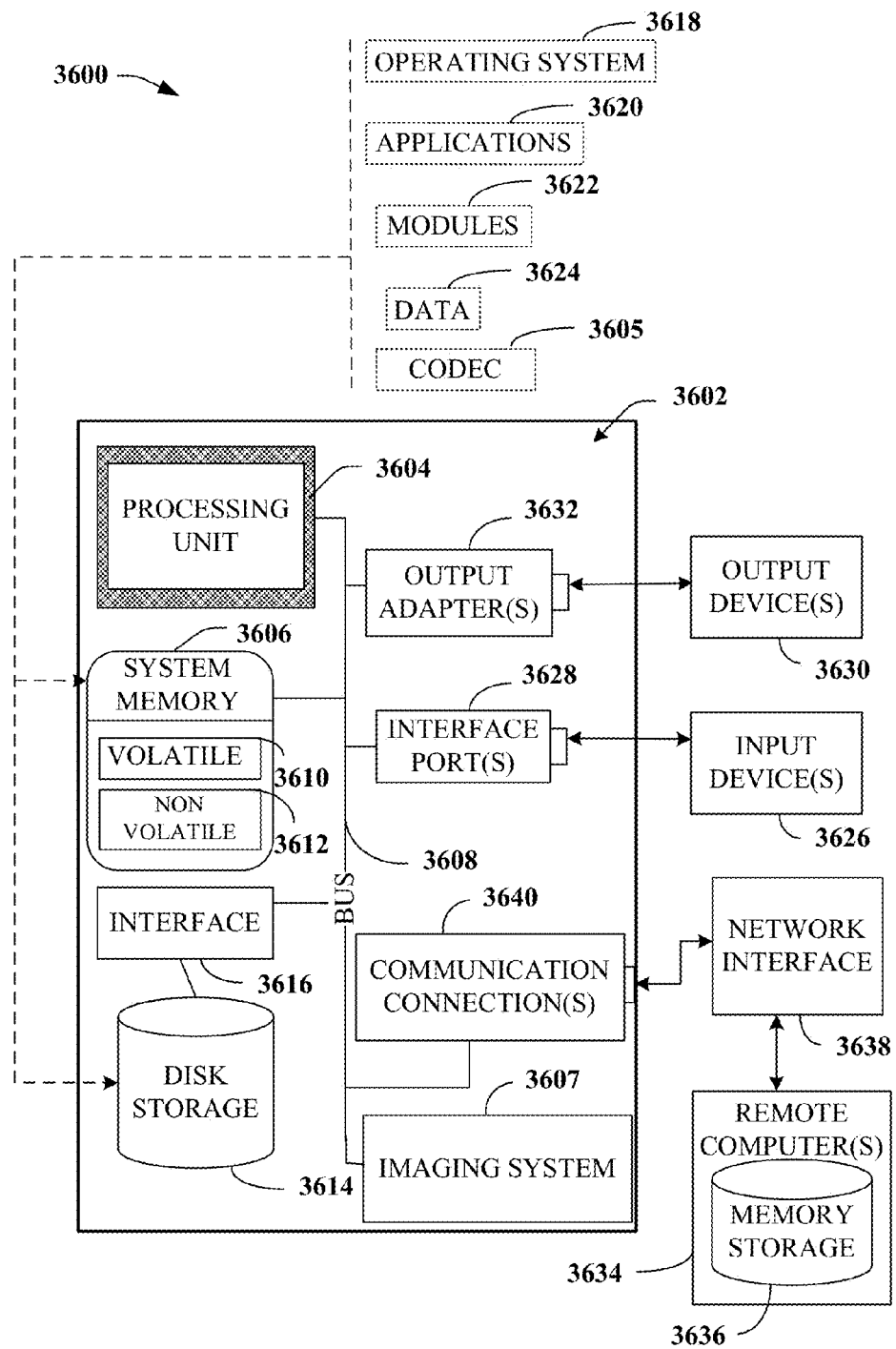
FIG. 36 illustrates an example block diagram of a computing system, in accordance with an embodiment.

In order to provide a context for the various aspects of the disclosed subject matter, FIG. 36, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 164) there can be software, which can instruct a processor (such as processor 62) to perform various actions. The processor can be configured to execute the instructions in order to implement encoding/decoding of a data stream utilizing a stream-switching process in accordance with various aspects disclosed herein.

Moreover, those skilled in the art will understand that the various aspects can be practiced with other computer system configurations, including single-processor or multiprocessor computer systems, mini-computing devices, mainframe computers, as well as personal computers, base stations, hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 36, a suitable environment 3600 for implementing various aspects of this disclosure includes a computer 3602. The computer 3602 includes a processing unit 3604, a system memory 3606, a system bus 3608, and an imaging system 3607 in accordance with various embodiments disclosed herein. The system bus 3608 couples system components including, but not limited to, the system memory 3606 to the processing unit 3604. The processing unit 3604 can be any of various available processors. Dual microprocessors and other multiprocessor architectures also can be employed as the processing unit 3604.

The system bus 3608 can be any of several types of bus structure(s) including the memory bus or memory controller, a peripheral bus or external bus, and/or a local bus using any variety of available bus architectures including, but not limited to, Industrial Standard Architecture (USA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 3606 includes volatile memory 3610 and nonvolatile memory 3612. The basic input/output system (BIOS), containing the basic routines to transfer information between elements within the computer 3602, such as during start-up, is stored in nonvolatile memory 3612. By way of illustration, and not limitation, nonvolatile memory 3612 can include read only memory (ROM), programmable ROM (PROM), electrically programmable ROM (EPROM), electrically erasable programmable ROM (EEPROM), flash memory, or nonvolatile random access memory (RAM)

(e.g., ferroelectric RAM (FeRAM)). Volatile memory 3610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 3602 also includes removable/non-removable, volatile/non-volatile computer storage media. FIG. 36 illustrates, for example, a disk storage 3614. Disk storage 3614 includes, but is not limited to, devices like a magnetic disk drive, floppy disk drive, tape drive, Jaz drive, Zip drive, LS-100 drive, flash memory card, or memory stick. The disk storage 3614 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3614 to the system bus 3608, a removable or non-removable interface is typically used, such as interface 3616.

FIG. 36 also depicts software that acts as an intermediary between users and the basic computer resources described in the suitable operating environment 3600. Such software includes, for example, an operating system 3618. Operating system 3618, which can be stored on disk storage 3614, acts to control and allocate resources of the computer system 3602. System applications 3620 take advantage of the management of resources by operating system 3618 through program modules 3622 and program data 3624, e.g., stored either in system memory 3606 or on disk storage 3614. It is to be appreciated that this disclosure can be implemented with various operating systems or combinations of operating systems.

A user enters commands or information into the computer 3602 through input device(s) 3626. Input devices 3626 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3604 through the system bus 3608 via interface port(s) 3628. Interface port(s) 3628 include, for example, a serial port, a parallel port, a game port, and a universal serial bus (USB). Output device(s) 3630 use some of the same type of ports as input device(s) 3626. Thus, for example, a USB port may be used to provide input to computer 3602 and to output information from computer 3602 to an output device 3630. Output adapter 3632 is provided to illustrate that there are some output devices 3630 like monitors, speakers, and printers, among other output devices 3630, which require special adapters. The output adapters 3632 include, by way of illustration and not limitation, video and sound cards that provide a means of connection between the output device 3630 and the system bus 3608. It should be noted that other devices and/or systems of devices provide both input and output capabilities such as remote computer(s) 3634.

Computer 3602 can operate in a networked environment using logical connections to one or more remote computers, such as remote computer(s) 3634. The remote computer(s) 3634 can be a personal computer, a server, a router, a network PC, a workstation, a microprocessor based appliance, a peer device or other common network node and the like, and typically includes many or all of the elements described relative to computer 3602. For purposes of brevity, only a memory storage device 3636 is illustrated with remote computer(s) 3634. Remote computer(s) 3634 is logically connected to computer 3602 through a network interface 3638 and then physically connected via communication connection 3640. Network interface 3638 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 3640 refers to the hardware/software employed to connect the network interface 3638 to the bus 3608. While communication connection 3640 is shown for illustrative clarity inside computer 3602, it can also be external to computer 3602. The hardware/software necessary for connection to the network interface 3638 includes, for exemplary purposes only, internal and external technologies such as, modems including regular telephone grade modems, cable modems and DSL modems, ISDN adapters, and Ethernet cards.

In accordance with various aspects and implementations, the computer 3602 can be used to encode data, such as digital media data, which can be in the form of a sequence of video frames (e.g., raw video frames). As more fully disclosed herein, in some implementations, the computer 3602 can include a plurality of processors that can be used to process data and perform computing tasks (e.g., encoding-related tasks and/or decoding-related tasks, etc.). The computer 3602 includes a codec 3605 that can contain, for example, an encoder component and/or decoder component (e.g., system 100, system 400, etc.), each of which can respectively function as more fully disclosed herein. In some implementations, the codec 3605 can perform various encoding tasks on data (e.g., sequentially or in parallel). In some implementations, the codec 3605 can additionally or alternatively perform various decoding tasks on data (e.g., sequentially or in parallel).

According to an implementation, the one or more devices of the multiple-input multiple-output network comprise a combination of cells, user devices, and antennas. In some implementations, the one or more devices of the multiple-input multiple-output network comprise a three or more cells.

Figure 37:
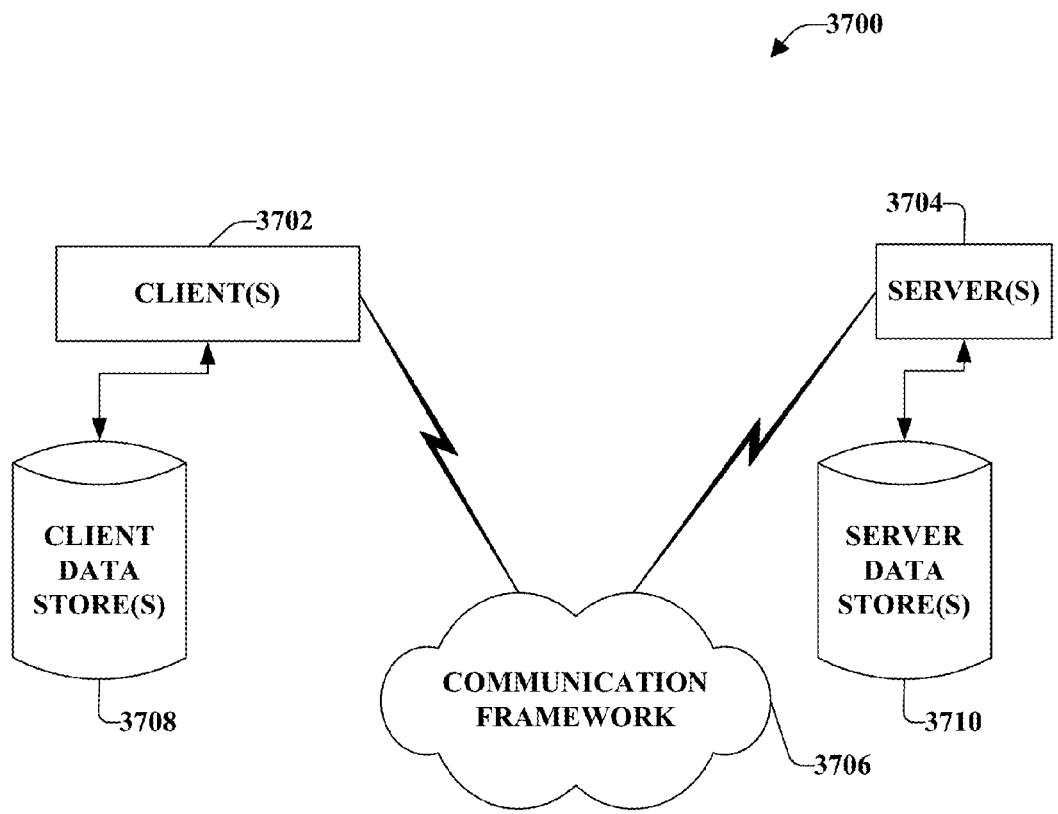
FIG. 37 illustrates an example block diagram representing exemplary non-limiting networked environments in which various non-limiting embodiments described herein can be implemented.

FIG. 37 is a schematic block diagram of a sample-computing environment 3700 with which the subject matter of this disclosure can interact. The system 3700 includes one or more client(s) 3702. The client(s) 3702 can be hardware and/or software (e.g., threads, processes, computing devices). Clients 3702 can provide imaging systems as described herein. The system 3700 also includes one or more server(s) 3704. Thus, system 3700 can correspond to a two-tier client server model or a multi-tier model (e.g., client, middle tier server, data server), amongst other models. The server(s) 3704 can also be hardware and/or software (e.g., threads, processes, computing devices). The servers 3704 can house threads to perform transformations by employing this disclosure, for example. One possible communication between a client 3702 and a server 3704 may be in the form of a data packet transmitted between two or more computer processes.

The system 3700 includes a communication framework 3706 that can be employed to facilitate communications between the client(s) 3702 and the server(s) 3704. The client(s) 3702 are operatively connected to one or more client data store(s) 3708 that can be employed to store information local to the client(s) 3702. Similarly, the server(s) 3704 are operatively connected to one or more server data store(s) 3710 that can be employed to store information local to the servers 3704.

It is to be appreciated and understood that components (e.g., encoder component, decoder component, stream component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, tablets), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. In yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Except where stated otherwise or where context suggests otherwise, references herein to two or more elements being "coupled" or "connected" to each other is intended to broadly include both (a) the elements being directly connected to each other, or otherwise in direct communication with each other, without any intervening elements, as well as (b) the elements being indirectly connected to each other, or otherwise in indirect communication with each other, with one or more intervening elements. Furthermore, it should be appreciated that functional blocks or units shown in the drawings may be implemented as separate circuits in some embodiments, but may also be fully or partially implemented in a common circuit in other embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., encoder component, encoder, codec, encoder component, decoder component, decoder, identification component, matching component, computation component, management component, processing component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a first readout channel comprising a first quantization resolution level analog-to-digital converter and a first quantization resolution level multiplexer, wherein a first performance metric of the first readout channel satisfies a threshold level;
   a second readout channel comprising a second quantization resolution level analog-to-digital converter and a second quantization resolution level multiplexer, wherein a second performance metric of the second readout channel does not satisfy the threshold level; and
   a sensory array comprising a first set of sensors associated with the first readout channel and a second set of sensors associated with the second readout channel.

2. The system of claim 1, wherein a sensor of the sensory array comprises a P+-implant-N-substrate photo-diode comprising a buried N-type metal-oxide-semiconductor reset transistor.

3. The system of claim 1, wherein a sensor of the sensory array comprises a N+-implant-P-substrate photo-diode comprising a buried P-type metal-oxide-semiconductor reset transistor.

4. The system of claim 1, wherein a sensor of the sensory array comprises:
   an in-well reset transistor comprising a parasitic diode; and
   a delay element, connected to a reset signal of the sensor, configured to charge a bias voltage of the parasitic diode of the in-well reset transistor to prevent the bias voltage from becoming forward biased after a pixel reset process.

5. The system of claim 1, wherein a sensor of the sensory array comprises an in-pixel logic circuit comprising:
   a set of select transistors each configured to receive one or more reset signals, wherein the sensor is configured to alter, based on the one or more reset signals, a state associated with the sensor.

6. The system of claim 1, wherein the first readout channel comprises at least one high-resolution readout channel that is multiplexed onto the first set of sensors, and wherein the at least one high-resolution readout channel comprises at least one multiplexer and at least one high-resolution analog-to-digital converter.

7. The system of claim 6, wherein the at least one high-resolution analog-to-digital converter comprises an analog multiplexer configured to select, in response to receiving a series of reference signals, at least one least-significant-bit.

8. The system of claim 6, wherein the at least one high-resolution readout channel further comprises:
a comparator configured to compare a reference voltage signal, received at a first input of the comparator, with a feedback signal received at a second input of the comparator;
a pilot digital-to-analog converter, coupled to the comparator, configured to provide the feedback signal to the second input of the comparator and update the feedback signal; and
a register, coupled to the pilot digital-to-analog converter, configured to store bits of data that represent an output of the comparator.

9. The system of claim 8, wherein the pilot digital-to-analog converter comprises a binary weighting device configured to apply a binary weighted sizing to a buffer of a reference signal, and wherein the binary weighting device further comprises an error correction weight device.

10. The system of claim 8, wherein the pilot digital-to-analog converter further comprises a set of weight devices arranged as at least two scaled segments and configured to facilitate a forward error correction process.

11. The system of claim 8, wherein the at least one high-resolution readout channel is further configured to determine, based on two references and a pre-biased offset of a most-significant-bit evaluation process, a bipolar error correction range.

12. The system of claim 8, wherein the pilot digital-to-analog converter is further configured to perform mixed signal corrective double sampling based on pre-loading the pilot digital-to-analog converter with a pre-load value during a sampling process.

13. The system of claim 8, wherein the pilot digital-to-analog converter comprises a set of weighting devices that are hierarchically nested and wherein most-significant-bit estimations are made consecutively from a lowest hierarchical level to a highest hierarchical level with bipolar error correction phases inserted in each transition from respective lower levels to respective higher levels.

14. The system of claim 8, wherein the pilot digital-to-analog converter further comprises a set of weight devices, and a shielding metal layer drawn proportionally to respective sizes of the set of weight devices of the set of weight devices.

15. The system of claim 6, wherein the at least one high-resolution analog-to-digital converter is further configured to perform a self-calibration process based on a register mask, wherein the self-calibration process comprises:
connecting bottom plates of capacitors of the at least one high-resolution analog-to-digital converter to the register mask; and
in response to a sampling process, restoring the bottom plates of the capacitors of the at least one high-resolution analog-to-digital converter to a constant signal and settling charge-redistribution of a voltage associated with the capacitors as a function of a weight indicated by the register mask.

16. The system of claim 6, wherein the at least one high-resolution analog-to-digital converter comprises:
a comparator comprising at least one voltage controlled delay component and an arbiter, wherein the at least one voltage controlled delay component comprises a set of delay stage devices that receive a clock signal and a set of biased devices, and wherein the set of biased devices are configured to be smaller than the at least one voltage controlled delay component and to facilitate a delay stage by controlling a current supplied to the at least one voltage controlled delay component.

17. A method, comprising:
selecting, by a system comprising a processor, a set of high-resolution pixels from a pixel array;
receiving, by a high-quantization resolution channel comprising a high-resolution multiplexer and a high-resolution analog-to-digital converter, data associated with the set of high-resolution pixels;
selecting, by the system, a set of low-resolution pixels from the pixel array, wherein the high-resolution is higher than the low-resolution; and
receiving, by a low-quantization resolution channel comprising a low resolution multiplexer and a low-resolution analog-to-digital converter, data associated with the set of low-resolution pixels, wherein the high-quantization resolution channel and the low-quantization resolution channel are configured for satisfaction of different performance metrics.

18. The method of claim 17, further comprising:
in response to receiving the data associated with the set of low-resolution pixels, altering the set of high-resolution pixels by reselecting the set of high-resolution pixels from the pixel array based on a region of interest determined based on the data associated with the set of low-resolution pixels; and
in response to receiving the data associated with the set of high-resolution pixels, altering the set of low-resolution pixels by reselecting the set of low-resolution pixels from the pixel array based on the region of interest determined based on the data associated with the set of high-resolution pixels.

19. The method of claim 17, further comprising:
applying a constant signal to bottom plates of capacitors, excluding a most-significant-bit capacitor, of a negative digital-to-analog converter of a high-resolution analog-to-digital converter of the high-quantization resolution channel;
applying a reference voltage to top plates of the capacitors, excluding the most-significant-bit capacitor, of the negative digital-to-analog converter;
applying the reference voltage to bottom plates of capacitors, excluding a most-significant-bit capacitor, of a positive digital-to-analog converter; and
applying a sample input signal on bottom plates of the capacitors, excluding the most-significant-bit capacitor, of the positive digital-to-analog converter.

20. The method of claim 19, further comprising:
settling, based on the sample input signal, the negative digital-to-analog converter and the positive digital-to-analog converter.

21. The method of claim 20, wherein the settling the negative digital-to-analog converter and the positive digital-to-analog converter, further comprises:
generating, based on combining signals of the negative digital-to-analog converter and the positive digital-to-analog converter, a combined output signal.

22. An apparatus, comprising:
an array of pixels coupled to a high-quantization resolution channel and a low-resolution channel, wherein the high-quantization resolution channel comprises a first analog-to-digital converter and a first multiplexer, wherein the high-quantization resolution channel has a higher resolution than the low-quantization resolution channel; and the low-quantization resolution channel comprising a second analog-to-digital converter and a second multiplexer, wherein the high-quantization resolution channel and the low-quantization resolution channel are configured to satisfy disparate performance criteria.

23. The apparatus of claim 22, wherein the low-quantization resolution channel is further configured for compression of an input signal, received from the array of pixels, based on at least one of a block-wise pixel readout, output from parallel analog-to-digital converters of the low-quantization resolution channel, or output from a statistical rank-order filter.

24. The apparatus of claim 22, wherein the low-quantization resolution channel further comprises at least one analog-to-digital converter comprising a bit-serial statistical filter, and wherein the at least one analog-to-digital converter is configured to turn off in response to determining, based on out of the bit-serial statistical filter, that a value of a pixel of the array of pixels associated with the at least one analog-to-digital converter is below a threshold.

25. The apparatus of claim 22, further comprising:
a multiplexer configured for generation of a high-fidelity representation of the array of pixels by combining data from the high-quantization resolution channel with data from the low-quantization resolution channel.

* * * * *